(12) United States Patent
Sgourakis

(10) Patent No.: US 12,534,510 B2
(45) Date of Patent: Jan. 27, 2026

(54) PEPTIDE-RECEPTIVE MHC-I COMPLEX COMPOSITIONS AND METHODS

(71) Applicant: The Regents of the University of California, Oakland, CA (US)

(72) Inventor: Nikolaos G. Sgourakis, Philadelphia, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 683 days.

(21) Appl. No.: 17/233,407

(22) Filed: Apr. 16, 2021

(65) Prior Publication Data

US 2021/0371499 A1 Dec. 2, 2021

Related U.S. Application Data

(60) Provisional application No. 63/011,211, filed on Apr. 16, 2020, provisional application No. 63/047,812, filed on Jul. 2, 2020, provisional application No. 63/076,601, filed on Sep. 10, 2020.

(51) Int. Cl.
| | |
|---|---|
| *C07K 14/74* | (2006.01) |
| *A61K 39/00* | (2006.01) |
| *C07K 14/705* | (2006.01) |
| *C40B 30/04* | (2006.01) |

(52) U.S. Cl.
CPC .... *C07K 14/70539* (2013.01); *A61K 39/0011* (2013.01); *C07K 14/705* (2013.01); *C40B 30/04* (2013.01); *C07K 2319/00* (2013.01)

(58) Field of Classification Search
None
See application file for complete search history.

(56) References Cited

U.S. PATENT DOCUMENTS

| | | | |
|---|---|---|---|
| 11,814,420 B2 | 11/2023 | Sgourakis | |
| 2013/0017213 A1 | 1/2013 | Liu et al. | |
| 2013/0171668 A1 | 7/2013 | Loset | |
| 2014/0127251 A1 | 5/2014 | Maeurer | |
| 2018/0180601 A1 | 6/2018 | Pedersen et al. | |
| 2018/0319870 A1 | 11/2018 | Amin | |
| 2021/0155670 A1 | 5/2021 | Sgourakis et al. | |
| 2021/0269503 A1 | 9/2021 | Sgourakis | |
| 2021/0371498 A1 | 12/2021 | Sgourakis | |
| 2021/0371499 A1 | 12/2021 | Sgourakis | |
| 2022/0042008 A1 | 2/2022 | Kleinman | |

FOREIGN PATENT DOCUMENTS

| | | |
|---|---|---|
| EP | 2127664 A1 | 12/2009 |
| WO | WO 2020/010261 | 7/2019 |
| WO | WO 2019/145509 | 8/2019 |
| WO | WO 2021/050792 | 3/2021 |
| WO | WO 2021/138685 | 7/2021 |
| WO | WO 2021/138688 | 7/2021 |
| WO | WO 2021/212085 | 10/2021 |

OTHER PUBLICATIONS

Anjanappa et al (Nature Comm. 2020, 10.1038/s41467-020-14862-4: pp. 1-11) (Year: 2020).*
HLA Nomenclature 2023, 2 pages (Year: 2023).*
ScienceDirect (2024, worldwide web at sciencedirect.com/topics/neuroscience/chaperone#:~:text=Second%20Edition)%2C%202007-,Definition,which%20they%20reside%20and%20function) (Year: 2024).*
Jantz-Neem and Springer (Curr. Opin. Immunol. 2021, 70: 82-89) (Year: 2021).*
International Search Report and Written Opinion for corresponding PCT Application No. PCT/US2019/040616—9 pages (Nov. 18, 2019).
European Search Report for corresponding EP Patent Application No. EP 19831548—2 pages (Apr. 11, 2022).
International Search Report and Written Opinion for related PCT Application No. PCT/US20/50276—23 pages (Mar. 15, 2021).
International Search Report and Written Opinion for related PCT Application No. PCT/US21/12117—17 pages (May 21, 2021).
International Search Report and Written Opinion for related PCT Application No. PCT/US21/27841—15 pages (Oct. 1, 2021).
International Search Report and Written Opinion for related PCT Application No. PCT/US21/12114—17 pages (May 20, 2021).
Dash et al., Nature 547(7661):89-93 (2017).
Stoeckius et al., Nat Methods (9):865-868 (2017).
Takahashi et al., Proc Natl Acad Sci USA 85(9):3105-9 (1998).
Kawakami et al., J Exp Med. 180(1):347-52 (1994).
Natarajan et al., Nat Commun. 8:15260 (2017).
Glanville et al., Nature 547: 94-98 (2017).
Bakker et al., Proc. Natl. Acad. Sci. U. S. A. 105: 3825-3830 (2008).
Saini et al., Proc. Natl. Acad. Sci. U. S. A. 112: 202-207 (2015).
Morozov et al., Proc. Natl. Acad. Sci. U. S. A. 113: E1006-1015 (2016).
Jiang et al., Science 358: 1064-1068 (2017).
Jiang et al., Science 358: Supplemental Material (2017).

(Continued)

*Primary Examiner* — Michael Szperka
*Assistant Examiner* — Marianne Dibrino
(74) *Attorney, Agent, or Firm* — Morgan, Lewis & Bockius LLP

(57) ABSTRACT

Compositions that include peptide receptive MHC class I complexes and methods of making and using such complexes are provided. In particular embodiments, such peptide receptive MHC class I complexes are used to form peptide MHC class I (pMHC-I) multimers useful for high throughput applications, such as, for the detection of antigen specific T cells and characterization of T cell profiles in subjects.

23 Claims, 69 Drawing Sheets
(62 of 69 Drawing Sheet(s) Filed in Color)
Specification includes a Sequence Listing.

(56) References Cited

OTHER PUBLICATIONS

McShan et al., Nat. Chem. Biol. 14: 811-820 (2018).
Khan et al., J. Immunol. 164: 6398-6405 (2000).
Garboczi et al., Proc. Natl. Acad. Sci. 89: 3429-3433 (1992).
Johnson et al., J. Immunol. Baltim. Md 1950 177: 6548-6559 (2006).
Hermann et al., J. Immunol 191: 5743-5750 (2013).
Trautman et al., Euro J Immunol. 32: 3181-3190 (2002).
Jurtz et al., J. Immunol. Baltim. Md 1950 199: 3360-3368 (2017).
Li et al., J. Mol. Biol. 283: 179-191 (1998).
Praest et al., Mol. Immunol., Pergamon, GB, 113 (2018). pp. 103-114.
Overall et al., bioRxiv, pp. 1-31 (2019).
Jurewicz et al., Analytical Biochemistry, Amsterdam NL, 584: (2019). pp. 1-10.
Kotsiou et al., Antioxidants and Redox Signaling. 15:3 (2011). pp. 645-655.
King et al., Cancer Immunol. Immunotherapy 62:6 (2013). pp. 1-20.
Li et al., Vaccine., Amsterdam NL, 28:8 (2010). pp. 1911-1918.
Hermann et al., ELIFE. vol. 4, p. 15 (2015).
O'Rourke et al., Protein Engineering Design. 32:12 (2019). pp. 525-532.
Lumistra et al., Journal of Experimental Medicine. 215:5, 1493-1504 (2018).
Letournour et al., Eur J Immunol. 19(12):2269-74 (1989).
Ohashi et al., Nature 316(6029):606-9 (1985).
Altman et al., Science 274(5284):94-6 (1996).
Arstila et al., Science 286: 958 (1999).
Thomas & Tampé, Science 358: 1060-1064 (2017).
Moritz et al., Science Immunology. 4:37 (2019).
Saini et al., Science Immunology. 4:37 (2019). pp. 1-13.
Nerli et al., Frontiers in Medical Technology. vol. 2 (2020). pp. 10-10.
Neveu et al., International Immunology. vol. 18, No. 7, pp. 1139-1145 (2006).
Hansen "Preparation of Stable Single-Chain Trimers Engineered with Peptide, β2 Microglobulin, and MHC Heavy Chain" CPI 17.5.1-17.5.17 (2009).
Jurewicz "MHC-I peptide binding activity assessed by exchange after cleavage of peptide covalently linked to β2-microglobulin" Ana Bioch 584: 1-26 (2019).
Kalergis et al., "A simplified procedure for the preparation of MHC/peptide tetramers: chemical biotinylation of an unpaired cysteine engineered at the C-terminus of MHC-I." Journal of Immunological Methods 234 pp. 61-70 (2000).
Hafstrand et al., "Successive crystal structure snapshots suggest the basis for M HC class I peptide loading and editing by tapasin." PNAS vol. 116, No. 11, pp. 5055-5060 (2019).
Saini et al., "Dipeptides promote folding and peptide binding of MHC class I molecules." PNAS vol. 110, No. 38, pp. 15383-15388 (2013).
Ostermeir et al., "Coupling between side chain interactions and binding pocket flexibility in HLA-B*44:02 molecules investigated by molecular dynamics simulations." Molecular Immunology, 63:312-319 (2015).

* cited by examiner (SEQ ID NO: 3)
(TAX)
LLFGYPVYV
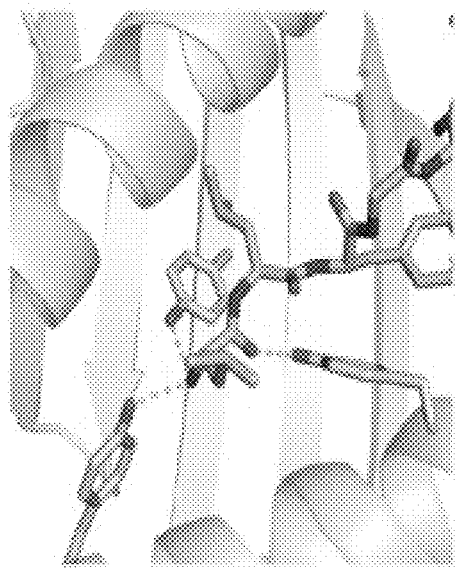
(SEQ ID NO: 4)
(gTAX)
_LFGYPVYV
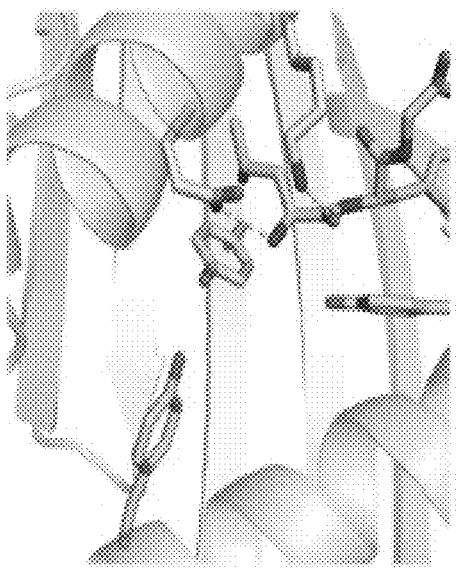
(SEQ ID N: 6)
LLFGYPVYV
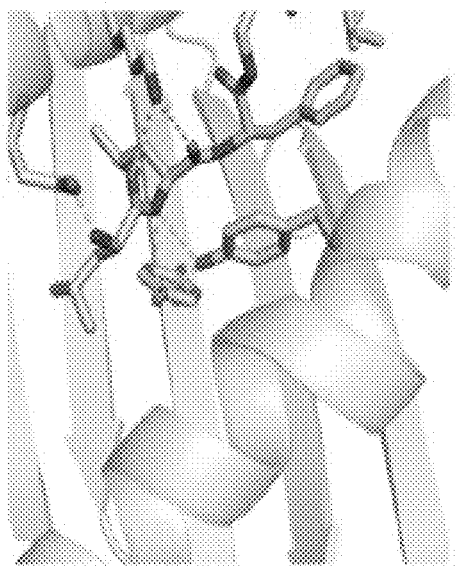
(SEQ ID NO: 5)
Ac-LLFGYPVYV
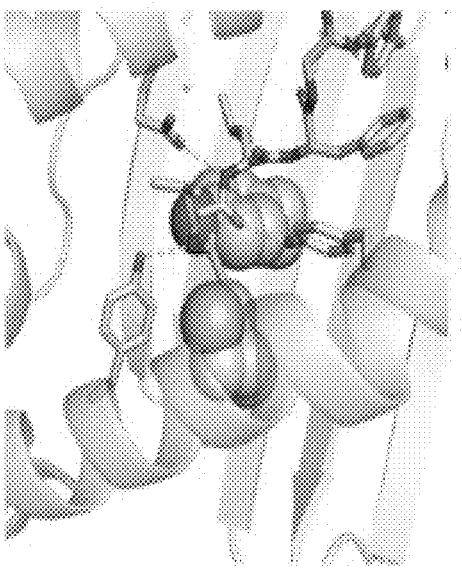
Fig. 3A

```
H-2Dd        181 RTDSPKAHVTHHPRSKGEVTLRCWALGFYPADITLTWQLNGEELTQDMELVETRPAGDGT 240
H-2Ld        181 RTDSPKAHVTHHPRSKGEVTLRCWALGFYPADITLTWQLNGEELTQDMELVETRPAGDGT 240
HLA-A*02:01  181 RTDAPKTHMTHHAVSDHEATLRCWALSFYPAEITLTWQRDGEDQTQDTELVETRPAGDGT 240
                                                 *****  *

H-2Dd        241 FQKWASVVVPLGKEQNYTCRVYHEGLPEPLTLRWEPPPSTDSYMV 285  (SEQ ID NO: 30)
H-2Ld        241 FQKWASVVVPLGKEQNYTCRVYHEGLPEPLTLRWEPPPSTDSYMV 285  (SEQ ID NO:30)
HLA-A*02:01  241 FQKWAAVVVPSGQEQRYTCHVQHEGLPKPLTLRWEPSSQPTIPI- 284  (SEQ ID NO: 31)
```

Fig. 6A

| TRAV | TRAJ | CDR3 | |
|---|---|---|---|
| V16 | J9 | CALMGGTGGFKTIF | (SEQ ID NO: 32) |
| V8-1 | J21 | CAGYNFNKFYF | (SEQ ID NO:33) |
| V13-2 | J15 | CAETLNQAGTALIF | (SEQ ID NO:34) |
| V8-1 | J34 | CAVKDTDKLIF | (SEQ ID NO:35) |
| V8-1 | J34 | CAVKDTDKLIF | (SEQ ID NO:35) |
| V8-1 | J34 | CAVKDTDKLIF | (SEQ ID NO:35) |
| V8-1 | J34 | CAVKDTDKLIF | (SEQ ID NO:35) |
| V26-2 | J54 | CILRDFQGAQKLVF | (SEQ ID NO:36) |

| TRBV | TRBJ | CDR3 | |
|---|---|---|---|
| V7-6 | J2-2 | CASSLYFSAANTGELFF | (SEQ ID NO:37) |
| V5-6 | J2-3 | CASSFFSGGGDTQYF | (SEQ ID NO:38) |
| V6-3 | J2-7 | CASTNIGAVYEQYF | (SEQ ID NO:39) |
| V19 | J2-7 | CASSTLGSIYEQYF | (SEQ ID NO:40) |
| V10-1 | J2-7 | CASSEGPNEQFF | (SEQ ID NO:41) |
| V15 | J2-3 | CATRPLGTQVTDTQYF | (SEQ ID NO:42) |
| V19 | J2-1 | CASSKEILSYNEQFF | (SEQ ID NO:43) |
| V11-2 | J2-1 | CASSKEILSYNEQFF | (SEQ ID NO:43) |

Fig. 7E

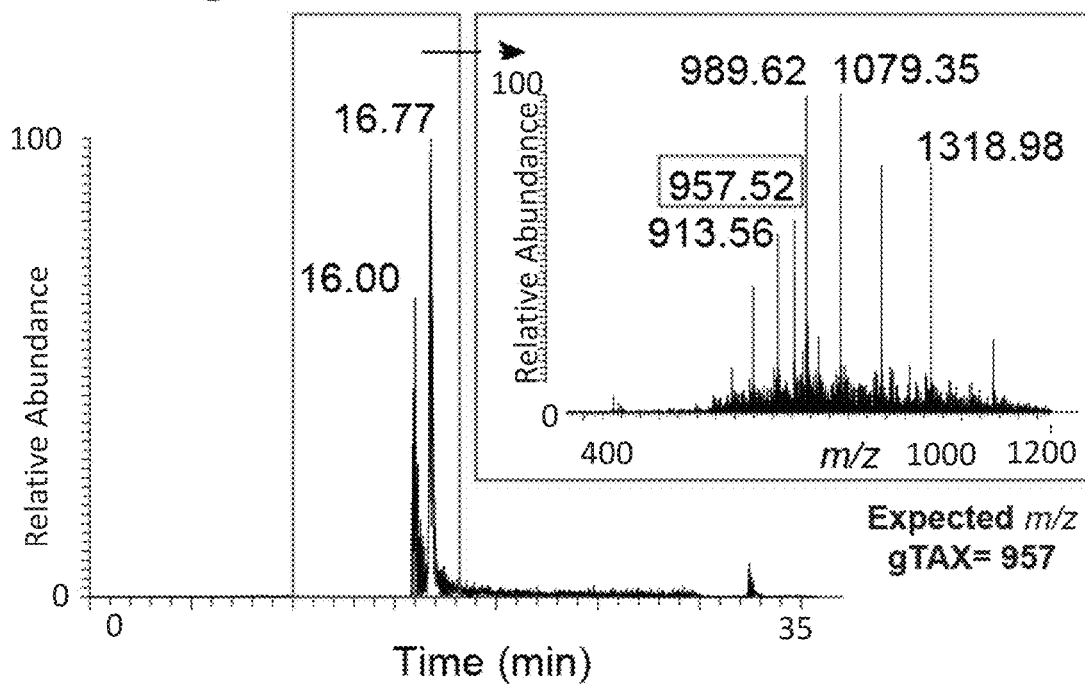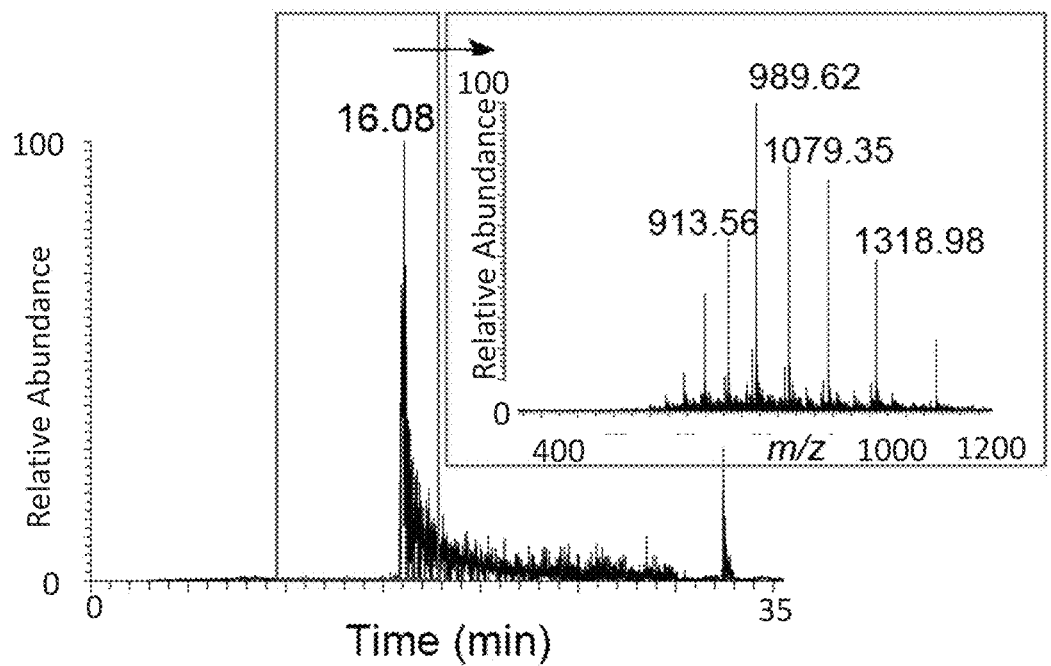
Fig. 9B

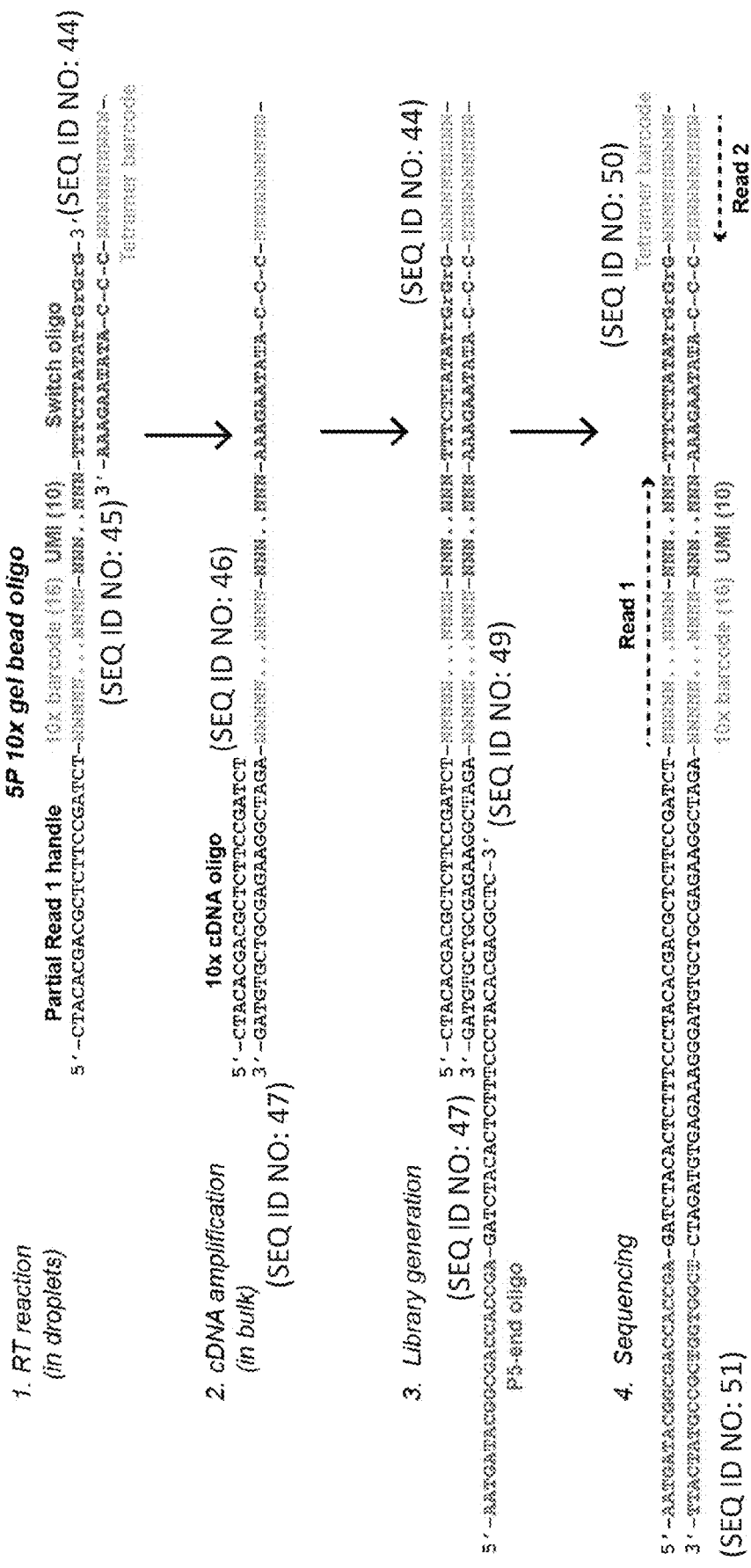

|  | PHOTOSENSITIVE PEPTIDE | DISULFIDE MUTANT | GOLDILOCKS PEPTIDE |
| --- | --- | --- | --- |
| Yield per 1 L of refolding solution** | 4.0 ± 0.5 mg | 0.5 ± 0.2 mg | 5.0 ± 1.5 mg |
| Peptide exchange efficiency | 30-40% | 80-90% | 80-90% |
| Total pMHC yield | 1.6 mg | 0.4 mg | 4 mg |

\* The proteins were refolded, concentrated and purified with size-exclusion and ion exchange chromatography
\*\* Data shown is representative of triplicate assays and error-bars are standard deviation from the mean.

Fig. 19

| Peptide | TAPBPR exchange T$_m$ (°C) | photo exchange T$_m$ (°C) | IC$_{50}$ (nM) |
|---|---|---|---|
| NB1 | 58.8 ± 0.7 | 57.1 ± 0.1 | 13 |
| NB2 | 61.7 ± 0.7 | 58.7 ± 0.2 | 21 |
| NB3 | 61.7 ± 0.7 | 57.6 ± 0.8 | 9 |
| NB4 | 60.7 ± 0.7 | 58.1 ± 0.1 | 8 |
| NB5 | 59.8 ± 0.7 | 59.3 ± 0.3 | 21 |
| NB6 | 57.3 ± 0 | 53.9 ± 0.3 | 28 |
| NB7 | 60.2 ± 0 | 59.7 ± 0.2 | 30 |
| NB8 | 58.3 ± 0 | 58.2 ± 0.5 | 3 |
| NB9 | 59.8 ± 0.7 | 58.7 ± 0.4 | 4 |
| NB10 | 61.7 ± 0.7 | 58.5 ± 0.8 | 241 |
| NB11 | 63.7 ± 0.7 | 62.0 ± 0 | 6 |
| NB12 | 62.2 ± 1.4 | 60.2 ± 0.3 | 9 |
| NB13 | 58.8 ± 0.7 | 58.0 ± 0.4 | 26 |
| NB14 | 57.3 ± 1.4 | 56.8 ± 0.2 | 96 |
| NB15 | 61.2 ± 0 | 58.1 ± 0.4 | 18 |
| NB16 | 63.2 ± 0 | 61.1 ± 0.3 | 6 |
| NB17 | 64.2 ± 0 | 63.0 ± 0.03 | 3.4 |
| NB18 | 64.2 ± 0 | 61.1 ± 0.5 | 19 |
| NB19 | 61.7 ± 0.7 | 61.1 ± 0.4 | 33 |
| NB20 | 60.2 ± 0 | 60.5 ± 0.1 | 42 |
| NB21 | 58.8 ± 0.7 | 58.3 ± 0.2 | 48 |
| NB22 | 59.3 ± 0 | 58.6 ± 0.1 | 13 |
| NB23 | 60.7 ± 0.7 | 58.5 ± 0.5 | 13 |
| NB24 | 63.2 ± 1.4 | 60.8 ± 0.3 | 3 |
| NB25 | 63.7 ± 0.7 | 61.8 ± 0.3 | 14 |
| NB26 | 61.7 ± 0.7 | 60.1 ± 0.1 | 19 |
| NB27 | 53.3 ± 0 | 54.4 ± 0.2 | 480 |
| NB28 | 52.3 ± 0 | 52.7 ± 0.2 | 635 |
| NB29 | 58.3 ± 0 | 57.3 ± 0.1 | 4 |
| MART1 (reference) | 58.2 ± 0 | 56.1 ± 0.5 | 254 |

Fig. 20

| Peptide | Epitope | Sequence | Tm (°C) | IC₅₀ | |
|---|---|---|---|---|---|
| EBV BMRF1 | 208-216 | TLDYKPLSV | 51.3 ± 0 | 36 | (SEQ ID NO: 59) |
| EBV BRLF1 | 109-117 | YVLDHLIVV | 55.3 ± 0 | 4 | (SEQ ID NO: 60) |
| EBV EBNA3c | 284-293 | LLDFVRFMGV | 55.3 ± 3.0 | 54 | (SEQ ID NO: 61) |
| EBV LMP-1 | 159-167 | YLQQNWWTL | 54.3 ± 0 | 9 | (SEQ ID NO: 62) |
| HCMV IE1 | 81-89 | VLAELVKQI | 50.3 ± 1.0 | 154 | (SEQ ID NO: 63) |
| Influenza PB1 | 413-421 | NMLSTVLGV | 60.2 ± 0 | 10 | (SEQ ID NO: 64) |
| HCMV pp65 | 155-163 | QMWQARLTV | 53.3 ± 0 | 81 | (SEQ ID NO: 65) |
| HBV core | 19-27 | FLPSDFFPSV | 62.2 ± 0 | 4 | (SEQ ID NO: 66) |
| HBV Pol | 575-583 | FLLSLGIHL | 53.3 ± 1.0 | 9 | (SEQ ID NO: 67) |
| HIV Gag | 77-85 | SLYNTVATL | 50.8 ± 0.5 | 54 | (SEQ ID NO: 68) |
| HIV Vif | 101-109 | GLADQLIHL | 60.2 ± 0 | 10 | (SEQ ID NO: 69) |
| Influenza NS1 | 1122-1130 | AIMDKNIIL | 52.8 ± 0.5 | 54 | (SEQ ID NO: 70) |
| Influenza PA | 70-78 | ALLKHRFEI | 53.3 ± 0 | 37 | (SEQ ID NO: 71) |
| HCV Core | 132-140 | DLMGYIPAV | 52.3 ± 0 | 10 | (SEQ ID NO: 72) |
| gp100 | 209-217 | IMDQVPFSV | 54.3 ± 0 | 6 | (SEQ ID NO: 73) |
| gp100 | 209-217 (210T) | ITDQVPFSV | 50.3 ± 0 | 102 | (SEQ ID NO: 74) |
| NY-ESO-1 | 157-165 | SLLMWITQA | 51.3 ± 0 | 26 | (SEQ ID NO: 75) |
| MAGE-A10 | 254-262 | GLYDGMEHL | 53.3 ± 0 | 9 | (SEQ ID NO: 76) |
| MAGE-A3 | 271-279 | FLWGPRALV | 53.3 ± 0 | 12 | (SEQ ID NO: 77) |
| MAGE-A1 | 278-286 | KVLEYVIKV | 61.7 ± 0.5 | 7 | (SEQ ID NO: 78) |
| GAD65 | 114-122 | VMNILLQYV | 47.3 ± 0 | 23 | (SEQ ID NO: 79) |
| IA-2 | 805-813 | VIVMLTPLV | 47.8 ± 0.5 | 72 | (SEQ ID NO: 80) |
| IGRP | 228-236 | LNIDLLWSV | 53.8 ± 0.5 | 243 | (SEQ ID NO: 81) |
| IGRP | 265-273 | VLFGLGFAI | 50.3 ± 0 | 16 | (SEQ ID NO: 82) |
| Prepro-insulin | 15-24 | ALWGPDPAAA | 53.3 ± 0 | 234 | (SEQ ID NO: 83) |
| Insulin b | 10-18 | HLVEALYLV | 61.2 ± 0 | 7 | (SEQ ID NO: 84) |
| MBP | 110-118 | SLSRFSWGA | 47.8 ± 0.5 | 24 | (SEQ ID NO: 85) |
| HCV core | 35-44 | YLLPRRGPRL | 53.3 ± 0 | 245 | (SEQ ID NO: 86) |
| HCV NS3 | 1406-1415 | KLSGLGINAV | 60.2 ± 0 | 41 | (SEQ ID NO: 87) |
| HCV NS4b | 1807-1816 | LLFNILGGWV | 55.3 ± 0 | 49 | (SEQ ID NO: 88) |
| HPV16 E7 | 12-20 | MLDLQPETT | 43.9 ± 0.5 | 1812 | (SEQ ID NO: 89) |
| CMV pp65 | 496-503 | NLVPMVATV | 55.3 ± 0 | 25 | (SEQ ID NO: 90) |
| HTLV | 11-19 | LLFGYPVYV | 61.2 ± 0 | 3 | (SEQ ID NO: 91) |
| MART1 (reference) | 26-35 | ELAGIGILTV | 58.2 ± 0 | 254 | (SEQ ID NO: 92) |

Fig. 21

| Oligo | Sequence |
|---|---|
| Tetramer barcode oligos | /5biosg/GTCTCGTGGGCTCGGAGATGTGTATAAGAGACAG (SEQ ID NO: 93) xxxxxxxxxxCCCATATAAGAAA (SEQ ID NO: 45) |
| tetramer additive | GTCTCGTGGGCTCGGAGATG (SEQ ID NO: 24) |
| DMF5_PCR1 | GAAATTCACGGGCGCACAGG (SEQ ID NO: 25) |
| DMF5_PCR2 | CCTTGGCACCCGAGAATTCCAGCTTGGCTGCTCTGATC (SEQ ID NO: 26) |
| P5 Generic | AATGATACGGCGACCACCGAGATCTACAC (SEQ ID NO: 27) |
| RPIx | CAAGCAGAAGACGGCATACGAGATxxxxxxxGTGACTGGAGTT CCTTGGCACCCGAGAATTCCA (SEQ ID NO: 28) |
| Tet_bulk_oligo | CTACACGACGCTCTTCCGATCTNNNNNNNNNTTCTTATATGGG (SEQ ID NO: 95) |
| 10x_5P_RT | AAGCAGTGGTATCAACGCAGAGTACGAGACTTTTTTTTTTTTTT TTTTTTTTTTTVN (SEQ ID NO: 96) |
| N7xx | CAAGCAGAAGACGGCATACGAGATxxxxxxxGTCTCGTGGGCTCGG (SEQ ID NO: 97) |
| 10x_PCR_F | CTACACGACGCTCTTCCGATCT (SEQ ID NO: 11) |
| 10x_PCR_R | AAGCAGTGGTATCAACGCAGAGTACAT (SEQ ID NO: 49) |
| 10x_SI_PCR | AATGATACGGCGACCACCGAGATCTACACTCTTTCCCTACACGACGC*T*C (SEQ ID NO: 49) |
| 10x Chromium i7 index | CAAGCAGAAGACGGCATACGAGATxxxxxxxGTGACTGGAGTTCAGACGTGT (SEQ ID NO: 98) |
| 10x Human T Cell Mix 1 F | AATGATACGGCGACCACCGAGATCTACACTCTTTCCCTACACGACGCTC (SEQ ID NO: 49) |
| 10x Human T Cell Mix 1 R | TGAAGGCGTTTGCACATGCA (SEQ ID NO: 99) |
| 10x Human T Cell Mix 2 F | TCAGGCAGTATCTGGAGTCATTGAG (SEQ ID NO: 100) |
| 10x Human T Cell Mix 2 R | AATGATACGGCGACCACCGAGATCT (SEQ ID NO: 101) |
| 10x Human T Cell Mix 1 F | AGTCTCTCAGTCTGGTACACG (SEQ ID NO: 102) |
| 10x Human T Cell Mix 2 R | TCTGATGGCTCAAACACAGC (SEQ ID NO: 48) |

Fig. 22

PEPTIDE-RECEPTIVE MHC-I COMPLEX COMPOSITIONS AND METHODS

CROSS REFERENCE TO RELATED APPLICATIONS

The present disclosure claims priority to U.S. Provisional Patent Application No. 63/011,221, filed on Apr. 16, 2020, U.S. Provisional Application Ser. No. 63/047,812, filed Jul. 2, 2020, and U.S. Provisional Patent Application No. 63/076,601, filed on Sep. 10, 2020, which are hereby incorporated by reference in their entirety.

STATEMENT OF SUPPORT

This invention was made with Government support under Grant Nos. 5R01AI143997 and 5R35GM125034, awarded by the National Institutes of Health. The Government has certain rights in the invention.

REFERENCE TO SEQUENCE LISTING SUBMITTED ELECTRONICALLY

The sequence listing contained in the file named "116550-01-5013-US Corrected Sequence Listing.txt", created on Feb. 20, 2025, and having a size of 24,790 bytes, has been submitted electronically herewith via EFS-Web, and the contents of the txt file are hereby incorporated by reference in their entirety.

BACKGROUND

Cytotoxic T cell activation occurs when a T cell, via its T cell receptor (TCR), recognizes an antigen peptide-MHC class I complex on an antigen presenting cell. Such TCR/peptide-MHC class I interactions are important, for example, for adaptive immunity against pathogens, for the recognition and elimination of tumor cells, as well as the pathogenesis of particular diseases (e.g., autoimmune diseases).

Antigen peptide-MHC class I multimer complexes are useful for the identification of antigen specific T cells, and antigens that activate such T cells. The identification of antigen specific T cells and corresponding antigens can then be used, for example, for the understanding of disease development, as well as in the development of T-cell based therapies (e.g., cancers), in both preclinical and clinical settings.

High-throughput screening strategies using large arrays of peptide-MHC class I multimers can advantageously allow for the large scale identification of antigen specific T-cells and/or antigens that bind to particular MHC class I. Such high-throughput screens, however, are limited by the ability to produce large collections of peptide-MHC class I multimers. The instability of peptide-deficient MHC class I molecules, for example, makes large scale production of peptide-MHC class I multimers using such peptide-deficient MHC class I molecules difficult to achieve.

To circumvent the problem of unstable peptide-deficient MHC class I molecules, conditional MHC class I ligands are used. See, e.g., Rodenko et al., Nature Protocols 1(3): 1120-1132 (2006). Such conditional ligand bound to MHC class I can be cleaved by exposure to UV light, or to increased temperature (See, e.g., Luimstra et al., *J. Exp. Med,* 2018). Upon cleavage and in the presence of a peptide of interest, a net exchange occurs wherein the cleaved conditional ligand dissociates with the MHC class I and the peptide of interest associates with the MHC class I, thereby forming the desired peptide-MHC class I complex. Such conditional ligands, however, also have limitations. Conditional ligands almost always result in some sample aggregation and precipitation during the photolysis/peptide exchange step, due to the unstable nature of the transient peptide-deficient MHC. Moreover, using suboptimal peptides can lead to high background levels of exchange. As such, there remains a need for new methods of making peptide-MHC class I complex libraries.

SUMMARY

Compositions that include stable peptide-deficient MHC class I/chaperone complexes and methods of making and using such complexes are provided. In particular embodiments, such peptide-deficient MHC class I/chaperone complexes are used to form peptide MHC class I (pMHC-I) multimers useful for high throughput applications, such as, for the detection of antigen specific T cells and characterization of T cell profiles in subjects.

In a first aspect, provided herein is a method of making a plurality of peptide receptive MHC-I complexes each of which can accept a peptide of interest, each peptide receptive MHC-I complex includes an MHC class I heavy chain and an β2-microglobulin. The method includes the steps of a) incubating a plurality of MHC class I heavy chains that include one of HLA-A*24:02 and HLA-A*68:02; a plurality of β2-microglobulins; and a plurality of placeholder peptides that include placeholder peptides have the sequence YPLFGWCF (SEQ ID NO:1) or LFGPVYV (SEQ ID NO:2), under conditions wherein the plurality of MHC class I heavy chains, the β2-microglobulins and the plurality placeholder peptides form a plurality of placeholder peptide-MHC class I (p*MHC-I) complexes; and b) contacting the p*MHC-I complexes with a plurality of dipeptides and chaperones, thereby creating the plurality of peptide receptive MHC-I complexes.

In some embodiments, all or substantially all of the MHC class I heavy chains in the plurality of MHC-I heavy chains are HLA-A*24:02 and all or substantially all of the placeholder peptides in the plurality placeholder peptides have the sequence YPLFGWCF (SEQ ID NO:1).

In some embodiments, all or substantially all of the MHC class I heavy chains in the plurality of MHC-I heavy chains are HLA-A*68:02 and all or substantially all of the placeholder peptides in the plurality placeholder peptides have the sequence LFGPVYV (SEQ ID NO:2).

In certain embodiments, at least a subset of the dipeptides are glycyl-methionine or glycyl-phenylalanine. In some embodiments substantially all of the dipeptides are glycyl-methionine and glycyl-phenylalanine. In certain embodiments, all or substantially all of the dipeptides are glycyl methionine or substantially all of the dipeptides are glycyl-phenylalanine.

In some embodiments, all or substantially all of the chaperones are TAPBPR.

In certain embodiments, the amount of chaperone is sufficient to convert at least 95% of the MHC class I molecules to peptide receptive MHC-I complexes.

In some embodiments, the molar ratio of chaperone to p*MHC-I is greater than 1:1. In some embodiments, the molar ratio of chaperone to p*MHC-I is less than 1:1. In certain embodiments, the molar ratio of chaperone to p*MHC-I is less than 1:2, less than 1:10, less than 1:50, less than 1:100, less than 1:500, or less than 1:1000.

In another aspect, provided herein is a method of making a plurality of peptide-MHC class I (pMHC-I) complexes, each complex comprising an MHC Class I heavy chain, a β2-microglobulin, and a peptide of interest. The method includes the steps of a) incubating a plurality of MHC class I heavy chains that include one of HLA-A*24:02 and HLA-A*68:02; a plurality of β2-microglobulins; and a plurality of placeholder peptides that include placeholder peptides having the sequence YPLFGWCF (SEQ ID NO:1) or LFGPVYV (SEQ ID NO:2), under conditions wherein the plurality of MHC class I heavy chains, the plurality β2-microglobulins and the plurality placeholder peptides form a plurality of placeholder peptide-MHC class I (p*MHC-I) complexes; b) forming a plurality of peptide receptive MHC-I complexes by contacting the plurality of p*MHC-I complexes with a plurality of dipeptides and chaperones; and c) contacting the plurality of peptide receptive MHC-I complexes with a plurality of peptides of interest, thereby forming the plurality of pMHC-I complexes.

In some embodiments, all or substantially all of the MHC class I heavy chains in the plurality of MHC-I heavy chains are HLA-A*24:02 and substantially all of the placeholder peptides in the plurality placeholder peptides have the sequence YPLFGWCF (SEQ ID NO:1).

In some embodiments, all or substantially all of the MHC class I heavy chains in the plurality of MHC-I heavy chains are HLA-A*68:02 and substantially all of the placeholder peptides in the plurality placeholder peptides have the sequence LFGPVYV (SEQ ID NO:2).

In certain embodiments, at least a subset of the dipeptides are glycyl-methionine or glycyl-phenylalanine. In some embodiments substantially all of the dipeptides are glycyl-methionine and glycyl-phenylalanine. In certain embodiments, all or substantially all of the dipeptides are glycyl methionine or substantially all of the dipeptides are glycyl-phenylalanine.

In some embodiments, all or substantially all of the chaperones are TAPBPR.

In certain embodiments, the amount of chaperone is sufficient to convert at least 95% of the MHC class I molecules to peptide receptive MHC-I complexes.

In some embodiments, the molar ratio of chaperone to p*MHC-I is greater than 1:1. In some embodiments, the molar ratio of chaperone to p*MHC-I is less than 1:1. In certain embodiments, the molar ratio of chaperone to p*MHC-I is less than 1:2, less than 1:10, less than 1:50, less than 1:100, less than 1:500, or less than 1:1000.

In some embodiments, all the peptides of interest in the plurality of the peptides of interest have the same sequence. In some embodiments, at least two of the peptides of interest in the plurality of peptides of interest have different sequences. In some embodiments, the plurality of peptides of interest comprise tumor antigen peptides, viral derived peptides, bacterially derived peptides, or self-antigen derived peptides.

In another aspect, provided herein is a method of making a plurality of peptide-MHC class I (pMHC-I) multimer complexes, each complex that include an MHC class I multimer and a peptide of interest. The method includes the steps of: a) incubating a plurality of MHC class I heavy chains that include one of HLA-A*24:02 and HLA-A*68:02; a plurality of β2-microglobulins; and a plurality of placeholder peptides that include placeholder peptides having the sequence YPLFGWCF (SEQ ID NO:1) or LFGPVYV (SEQ ID NO:2), under conditions wherein the plurality of MHC class I heavy chains, the β2-microglobulins and the plurality of placeholder peptides form a plurality of placeholder peptide-MHC class I (p*MHC-I) complexes; b) contacting the plurality of p*MHC-I complexes with a plurality of dipeptides and chaperones, thereby forming a plurality of peptide receptive MHC-I complexes; c) attaching the plurality of peptide receptive MHC-I complexes to multimer backbones, thereby forming a plurality of peptide receptive MHC-I multimers; and d) contacting the plurality of peptide receptive MHC-I multimers with a plurality of peptides of interest, thereby forming a plurality of pMHC-I multimer complexes.

In one aspect, provided herein is a method of making a plurality of peptide-MHC class I (pMHC-I) multimer complexes, each complex having an MHC class I multimer and a peptide of interest. The method includes the steps of: a) providing a plurality of placeholder peptide-MHC class I (p*MHC-I) complexes, wherein at least a subset of the plurality of p*MHC-I complex comprises an MHC class I heavy chain comprising one of HLA-A*24:02 and HLA-A*68:02, an β2-microglobulin, and a placeholder peptides have the sequence YPLFGWCF (SEQ ID NO:1) or LFGPVYV (SEQ ID NO:2); b) contacting the plurality of p*MHC-I complexes with a plurality of chaperones, dipeptides, multimer backbones, and peptides of interest under conditions to form a plurality of peptide-MHC class I multimer complexes, thereby forming a plurality of peptide-MHC class I multimer complexes; and c) recovering the plurality of peptide-MHC class I multimer complexes.

In some embodiments, all or substantially all of the MHC class I heavy chains in the plurality of MHC-I heavy chains are HLA-A*24:02 and all or substantially all of the placeholder peptides in the plurality placeholder peptides have the sequence YPLFGWCF (SEQ ID NO:1).

In some embodiments, all or substantially all of the MHC class I heavy chains in the plurality of MHC-I heavy chains are HLA-A*68:02 and all or substantially all of the placeholder peptides in the plurality placeholder peptides have the sequence LFGPVYV (SEQ ID NO:2).

In certain embodiments, at least a subset of the dipeptides are glycyl-methionine or glycyl-phenylalanine. In some embodiments substantially all of the dipeptides are glycyl-methionine and glycyl-phenylalanine. In certain embodiments, all or substantially all of the dipeptides are glycyl methionine or substantially all of the dipeptides are glycyl-phenylalanine.

In some embodiments, all or substantially all of the chaperones are TAPBPR.

In certain embodiments, the amount of chaperone is sufficient to convert at least 95% of the MHC class I molecules to peptide receptive MHC-I complexes.

In some embodiments, the molar ratio of chaperone to p*MHC-I is greater than 1:1. In some embodiments, the molar ratio of chaperone to p*MHC-I is less than 1:1. In certain embodiments, the molar ratio of chaperone to p*MHC-I is less than 1:2, less than 1:10, less than 1:50, less than 1:100, less than 1:500, or less than 1:1000.

In some embodiments, all the peptides of interest in the plurality of the peptides of interest have the same sequence. In some embodiments, at least two of the peptides of interest in the plurality of peptides of interest have different sequences. In some embodiments, the plurality of peptides of interest comprise tumor antigen peptides, viral derived peptides, bacterially derived peptides, or self-antigen derived peptides.

In some embodiments, each of the MHC multimer-peptide complexes is further attached to a barcode DNA oligo. In some embodiments, the multimer backbones are selected from streptavidin, avidin and dextran backbones. In some embodiments, the peptide-MHC class I multimers are tetramers. In some embodiments, the p*MHC-I complexes are biotinylated.

In some embodiments, the method further includes the step of removing free chaperones after the chaperones convert the p*MHC-I complexes to activated pMHC-I complexes. In some embodiments, free chaperones are removed by spin column dialysis.

In another aspect, provided herein is a peptide receptive MHC-I complex produced by any of the methods provided herein.

In one aspect, provided herein is a composition that includes: a) a plurality of MHC class I heavy chains that include one of HLA-A*24:02 and HLA-A*68:02; b) a plurality of β2-microglobulins; c) a plurality of placeholder peptides comprising placeholder peptides have the sequence YPLFGWCF (SEQ ID NO:1) or LFGPVYV (SEQ ID NO:2); and d) a plurality of chaperones.

In some embodiments, all or substantially all of the MHC class I heavy chains in the plurality of MHC-I heavy chains are HLA-A*24:02 and all or substantially all of the placeholder peptides in the plurality placeholder peptides have the sequence YPLFGWCF (SEQ ID NO:1).

In some embodiments, all or substantially all of the MHC class I heavy chains in the plurality of MHC-I heavy chains are HLA-A*68:02 and all or substantially all of the placeholder peptides in the plurality placeholder peptides have the sequence LFGPVYV (SEQ ID NO:2).

In certain embodiments, at least a subset of the dipeptides are glycyl-methionine or glycyl-phenylalanine. In some embodiments substantially all of the dipeptides are glycyl-methionine and glycyl-phenylalanine. In certain embodiments, all or substantially all of the dipeptides are glycyl methionine or substantially all of the dipeptides are glycyl-phenylalanine.

In some embodiments, the plurality of MHC class I heavy chains, plurality of β2-microglobulins, and plurality of placeholder peptides form a plurality of peptide-MHC class I (p*MHC-I) complexes.

In some embodiments, the molar ratio of chaperone to p*MHC-I is greater than 1:1. In some embodiments, the molar ratio of chaperone to p*MHC-I is less than 1:1. In certain embodiments, the molar ratio of chaperone to p*MHC-I is less than 1:2, less than 1:10, less than 1:50, less than 1:100, less than 1:500, or less than 1:1000.

In certain embodiments, the molar ratio of MHC class I heavy chains to β2-microglobulins is less than 1:3.

In some embodiments, at least a subset of the plurality of peptide p*MHC-I complexes was contacted by a chaperone and is in a configuration that can accept a peptide of interest.

In some embodiments, one or more of the plurality of peptide receptive MHC-I complexes further comprises a placeholder peptide.

In certain embodiments, one or more of the plurality of peptide receptive MHC-I complexes lacks a chaperone.

In some embodiments, all or substantially all of chaperones are TAPBPR.

In another aspect, provided herein is a composition that includes a plurality of peptide receptive MHC-I complexes configured to accept a peptide of interest, wherein at least a subset of the plurality of peptide receptive MHC-I complexes includes: a) a plurality of MHC class I heavy chains comprising one of HLA-A*24:02 and HLA-A*68:02; b) a plurality of β2-microglobulins; and c) a plurality of placeholder peptides comprising placeholder peptides have the sequence YPLFGWCF (SEQ ID NO:1) or LFGPVYV (SEQ ID NO:2).

In one aspect, provided herein is a composition that includes a plurality of peptide receptive MHC-I complexes configured to accept a peptide of interest, wherein at least a subset of the plurality of peptide receptive MHC-I complexes includes: a) a plurality of MHC class I heavy chains comprising one of HLA-A*24:02 and HLA-A*68:02; b) a plurality of β2-microglobulins; and c) a plurality of placeholder peptides comprising placeholder peptides have the sequence YPLFGWCF (SEQ ID NO:1) or LFGPVYV (SEQ ID NO:2).

In some embodiments, the plurality of peptide receptive MHC-I complexes were contacted with a chaperone. In some embodiments, the composition was subjected to a process that removes free chaperones. In some embodiments, the process includes dialysis. In some embodiments, the process includes spin column dialysis.

In some embodiments, all or substantially all of the MHC class I heavy chains in the plurality of MHC-I heavy chains are HLA-A*24:02 and where all or substantially all of the placeholder peptides have the sequence YPLFGWCF (SEQ ID NO:1).

64. The composition of any one of claims 60-62, wherein all or substantially all of the MHC class I heavy chains in the plurality of MHC-I heavy chains are HLA-A*68:02 and where all or substantially all of the placeholder peptides have the sequence LFGPVYV (SEQ ID NO:2).

In some embodiments, the composition is at least 90%, at least 95%, at least 98%, at least 99%, at least 99.9% or 100% free chaperones.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

High-throughput screening strategies using large arrays of peptide-MHC class I multimers can allow for the large scale identification of antigen specific T cells and/or antigens that bind to particular MHC class Is (e.g., tumor antigens). Identification of such antigen specific T cells and/or antigens can in turn lead to the understanding of the pathogenesis of particular diseases, as well as the development of novel therapies.

Insets focus on the A-pocket of the MHC-I peptide binding groove, with polar contacts between the N-terminal residue of the peptide and the indicated MHC-I residues shown as dotted yellow lines. Full peptide sequences are provided, with the first residue indicated in green.

FIG. 3A-FIG. 3G depict the capturing empty HLA-A*02: 01/TAPBPR complexes for peptide exchange. (A) Structure-based design of goldilocks peptides: comparison of polar contacts between HLA-A*02:01 and the N-terminal region of LLFGYPVYV_(SEQ ID NO:3) (TAX) peptide (upper left). _LFGYPVPYV(SEQ ID NO:4) (gTAX) (upper right), Ac-LLFGYPVYV (SEQ ID NO:3) (bottom right) and 1LFGYPVYV (SEQ ID NO:21) where 1=D-Leucine (bottom left). Structures were modeled using PDB ID 1DUZ[26]. (B) Peptide complex thermal stabilities of HLA-A*02:01 bound to TAX, 1LFGYPVYV (SEQ ID NO:21) Ac-LL-FGYPVYV (SEQ ID NO:3) and gTAX. (C) SEC TAPBPR binding assays of TAX/HLA-A02:01 (left), gTAX/HLA-A02:01 (right). (D) Native gel electrophoresis of HLA-A*02:01/TAPBPR complex incubated with a 10-fold molar excess of a nonspecific peptide (p29, YPNVNIHNF)(SEQ ID NO:9) or varying molar excess of a specific, high-affinity peptide (TAX). 12% polyacrylamide native gels were run at 90 V for 5 h at 4° C. before visualization with InstantBlue (Expedeon). Data shown are representative of triplicate gel assays. (E) Competitive binding of TAMRA-TAX to purified HLA-A*02:01/TAPBPR complexes from (C) as a function of increasing peptide concentration, measured by fluorescence polarization. (F) Conceptual diagram of TAPBPR-mediated capture and peptide loading on empty MHC-I molecules. (G) Bio-Layer Interferometry analysis of TAPBPR dissociation from HLA-A*02:01 in the presence of peptides of different affinities. Data shown in (E) and (G) are representative of triplicate assays (n=3) and error-bars are standard deviations from the mean.

Figure 4:
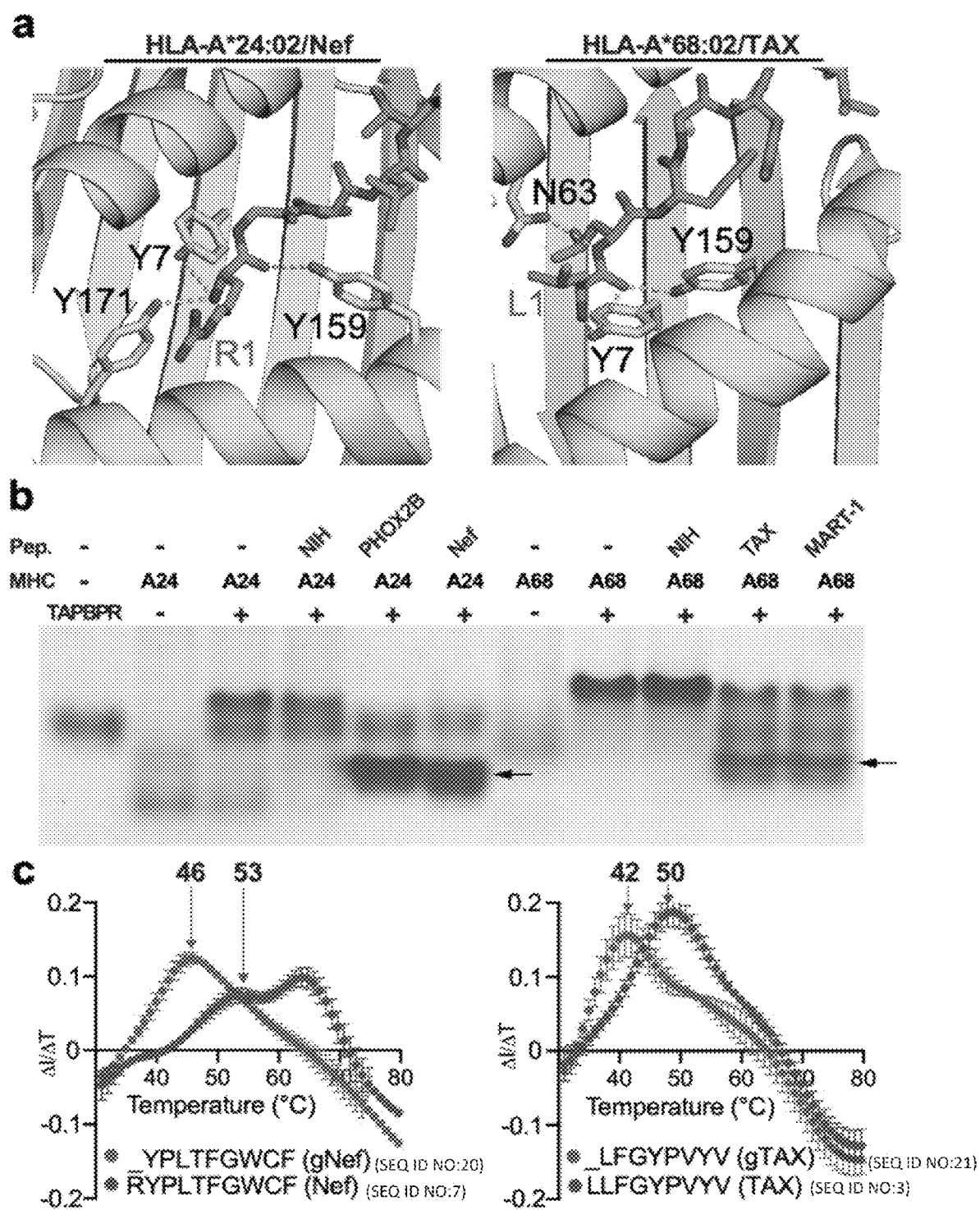

FIG. 4A-FIG. 4C depict TAPBPR-mediated peptide exchange on HLA-A*24:02 and HLA-A*68:02. (a) Structure-based design of goldilocks peptides: analysis of A-pocket hydrogen bonds observed in the X-ray structure of HLA-A*24:02/Nef$_{134-10}$ (RYPLTFGWCF)(SEQ ID NO:7) and homology-based model of HLA-A*28:02/TAX (LL-FGYPVYV) (SEQ ID NO:3). Peptide residues are labelled in red, A-pocket MHC residues in black. The structure of HLA-A*24:02/Nef$_{134-10}$ was obtained from PDB ID 3QZW (Shi, et al., Mol Immunol 48:2198-2202 (2011)). The structure of HLA-A*68:02/TAX was modeled using a related structure (PDB ID 4HX1 (Niu et al., Mol Immunol 55:381-392 (2013)) as input. (b) Native gel electrophoresis analysis showing MHC-I/TAPBPR complex dissociation in the presence of 10-fold molar excess of relevant, high-affinity peptides PHOX2B (QYNPIRTTF)(SEQ ID NO:8), Nef$_{134-10}$ (lanes 5 and 6) and TAX, MART-1 (lanes 10 and 11) for complexes prepared using refolded HLA-A*24:02 and HLA-A*68:02 with gNEF (lane 2) and gTAX (lane 7) goldilocks peptides, respectively (protein yields of approximately 6 and 8 mg from a 1 L refolding reaction). The exchanged pMHC molecular species on lanes 5, 6, 10 and 11 are indicated with arrows, showing electrophoretic mobilities that depend on the charge of the bound peptide. Both complexes remain bound in the presence of 10-fold molar excess of the irrelevant peptide p29 (YPNVNIHNF)(SEQ ID NO:9) (lanes 4 and 9). 12% polyacrylamide native gels were run at 90 V for 5 h at 4° C. before visualization with InstantBlue (Expedeon). Data shown are representative of triplicate gel assays. All protein samples used in (a) and (b) were derived from the same peptide exchange experiment, and the gels were processed in parallel. (c) Overlaid Differential Scanning Fluorimetry temperature profiles of: goldilocks/MHC-I (red) and high-affinity peptide/HIC-I (blue) prepared using chaperone-mediated exchange of the goldilocks for high-affinity peptides, followed by purification of the pNMC peak by SEC. Thermal stabilities are shown: HLA-A*24:02 refolded with gNEF (YPLTFGWCF (SEQ ID NO:20)) or exchanged with NEF (RYPLTFGWCF)(SEQ ID NO:7) (left), and HLA-A*68:02 refolded with gTAX (LFGYPVYV (SEQ ID NO:21)) or exchanged with TAX (LLFGYPVYV) (SEQ ID NO:3) (right). The peaks at approximately 63° C. correspond to the thermal melt of the $\beta_2$m light chain (Hellman et al., J Immunol Methods 432: 95-101 (2016)). Data shown are representative of triplicate assays and error-bars are standard deviation from the mean.

FIG. 5A-FIG. 5D depict flow cytometry analysis using TAPBPR-exchanged pMHC-I tetramers. (A) Representative flow cytometric analysis of top row; murine cells expressing the B4.3.2 TCR, middle row; DMF5 human T cells expressing the MART-1 TCR, bottom row; NY-ESO-1 human T cells expressing the NY-ESO-1 TCR. Columns depict staining with a fixed excess (1 µg/mL) of P18-I10/H2-D$^d$, MART-1/HLA-A*02:01 and NY-ESO-1/HLA-A*02:01 tetramers prepared either by conventional refolding, exchange of peptide on stoichiometric MHC-I/TAPBPR complexes, TAPBPR-mediated peptide exchange using a catalytic (1:100) TAPBPR to MHC-I molar ratio or by stoichiometric exchange of a mismatched peptide, not recognized by the respective TCRs. (B) Histogram plots of tetramer staining. (C) Tetramer titration of P18-I10/H-2D$^d$ (top), MART-1/HLLA-A*02:01(middle) and NY-ESO-1/ HLA-A*02:01 (bottom), prepared by exchange of each peptide on the corresponding stoichiometric MHC-I/ TAPBPR complexes. Percentage of cells staining positive with tetramer over a serial two-fold dilution series were plotted and $EC_{50}$ values calculated by curve fitting to a sigmoidal line (with $R^2$ values in the 0.97-0.99 range), using Graph Pad Prism™ version 8 (GraphPad™ Software, La Jolla California USA). Data shown are representative of triplicate assays (n=3) and error-bars are standard deviations from the mean. Gating strategies used for sorting tetramer-positive cells are outlined in FIG. 11.

FIG. 6A-FIG. 6E depict the fine-tuning MHC-I/TAPBPR interactions through α3 domain mutants. (A) Alignment of the $\alpha_3$ domain sequences from murine H-2D$^d$, H-2Ld and human HLA-A*02:01. Conserved residues are highlighted in yellow. The M228T mutation site is highlighted in blue. * indicates residues directly participating in TAPBPR interactions, as shown in published mutagenesis studies and crystal structures. (B) TAPBPR/H-2Dd $\alpha_3$ domain interface from PDB ID 5WER[5](left panel) and with the M228T mutation modeled (right panel). (C) Size exclusion chromatograms of H-2D$^d$ M228T refolded with either high-affinity P18-I10 or goldilocks gP18-I10 peptides, with and without TAPBPR. (D) and (E) LC/MS analysis of the peptide region from SEC-purified gP 18/H-2D$^d$M228T and H-2D$^d$M228T/TAPBPR peaks from (C). Data shown are representative of triplicate SEC and LC/MS experiments.

FIG. 7A-FIG. 7E depict the identification of paired ap TCR sequences with their antigen specificities. (A) Recovery of MART-1 tetramer barcodes on DMF5 cells from PBMC-DC co-cultures spiked with 1% DMF5 cells. Number of MART-1 tetramer reads among DMF5 positive (DMF5-TCR) and negative (NB-TCR) cells. Cells are classified as positive/negative according to sequencing reads of the DMF5 TCR, where >10 DMF5 reads was used as a cutoff to classify DMF5+ cells. Box graphs display the distribution of MART-1 tetramer reads from DMF5+(>10

DMF5 reads n=76) and DMF5-(≤10 DMF5 reads, n=927) cells. Upper/lower bars and box boundaries indicate the 95th/5th and 75th/25th percentiles, respectively, horizontal box lines indicate medians. Statistical significance was assessed using a two-tailed Mann-Whitney test (p-value<0.0001). (B) Distribution of antigen specificities identified from tetramer+/CD8+ T cells from human splenocytes and the number of tetramer-barcode read per cell. Each dot represents a single cell, n=102 in total, error bars correspond to one standard deviation from the mean. (C) and (D) V(D)J usage of cells identified as specific for the EBV-BRLF1 (YVLDHLIVV)(SEQ ID NO:10) and NY-ESO-1 (SLLMWITQA)(SEQ ID NO:11) antigens. All TRAVJ (n=11/35) and TRBVJ (n=14/35) chains identified are represented. (E) TCR CDR3 sequences identified for antigen-specific T cells. Consensus BRLF-1 TRA and NY-ESO-1 TRB chains are highlighted in orange and red, respectively. Gating strategies used for sorting tetramer+ cells are outlined in FIG. 18.

FIG. 8A-FIG. 8H depict a study, showing that destabilizing "goldilocks" peptides promote isolation of empty murine MHC-I/TAPBPR complexes. (A-B) Size exclusion chromatography (SEC) elution profiles of H-2D$^d$ bound to RGPGRAFVTI (SEQ ID NO:12) (P18-I10) or GPGRAFVTI (SEQ ID NO:13) (gP18-I10) (left panel) and H-2L$^d$ bound to _PNVNIHNF (SEQ ID NO:14) (gp29) or QLSPFPFDL (SEQ ID NO:15) (QL9) (right panel) in the presence or absence of TAPBPR. SEC of H-2L$^d$ molecules shown was performed in the presence of 10 mM GF dipeptide. Inset shows SDS polyacrylamide (12%) electrophoresis analysis of elution fractions at 26 min/18 mL (pMHC-I/TAPBPR complex) and 30 min/15 mL (pMHC-I alone). Size markers correspond to sizes of 10, 15, 20, 25, 30, 40, and 50 kDa from bottom to top, respectively. (C—H) Analysis of MHC-I peptide occupancy by LC-MS. Chromatograms shown are filtered to only display peaks containing m z ions of interest. Insets show MS analysis of the region indicated by the red box. (C) P18-I10/H-2D$^d$/TAPBPR complex, (D) gP18-I10/H-2D$^d$, (E) gP18-I10/H-12D$^d$/TAPBPR complex, (F) p29/H-2L$^d$/TAPBPR complex, (G) QL9/H-2L$^d$/TAPBPR complex, (H) QL9/H-2L$^d$/TAPBPR complex. Data show are representative of triplicate assays.

FIG. 9A-FIG. 9D provide an assessment of peptide occupancy of HLA-A*02:01/TAPBPR complexes. (A) SEC elution profile of 1 LFGYPVYV (SEQ ID NO:21)/HLA-A*02:01, where ] denotes a D-Leucine residue (left), and Ac-LLFGYPVYV (SEQ ID NO:3)/HLA-A*02:01, where Ac-L denotes an acetylated N-terminal Leucine residue (right), in the presence or absence of TAPBPR at an equimolar concentration. All binding experiments were performed in the presence of 10 mM GM dipeptide. (B) Analysis of peptide occupancy of gTAX/HLA-A*02:01 complex (left) and HLAA*02:01/TAPBPR complex (right) by LC-MS. Chromatograms shown are filtered to display ions of interest. I nset: MS analysis of the region indicated. (C) SEC analysis of HLA-A*02:01/TAPBPR complex dissociation in the presence of high affinity (TAX) peptide. (D) MS analysis of TAX/HLA-A*02:01 isolated from HLA-A*02:01/TAPBPR complexes loaded with TAX. All MS analysis is done on SEC purified HLA-A*02:01. Data show are representative of triplicate assays.

Figure 10:
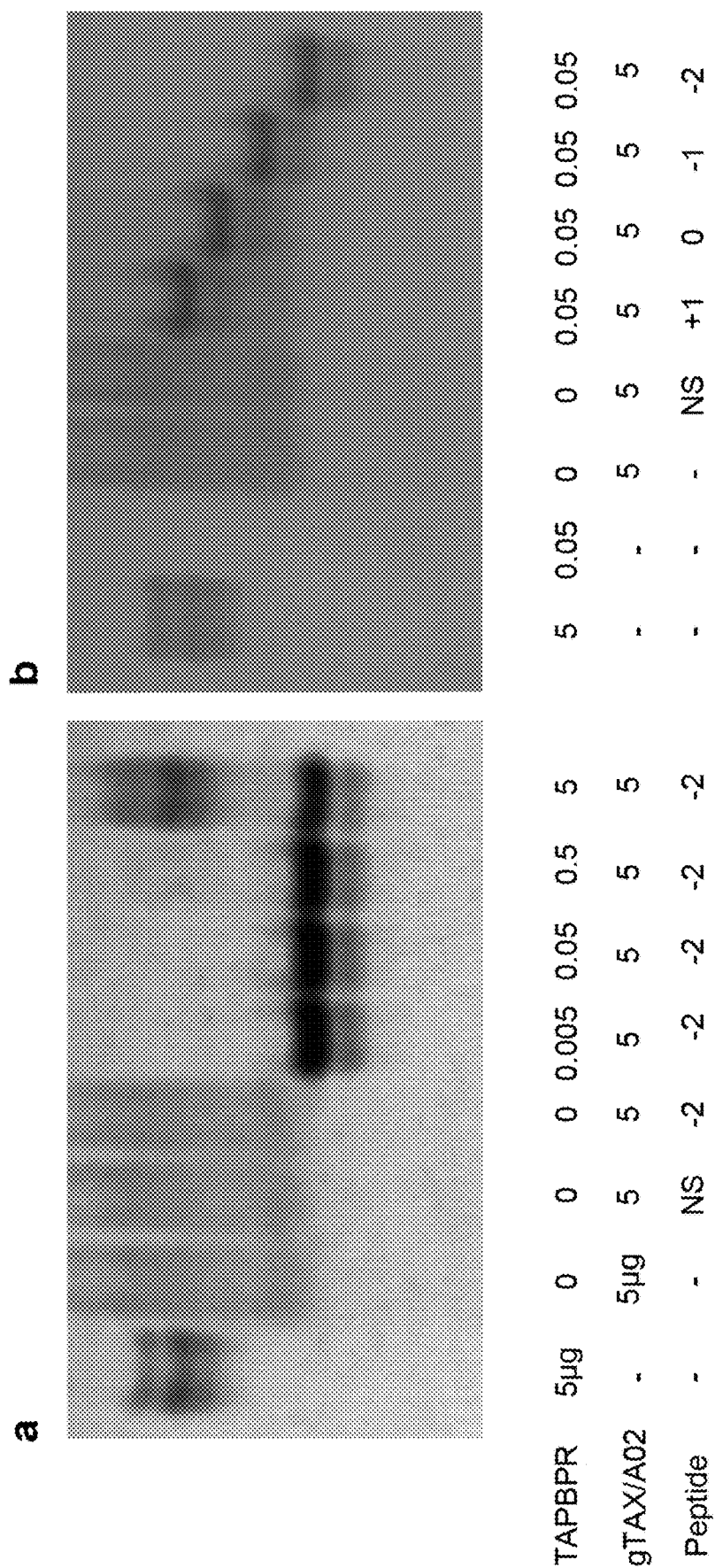

FIG. 10A-FIG. 10B provide a demonstration of peptide exchange using catalytic amounts of TAPBPR. (a) Native gel electrophoresis analysis of peptide exchange using varying concentrations of TAPBPR (0.005 μg to 5 μg), monitoring the formation of exchanged pMHC molecules of different electrophoretic mobilities. Each indicated reaction was incubated overnight at 4° C. in the presence of 10-fold molar excess of a high affinity peptide (sequence SLLDDA-FAL (SEQ ID NO:19), net charge of −2 at neutral pH), and a fixed concentration of gTAX/HLA-A*2:01. (b) Native gel electrophoresis analysis of TAPBPR exchange on gTAX/HLA-A*02:01 of four different high affinity peptides with net charges at neutral pH ranging from +1 to −2 (sequences RVADYIVKV, (SEQ ID NO:16) ALFPERITV (SEQ ID NO:17), AIADISYSV (SEQ ID NO:18), SLLDDAFAL (SEQ ID NO:19)), as indicated. 12% polyacrylamide native gels were run at 90V for 5 hrs at 4° C. before visualization with InstantBlue (Expedeon). NS: non-specific gp29 peptide (sequence YPNVNIHNF)(SEQ ID NO:9), used as a negative control. Data shown is representative of triplicate gel assays. All protein samples used in (a) and (b) were derived from the same peptide exchange experiment, and the gels were processed in parallel.

Figure 11:
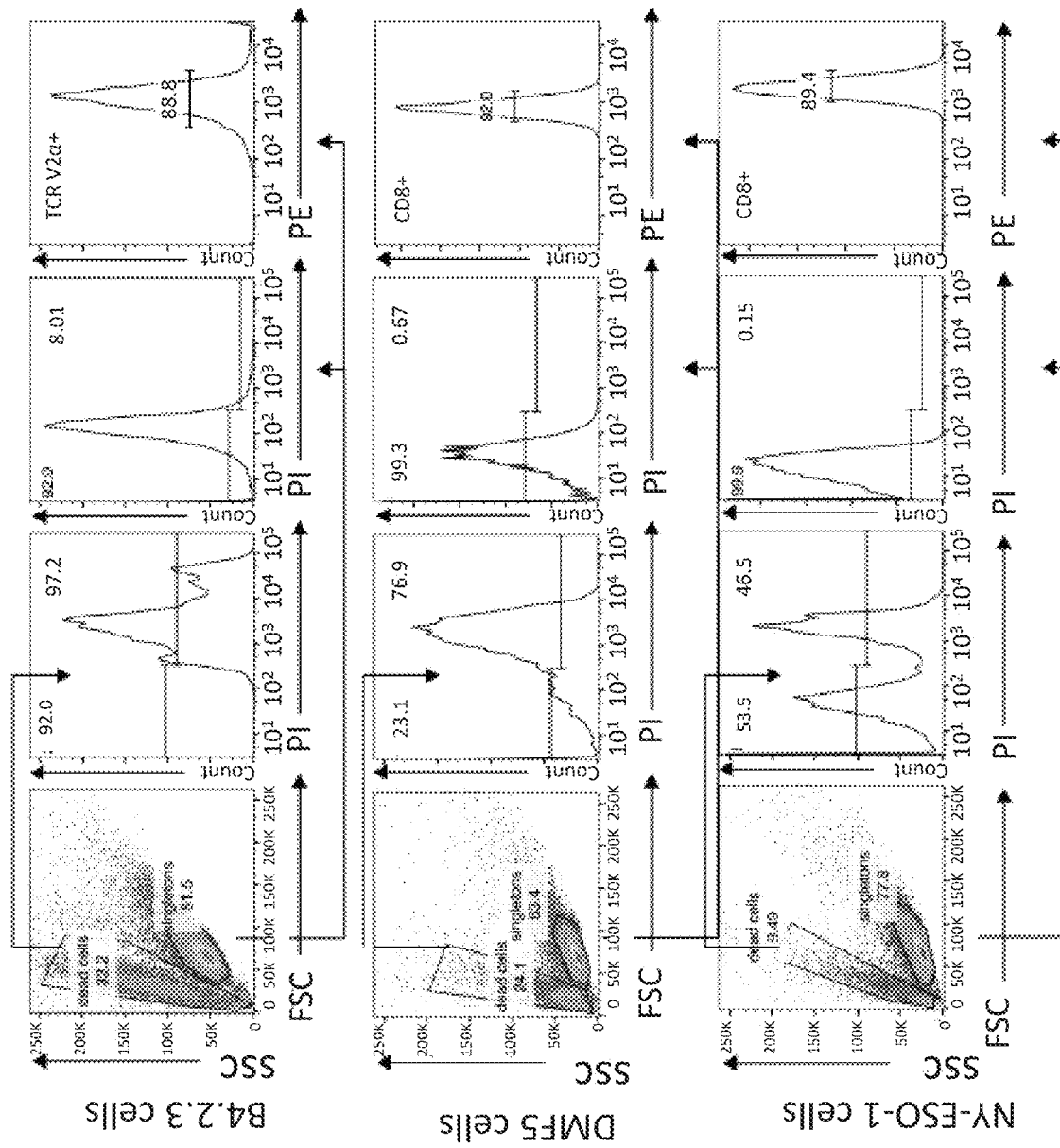

FIG. 11 provides a flow cytometry gating strategy for FIG. 5. Acquisition and analysis was performed on an LSRII flow cytometer using FACSDiva™ software (BD, Franklin Lakes, NJ). Cells were sorted by side and forward scatter (SSC-A and FSC-A) and by propidium iodide exclusion (PE-Cy5) for viability and exclusion of multimers. Gating for single live-cells was determined by comparison of unstained and fluorescently labelled cells compensated for spectral overlap of PE, FITC and PI. Murine 58α$^-$β$^-$ cells expressing the B4.2.3 TCR which recognizes P18-I10 bound to H-2D$^d$, were stained with BD PE-Rat Anti-Mouse Vα2 TCR Ab to confirm TCR receptor expression. The human T cell lines DMF5 and NY-ESO-1, were stained with BD FITC Mouse anti-human CD8 Ab.

Figure 12:
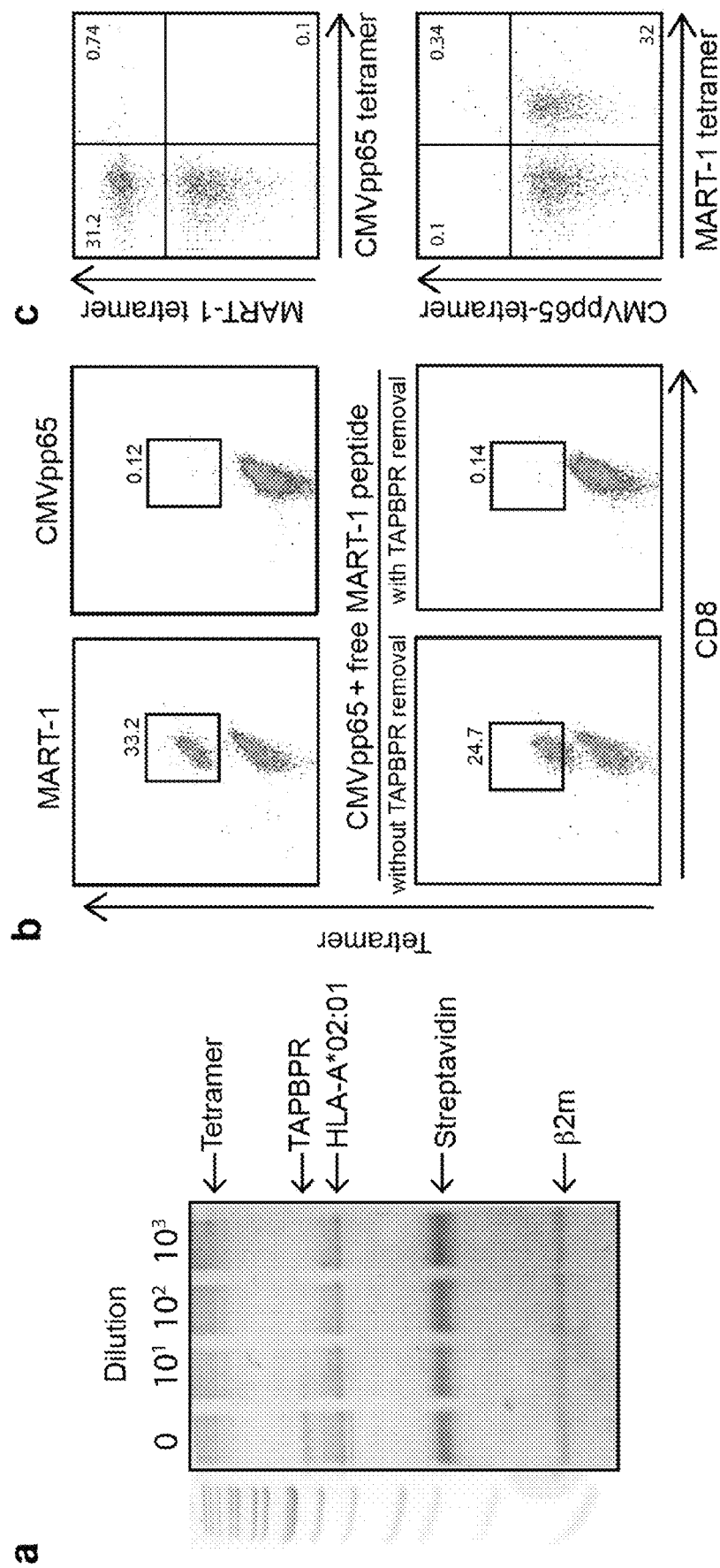

FIG. 12A-FIG. 12C provide a study showing that removal of TAPBPR abrogates the exchange of peptides on and between tetramers for library production. (a) SDS polyacrylamide (12%) electrophoresis of tetramers washed using a 100 kDa spin filter at 10, 100 and 1,000-fold dilutions to remove TAPBPR. Data shown is representative of triplicate gel assays. Size markers correspond to sizes of 10, 15, 20, 25, 30, 40, and 50 kDa from bottom to top, respectively. (b) Representative plots showing tetramer staining of DMF5 T cells with HLA-A*02:01 tetramers prepared by TAPBPR exchange of either the MART-1 epitope specific to the DMF5 TCR, or the irrelevant epitope CMVpp65 (top panels). A very low level (0.12%) of CMVpp65-tetramer positive DMF5 T cells can be detected, likely due to non-specific staining. DMF5 T cells were independently stained with CMVpp65-tetramers incubated with free MART1 peptide at 10-fold molar excess (relative to pMHC-I) without TAPBPR removal (bottom left) or upon complete removal of TAPBPR, as shown in (a) (bottom right), showing recovery of a low (0.14%) level of background staining in the absence of TAPBPR. (c) Staining of DMF5 T cells using a 1:1 mixture of PE-CMVpp65:APCMART-1 tetramers (top panel), or PE-MART-1:APC-CMVpp65 tetramers (bottom panel). In each plot, both tetramer samples were prepared individually using TAPBPR exchange, followed by complete removal of TAPBPR and excess peptide, mixing of the two tetramers and overnight incubation at 4° C. The absence of a significant PE-tetramer positive population (0.1%—x-axis) in the top panel, or an APC-tetramer positive population in the bottom pane (0.1%—y-axis) is indicative of a negligible background of cross-exchange of peptides between tetramers in the absence TAPBPR, allowing their incorporation into stable tetramer libraries. Numbers in the plots indicate the percentage of total cells. Data show are representative of triplicate, independent staining and flow cytometry experiments.

Figure 13A:
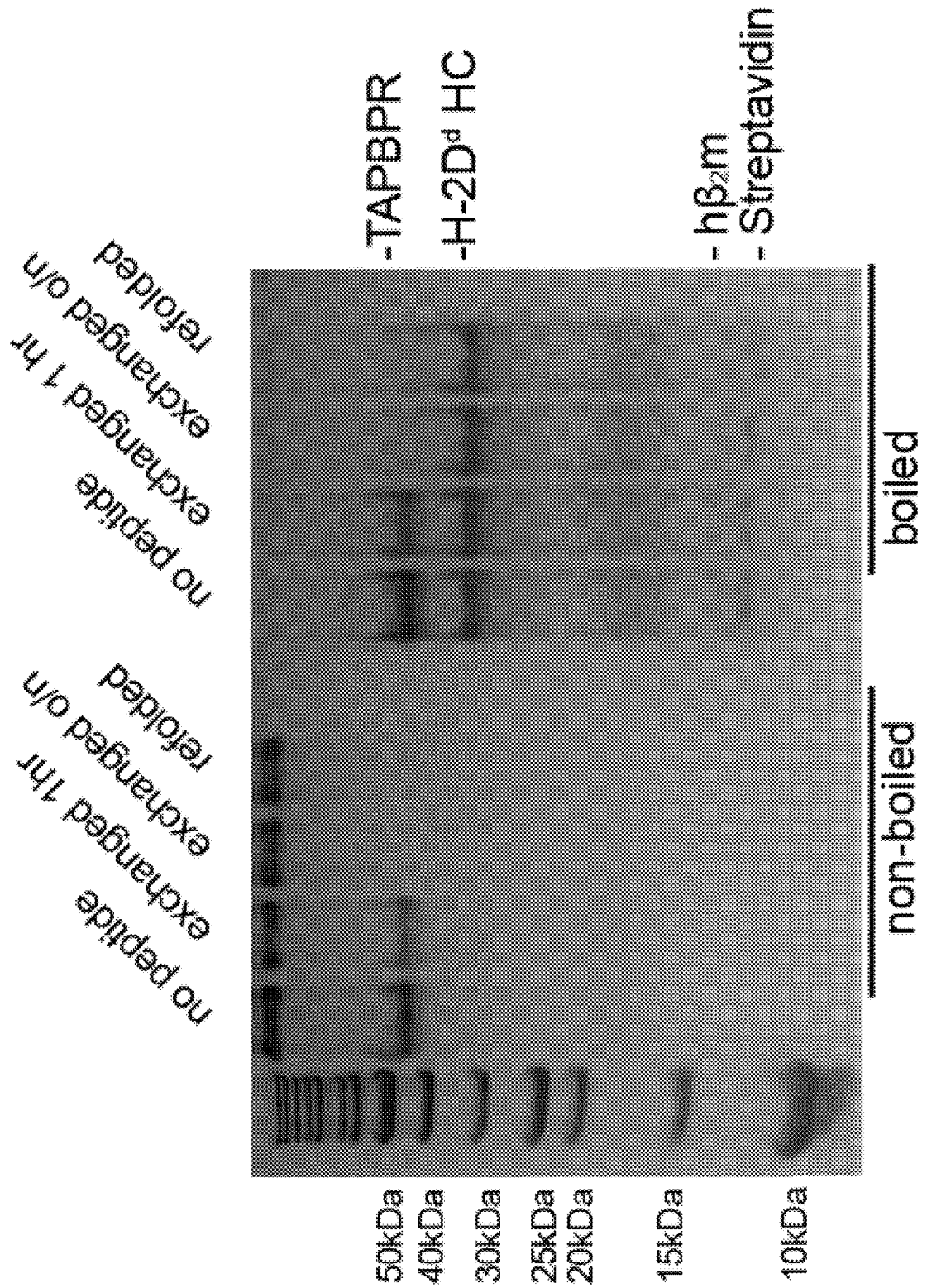
Figure 13B:
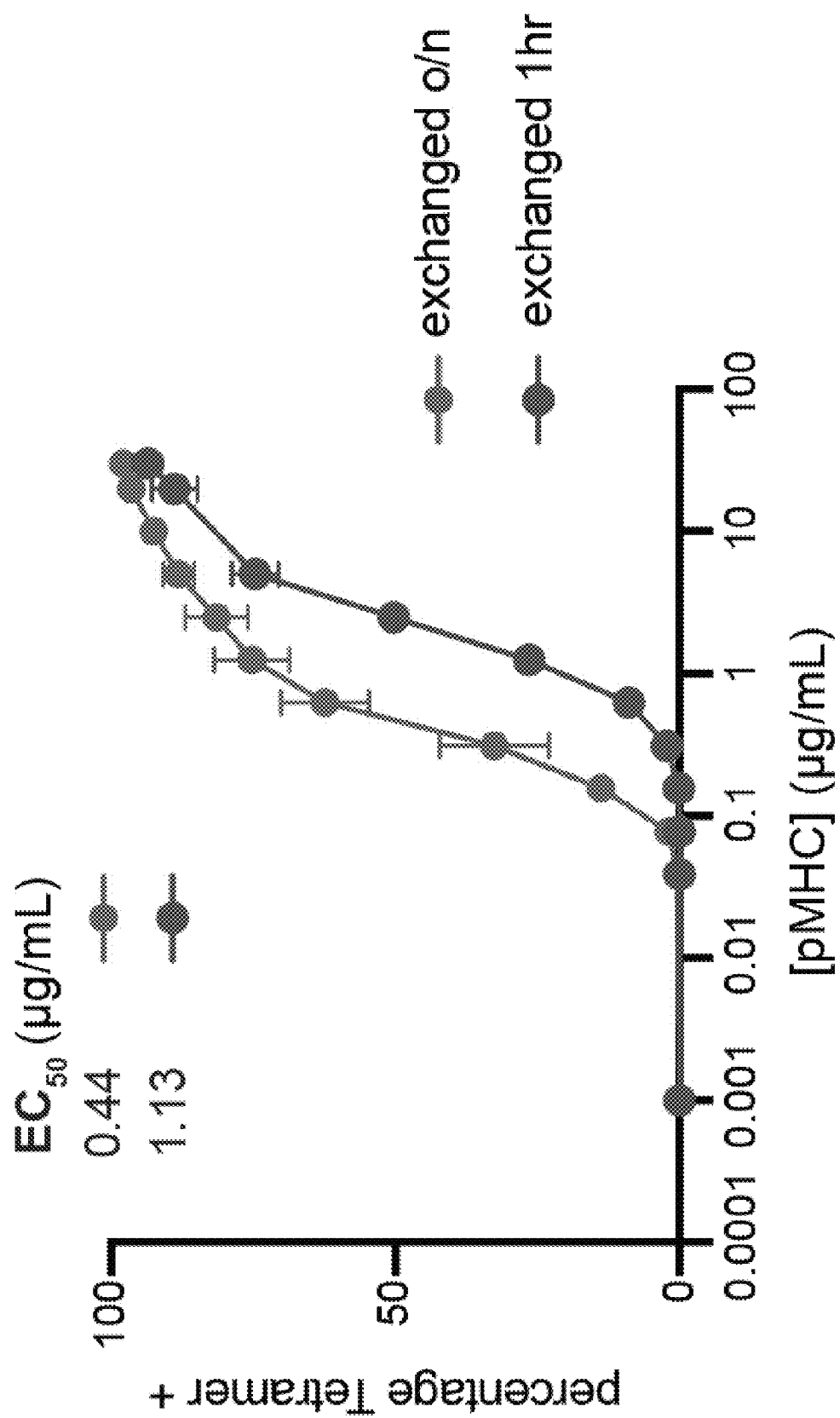

FIG. 13A-FIG. 13B depict a study, showing efficiency of TAPBPR-mediated loading of a high affinity peptide on H-2D$^d$. Tetramers produced by either 1 hr or overnight incubation of stoichiometric TAPBPR:H-2D$^d$ complex with 10-fold molar excess of P18-I10 peptide were examined by SDS PAGE and flow cytometric staining of cells expressing B4.2.3, a TCR which recognizes P18-I10 in the context of MHC-I H-2D$^d$: (A) SDS polyacrylamide (12%) electrophoresis of tetramers assembled from pMHC-I using either protocol. Tetramers were solubilized in SDS running buffer with DTT, then boiled (as indicated) prior to electrophoresis. Refolded H-2D$^d$/P18-I10 and empty H-2D$^d$ PE-tetramers were included as positive and negative controls, respectively. HC: heavy-chain. Data shown is representative of triplicate gel assays. (B) Titration curve of H-2D$^d$/P18-I10 tetramer binding to B4.2.3 cells. Tetramers were prepared using stoichiometric TAPBPR peptide loaded MHC-I following overnight (red circles) one hour (blue circles) exchange. EC$_{50}$ was calculated using a sigmoidal 4 point-plot where X equals log of concentration, using GraphPad™ Prism™ v8.0 for Mac. Error bars represent standard deviation from the mean. Data represent three independent experimental observations.

Figure 14A:
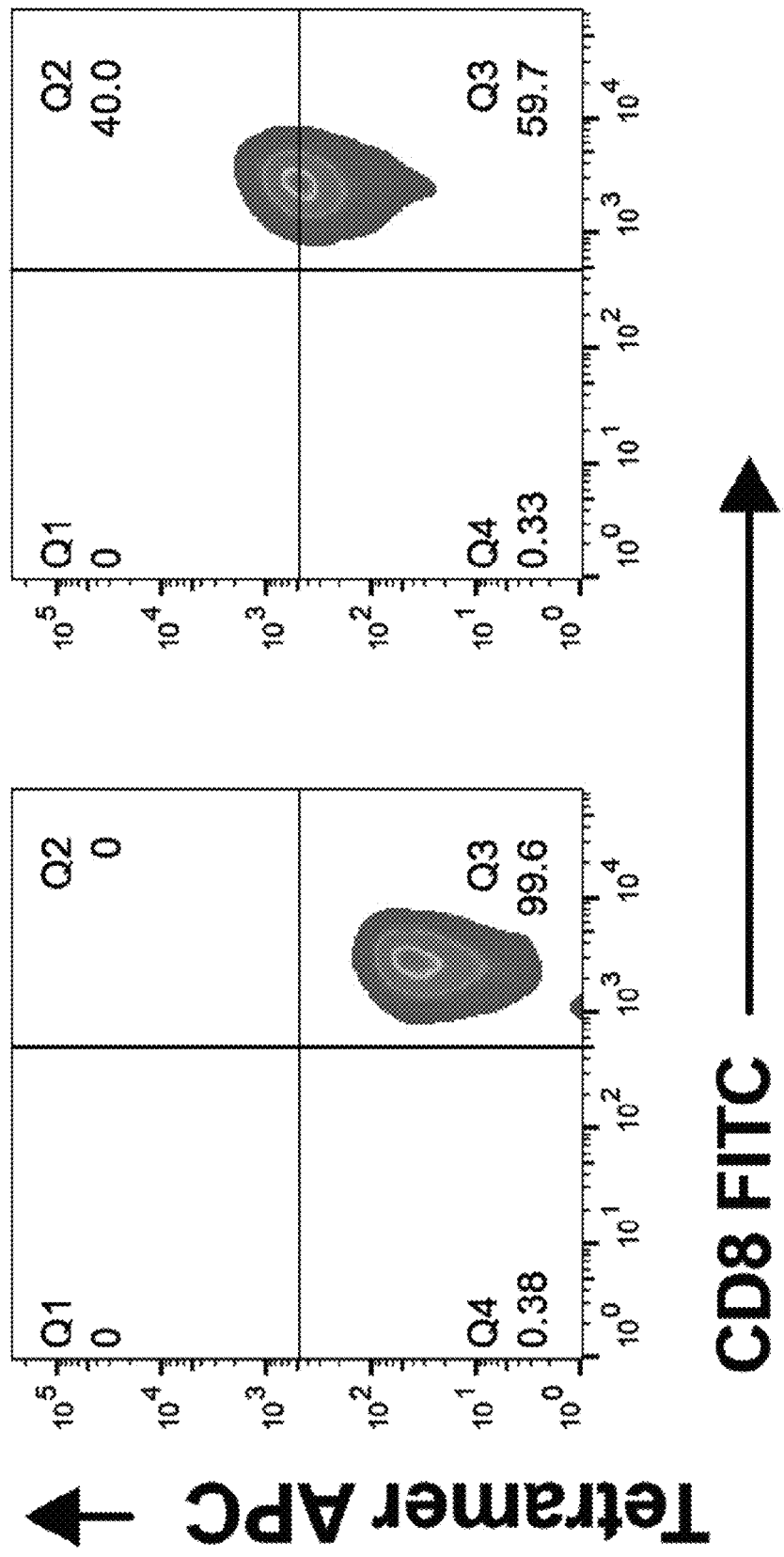
Figure 14B:
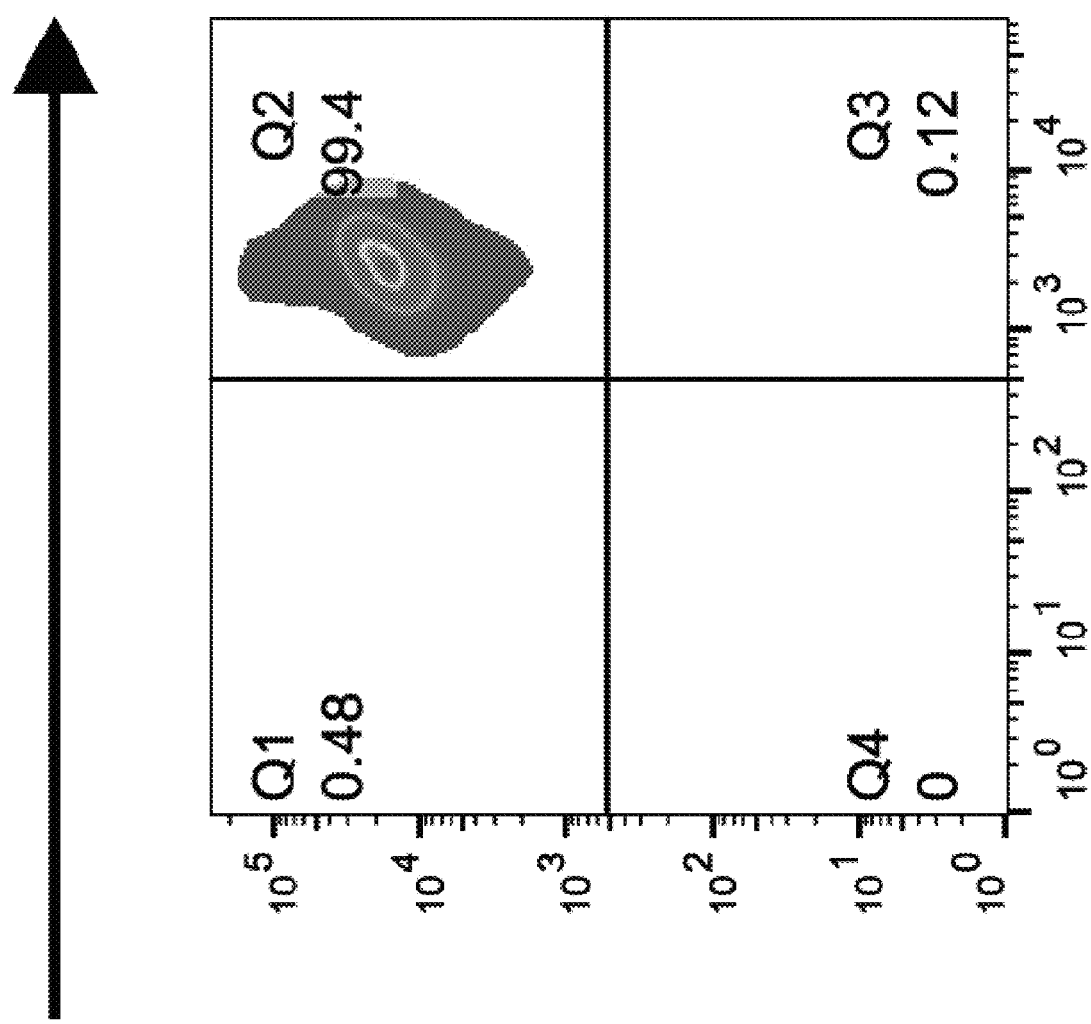
Figure 14C:
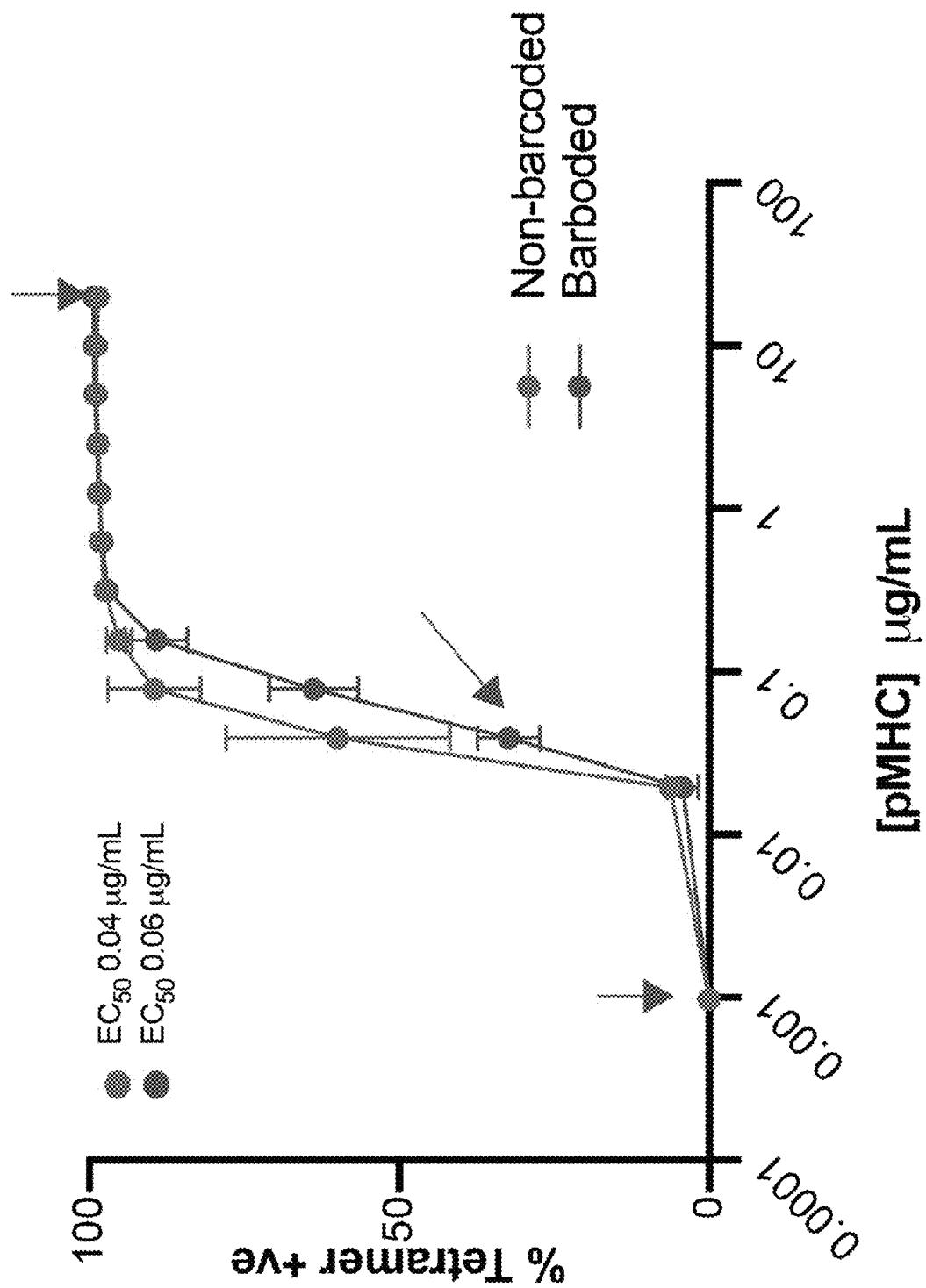

FIG. 14A-FIG. 14C provide a comparison of barcoded and non-barcoded tetramer binding to cognate TCR receptor. (A-B) Increasing amounts of MART-1-APC barcoded tetramers produced by catalytic exchange were analyzed by flow cytometric staining of cells expressing DMF5, a TCR which recognizes MART-1 in the context of HLA-A*02:01 restriction. Data shown is representative of triplicate staining assays. (C) Titration of bar-coded and non-barcoded tetramers. Data represents three individual flow cytometry experiments. Blue arrows indicate the concentration of pMIC-I for the three plots shown in panel (A). Percentage of cells staining positive with tetramer over a serial two-fold dilution series were plotted and $_{EC50}$ values calculated by curve fitting to a sigmoidal line (with R2 values in the 0.97-0.99 range), using Graph Pad Prism™ version 8 for Mac (GraphPad™ Software, La Jolla California USA). Data shown is representative of triplicate assays and error-bars are standard deviation from the mean. Gating strategies used for sorting tetramer-positive cells are outlined in FIG. 11.

FIG. 15A-FIG. 15D show ECCITE-seq adapted to capturing barcoded pMHCI-I tetramers. (A-B) Biotinylated 5P ECCITE-seq oligos were conjugated to fluorophore-labelled (red star) streptavidin tetramers. The oligos contain a unique tetramer barcode, a switch oligo sequence that provides a handle for 10× compatibility by annealing of 5P 10× gel bead oligos during first-strand cDNA synthesis, in addition to a 3' Illumina NGS sequencing handle (Nextera read 2). The 10× 5P kit was used with specific protocol modifications (as outlined in Online Methods) to capture oligo-derived tags and mRNA-derived cDNA. Only oligo capture is shown here (step 1). After separation of the large and small fractions, following cDNA amplification with additive primer (step 2), the low molecular weight fraction was amplified with 10× Genomics SI-PCR oligo and a Nextera P7 oligos (step 3) to create a sequencing library compatible with Illumina instruments (step 4). The high molecular weight cDNA fraction was processed according to manufacturer's instructions. Tetramer tags and TCR cDNAs from the same cell will share the same cell barcode and can be associated. (C) Bulk amplification of all PE-tetramer barcodes contained in library 2. (D) Comparative staining of DMF5 Jurkat T cells with a single (non-barcoded) PE-tetramer prepared by TAPBPR exchange of the MART-1 peptide (left panel), versus an equal concentration of the full barcoded tetramer library 2, comprising of 34 epitopes, including MART-1 (right panel). Gating strategies are outlined in FIG. 11. Data show are representative of triplicate, independent staining and bulk sequencing experiments.

FIG. 16A-FIG. 16E depict high-throughput validation of peptide loading on HLA-A*02:01/TAPBPR complexes using differential scanning Fluorimetry (DSF). (a) Derivation of melting temperatures for TAPBPR exchanged TAX/HLA-A*02:01 from conventional DSF data. The DSF trace of TAPBPR alone (left, orange line) was subtracted from that of TAPBPR exchanged HLA-A*02:01 (red line) to obtain the subtracted curve (center, red line). The T$_m$ can be extracted by taking the first derivative (right, red line). As a reference the DSF trace of TAX/HLA-A*02:01 is processed in the manner but without removing the TAPBPR trace (blue line). (b) (upper panel) nanoDSF™ traces showing a negative inflection point for TAPBPR at a T$_m$ of 52.5° C., and a positive inflection point for TAX/HLA-A*02:01 at a T$_m$ of 66.5° C. (lower panel) nanoDSF™ traces of HLA-A*02:01/TAPBPR loaded with different peptides from the library showing a consistent negative inflection point corresponding to the TAPBPR T$_m$, and a positive inflection point corresponding to the T$_m$ values of different pMHC molecules. (c) Correlation between T$_m$ values of different pHLA-A*02:01 molecules, measured by DSF, and $_{EC50}$ values of peptide binding on empty HLA-A*02:01/TAPBPR complexes, measured by Bio-Layer Interferometry. EC$_{50}$ error bars were estimated from 3 independent experiments per peptide. (d) Correlation between T$_m$ values of pMHC molecules prepared using photo-exchange and TAPBPR-mediated peptide exchange. (e) Correlation between T$_m$ values of TAPBPR exchanged pMHC molecules measured by conventional DSF as shown in (a), and by nanoDSF™ (b). Data shown is representative of triplicate, independent experiments.

FIG. 17A-FIG. 17E depict measurement of peptide-induced HLA-A*02:01 dissociation from TAPBPR using Biolayer Interferometry. Binding and dissociation of HLA-A*02:01 from immobilized TAPBPR on a tip surface. The association of a peptide deficient HLA-A*02:01 to TAPBPR was achieved by the addition of 10 mM GM dipeptide. The dissociation of HLAA*02:01 was measured in the presence of buffer supplemented with increasing concentrations of the indicated peptide. Dissociation data was corrected using a reference biosensor of immobilized TAPBPR (not bound to HLA-A*02:01), in buffer. Data shown are representative of 2 independent experiments. Raw data points are shown in black. All series were fit locally using a 2:1 model with a R$^2$ of 0.99 or greater, shown as colored curves. The derived pseudo first-order dissociation rate constants, k$_d$, are plotted as a function of peptide concentration in FIG. 3g. Data shown is representative of triplicate, independent experiments.

FIG. 18A-FIG. 18G provide a flow cytometry gating strategy. (A-B) Gating strategy used to sort tetramer positive cells expanded in vitro with NB epitope pulsed DCs. Mixed cell cultures of pulsed DCs and PBMCs were stained using both PE/APC versions of tetramer library 1, and sorted on a flow cytometer by gating on live cells, then on tetramer positive cells. (C-G) Gating strategy used to sort CD8-enriched splenocytes stained with PE/APC versions of library 2. Cells were sorted by SSC-A and FSC-A to select for lymphocytes, then filtered for single cells using FSC-H and then live cells with LIVE/DEAD-Aqua. From this, CD8+ T cells were gated based on CD8 and CD3 staining and then tetramer positive cells were collected for sequencing experiments. Due to low observed staining on the APC fluorophore channel for both samples shown in (a,b) >99% of collected cells correspond to the PE-tetramer positive fractions.

FIG. 19 is a table summarizing a comparison of refolding and peptide exchange efficiencies for three different peptide exchange methods: a) photosensitive peptide (Toebes et al., Nat Med 12:246-251 (2006)); b) disulfide mutant (Saini et al., Sci Immunol 4, doi:10.1126/sciimmunol.aau9039 (2019)); and c) goldilocks peptide.

FIG. 20 is a table that shows pMHC $T_m$ values of Neuroblastoma neoepitopes included in Library 1. Conventional DSF was performed on pHLA-A*02:01 samples prepared by either TAPBPR-mediated peptide exchange (column 2), or exchange using UV irradiation of a photosensitive conditional peptide ligand (column 3), as outlined in Online Methods. A 20-fold molar excess of free peptide was used to promote exchange during a 1 hr incubation at room temperature, for all experiments. DSF profiles were analyzed as shown in FIG. 16. All measurements were performed in PBS buffer. Errors represent the standard deviation of 3 replicates, individually analyzed. $IC_{50}$ values were obtained from NetMHCpan-4.0 (Jurtz et al., J. Immunol. 199:3360-3368 (2017)).

FIG. 21 is a table that shows pMHC $T_m$ values of viral, tumor, autoimmune epitopes included in Library 2. Conventional DSF was performed on HLA-A*02:01/TAPBPR complexes following 1 hr incubation with each listed peptide. A 20-fold molar excess of free peptide was used to promote exchange during a 1 hr incubation at room temperature, for all experiments. DSF profiles were analyzed as shown in FIG. 16. Measurements were performed in PBS buffer supplemented with 0.5% DMSO to increase peptide solubility. Errors represent the standard deviation of 3 replicates, individually analyzed. $IC_{50}$ values were obtained from NetMHCpan-4.0 (Jurtz et al., J. Immunol. 199:3360-3368 (2017)).

FIG. 22 is a table summarizing the primer sequences used for ECCITE-seq analysis described herein.

DETAILED DESCRIPTION

A. Overview

High-throughput screening strategies using large arrays of peptide-MHC class I multimers can allow for the large scale identification of antigen specific T cells and/or antigens that bind to particular MHC class Is (e.g., tumor antigens). Identification of such antigen specific T cells and/or antigens can in turn lead to the understanding of the pathogenesis of particular diseases, as well as the development of novel therapies.

Such high-throughput screens, however, are limited by the ability to produce large collections of peptide-MHC class I multimers. The instability of peptide-deficient MHC class I molecules, for example, makes large scale production of peptide-MHC class I multimers using such MHC class I molecules difficult. While conditional ligands have been used for large scale production of peptide-MHC class I multimers, such conditional ligands are limited due to sample aggregation, precipitation during the photolysis/peptide exchange step, and, in some cases, instability of the conditional ligand leading to high background levels of exchange. As such, there remains a need for new methods of making peptide-MHC class I multimer complex libraries.

Provided herein are stable peptide-receptive MHC-I complex compositions and methods of making such compositions. Such peptide-receptive MHC-I complexes can be used for production of large collections of peptide-MHC class I multimer complexes (e.g., up to 10,000 different specificities), which can then in turn be used in high throughput screens for immune profiling towards disease diagnosis and for the development of new therapies. The peptide receptive MIC-I complexes provided herein are advantageously stable and can be stored for long periods of time prior to their use in making peptide-MHC class I multimer complexes.

B. Peptide-Receptive MHC-I Complexes

In one aspect, provided herein is a composition that includes a plurality of peptide receptive MIC-I complexes and a plurality of chaperones. Such compositions are advantageously stable and can be stored for long periods of time in solution prior to use, for example, in making peptide-MHC class I multimer complexes, as described herein. In other aspects, the compositions include peptide receptive MHC-I complexes, but the composition has been subjected to a process that removes free chaperones, such as a dialysis process. In some embodiments, such peptide receptive complexes are substantially free of chaperones.

As used herein, an "MHC class I," "Major Histocompatibility Complex class I," "MHC-I" and the like all refer to a member of one of two primary classes of major histocompatibility complex (MHC) molecules (the other being MHC class II) that are found on the cell surface of all nucleated cells in the bodies of jawed vertebrates. MHC class I molecules function to display peptide fragments of antigen to cytotoxic T cells; resulting in an immediate response from the immune system against a particular antigen displayed with the help of an MHC class I molecule.

MHC class I molecules are heterodimers that consist of two polypeptide chains, α (heavy chain) and β2-microglobulin (light chain). The two chains are linked noncovalently via interaction of light chain and the $α_3$ domain of the heavy chain and floor of the α1/α2 domain. In humans, only the heavy chain is polymorphic and encoded by a HLA gene, while the light chain is species-invariant and encoded by the Beta-2 microglobulin gene. The α3 domain is plasma membrane-spanning and interacts with the CD8 co-receptor of T-cells. The α3-CD8 interaction holds the MHC I molecule in place while the T cell receptor (TCR) on the surface of the cytotoxic T cell binds its syngeneic MIC-I ligand (or matched, in the sense that both the TCR and MHC-I are encoded in the same germline), and checks the coupled peptide for antigenicity. The α1 and α2 domains of the heavy chain fold to make up a groove for peptides to bind. MHC class I molecules bind peptides that, in most cases, are 8-10 amino acid in length.

In mice, MHC class I is called the "H-2 complex" or "H-2" and include the H-2D, H-2K and H-2L subclasses. In humans, MHC class I molecules include the highly polymorphic human leukocyte antigens HLA-A, HLA-B, HLA-C, the less polymorphic HLA-E, HLA-F, HLA-G, HLA-K and HLA-L, and the non-polymorphic MR1 and CD1 proteins. Each human leukocyte antigen (e.g., HLA-A) includes multiple alleles. For example, HLA-A includes over 2,430 known alleles. In some embodiments, the purified peptide receptive MHC-I complex includes an HLA-A. In certain embodiments, the purified peptide receptive MHC-I complexes includes an HLA-B. In other embodiments, the purified peptide receptive MIC-I complex includes an HLA-C. In an exemplary embodiment, the purified peptide receptive MHC-I complex includes an HLA-A02 allele. In other embodiments, the peptide receptive MIC-I complex includes a H-2. In certain embodiments, the H-2 is an H-2D, H-2K or H-2L. In exemplary embodiments, the H-2 is H-2D$^d$ or H-2L$^d$.

Peptide receptive MHC-I complexes are created from placeholder peptide-MHC-I complexes (p*MHC-I) through the action of a chaperone. As described herein, placeholder peptide-MHC-I complexes (p*MHC-Is) are formed by incubating a plurality of MHC class I heavy chains, a plurality of β2-microglobulins; and a plurality of placeholder peptides under conditions that favor the formation of the p*MHC-I. In some embodiments, the MHCI-heavy chains are HLA-A*24:02 or HLA-A*68:02. In some embodiments, wherein the heavy chain is HLA-A*24:02 the placeholder peptide has the sequence YPLFGWCF (SEQ ID NO:1). In some embodiments, wherein the heavy chain is HLA-A*24:02 the placeholder peptide has the sequence LFGPVYV (SEQ ID NO:2). The chaperone can be any suitable chaperone. In some embodiments, the chaperone is the Tapasin Binding Protein Related (TAPBPR) chaperone. In an exemplary embodiment, the peptide receptive MHC-I complex includes a TAPBPR chaperone and an HLA-A MHC class-I molecule. In further embodiments, the HLA-A is HLA-A02.

In one aspect provided herein is a composition that includes a plurality of placeholder peptide-MHC-I complexes (p*MHC-Is), wherein the plurality of p*MHC-Is each include an MHC class I heavy chain, a β2-microglobulin and a placeholder polypeptide. In some embodiments, the MCI-heavy chains are HLA-A*24:02 or HLA-A*68:02. In some embodiments, wherein the heavy chain is HLA-A*24:02 the placeholder peptide has the sequence YPLFGWCF (SEQ ID NO:1). In some embodiments, wherein the heavy chain is HLA-A*24:02 the placeholder peptide has the sequence LFGPVYV (SEQ ID NO:2).

In some embodiments, the peptide receptive MIC-I complexes are contacted with the chaperone at a molar ratio of 1:1 of chaperone to p*MHC-I. In some embodiments, a chaperone such as TAPBPR can act catalytically upon p*MHC-I to yield a peptide receptive MHC-I complex. This means that the reaction that creates a peptide receptive MIC-I complex from a p*MHC-I can be performed even when the molar ratio of chaperone to p*MHC-I is less than 1:1. The molar ratio can be any such ratio of chaperone to p*MHC-I including a ratio less than 1:2, less than 1:10, less than 1:50, less than 1:100, less than 1:500, less than 1:1000, less than 1:5000, or less than 1:10,000 provided that there is sufficient chaperone present to convert at least 50%, at least 60%, at least 70%, at least 75%, at least 80%, at least 85%, at least 90%, at least 95%, or 100% of the p*MHC-I to peptide receptive MHC-I complexes.'

In one aspect provided herein is a composition that includes a plurality of peptide receptive MHC class I complexes, wherein the plurality of p peptide receptive MHC class I complexes each include an MHC class I heavy chain, and a β2-microglobulin. In some embodiments, the MCI-heavy chains are HLA-A*24:02 or HLA-A*68:02.

In some embodiments, the purified peptide receptive MHC class I described herein further includes a chaperone (i.e., a MHC class 1/chaperone complex). In some embodiments, the chaperone is Tapasin Binding Protein Related (TAPBPR). In an exemplary embodiment, the peptide-receptive MHC class I/chaperone complex includes a TAPBPR chaperone and an HLA-A MHC class-I molecule. In some embodiments, the HLA-A is HLA-A02. In other embodiments, the HLA-A is HLA-A*24:02 or HLA-A*68:02.

Peptide receptive MHC-I complexes compositions provided herein are advantageously highly stable and soluble. In some embodiments, the peptide receptive MIC-I complexes can be stored at concentrations of up to 50, 100, 150, 200, 250, 300, 350, or 400 M in solution without precipitation at 4° C. In certain embodiments, the peptide receptive MHC-I complexes are completely soluble and remain peptide receptive in solution at a concentration of up to 400 μM at 4° C. for up to 1 month, 2 months, 3 months, 4 months, 5 months, 6 months, 7 months, 8 months, 9 months, 10 months, 11 months, or a year. The stability of subject peptide MHC class I complexes (e.g., peptide receptive MIC-I complexes) can be measured, for example, using differential scanning fluorimetry techniques. In certain embodiments, the peptide receptive MIC-I complexes are stored at −80° C. In particular, embodiments, the peptide receptive MHC-I complexes are lyophilized.

In another aspect, provided herein is a method of making the subject peptide receptive MIC-I complexes. To make such complexes, an MHC class I heavy chain, an MHC class I light chain and a placeholder peptide are first incubated under conditions wherein the MHC class I heavy chain, the MHC class I light chain and the placeholder peptide form a placeholder peptide-MHC class I (p*MHC-I) complex. The p*MHC-I complexes are then contacted with a dipeptide and chaperone and then changed into peptide receptive MHC-I complexes that can accept a peptide of interest.

In the first step of making the placeholder peptide-MHC class I (p*MHC-I) complex, MHC class I heavy chains, MHC class I light chains and placeholder peptides are incubated under conditions wherein the MHC class I heavy chain, the MHC class I light chain and the placeholder peptide refold to form a placeholder peptide-MHC class I (p*MHC-I) complex. MHC class I heavy chains and light chains can be obtained using any method known to one of skill in the art. For example, nucleic acids encoding known MHC class I heavy chains and light chains can be integrated into one or more expression vectors, that are in turn transformed into a suitable host for expression (e.g., E. coli). MHC class I heavy chains and light chains produced by such host cells can then be isolated and purified for use with the subject methods. In some embodiments, the MCI-heavy chains are HLA-A*24:02 or HLA-A*68:02. In some embodiments, wherein the heavy chain is HLA-A*24:02 the placeholder peptide has the sequence YPLFGWCF (SEQ ID NO:1). In some embodiments, wherein the heavy chain is HLA-A*24:02 the placeholder peptide has the sequence LFGPVYV (SEQ ID NO:2).

In some embodiments, the heavy chain, light chain and placeholder peptide are incubated in a refolding buffer that favors the formation of the p*MHC-I complex. In an exemplary embodiment, the refolding buffer includes arginine-HCl, EDTA, reduced oxidized L-glutathione, and Tris base. The heavy chain and light chain can be present at any ratio that favors the formation of the p*MHC-I complex. In certain embodiments, the MHC class I heavy chains and light chains are incubated at about a 1:1, 1:2, 1:3, 1:4, 1:5 ratio of heavy chain to light chain. In an exemplary embodiment, the MHC class I heavy chains and light chains are incubated at a ratio of 1:3 in the presence of the placeholder polypeptide. The MHC class I heavy chain and light chains can be incubated with the placeholder peptide in the refolding buffer for at least 12 hours, 18 hours, 24 hours, 2 days, 3 days, 4 days, 5 days, 6 days or a week to obtain properly folded p*MHC-I complexes. In some embodiments, the MHC class I heavy chain, light chain and placeholder peptides are incubated for 1 to 4 days. In certain embodiments, this first step is carried out at approximately 3° C. to 10° C. In an exemplary embodiment, the refolding of the MHC class I heavy chain and light chains with the placeholder peptide is carried out at 4° C.

Suitable placeholder peptides that can be used in this first step include, for example, modified versions of peptides known to bind to the particular MHC class I allele included in the peptide-receptive MHC class I complex. Such placeholder polypeptides have been modified to have a lower binding affinity to the particular MHC class I molecule compared to the known polypeptide. Peptides known to bind various MHC-class Is can be found, for example, at the MHCBN database. In some embodiments, the placeholder polypeptide is a N-terminal truncated version of a known polypeptide that binds to the MHC class I of interest (e.g., an HLA-A02). For example, a known peptide that binds to HLA-A02 is the HTLV-1 epitope $TAX_{11-19}$, having the amino acid sequence LLFGYPVYV (SEQ ID NO:3). As such, a suitable placeholder peptide that can be used in making subject peptide receptive MHC-I complexes has the amino acid sequence LFGYPVYV (SEQ ID NO:21). In some embodiments, wherein the MHC class I is HLA-A02, the placeholder peptide is one of the following sequences: LFGYPVYV (SEQ ID NO:21) (gTAX), Ac-LLFGYPVYV (SEQ ID NO:3) (N-terminally acetylated TAX), or lLFGYPVYV (SEQ ID NO:21) (first residue is a D-leucine). In some embodiments, where the MHC class I is mouse H-2D$^d$, the placeholder peptide has the sequence GPGRAFVTI (SEQ ID NO:13).(gP18-I10). In certain embodiments, where the MHC class I is mouse H-2L$^d$, the placeholder peptide is QLSPFPFDL (SEQ ID NO:15) (QL9). In other embodiments, where the MHC class I is HLA-A*24:02, the placeholder peptide is YPLTFGWCF (SEQ ID NO:20). In some embodiments, where the MHC class I is HLA-A*68:02, the placeholder peptide is LFGYPVYV (SEQ ID NO:21). In one aspect, provided herein is a composition that includes a p*MHC-I complex, wherein the MHC class I is HLA-A*24:02 and the placeholder peptide is YPLTFGWCF (SEQ ID NO:20). In another aspect, provided herein is a composition that includes a p*MHC-I complex, wherein the MHC class I is HLA-A*68:02 and the placeholder peptide is LFGYPVYV (SEQ ID NO:21).

Placeholder peptides are typically at least 8 amino acids long. In some embodiments, the placeholder polypeptide is at least 8, 9, 10, 11, 12 or 13 amino acids long. In particular embodiments, the polypeptide is 8, 9, 10, 11, 12 or 13 amino acids long.

In the second step, the p*MHC-I complex is incubated in the presence of a dipeptide and chaperone. In the presence of the dipeptide and chaperone, the placeholder peptide is displaced from the MHC class I and the chaperone binds the MHC class I to form the peptide receptive MHC-I complexes. In some embodiments, the chaperone acts catalytically on the p*MHC-I complex, changing it to a peptide receptive MHC-I capable of accepting a peptide of interest. As discussed above, the peptide receptive MHC-I complex is stable and can be stored for long periods of time prior to loading with one or more peptides of interest and formation of multimers (e.g., tetramers).

In some embodiments, the chaperone is a Tapasin Binding Protein Related (TAPBPR). TAPBPR protein includes a signal sequence, three extracellular domains comprising a unique membrane distal domain, an IgSF (immunoglobulin superfamily) V domain and an IgC1 domain, a transmembrane domain, and a cytoplasmic region. See, e.g., Boyle et al., PNAS 110 (9) 3465-3470 (2013). TAPBPR can be made by any method known in the art, including those described in Morozov et al., which is incorporated by reference herein, particularly for its teaching of methods of making TAPBR chaperones. In certain embodiments, the chaperone is Tapasin. In some embodiments, the chaperone (e.g., TAPBR) is incubated with the p*MHC-I complex and dipeptide at ratio of 1:1 chaperone to p*MHC-I complex. In an exemplary embodiment, the dipeptide is glycyl-methionine or glycyl-phenylalanine.

The incubation of the p*MHC-I, chaperone and dipeptide can be done for at least 1 hour, 2 hours, 3 hours, 4 hours, 5 hours and 6 hours. Following incubation, the resulting peptide receptive MHC-I complexes can be isolated by size exclusion chromatography (SEC) and confirmed using any technique known in the art, including, for example, liquid chromatography-mass spectrometry techniques.

In some embodiments, the p*MHC-I, chaperone and dipeptide are incubated at equimolar quantities of p*MHC-I and chaperone (e.g., TAPBR). In certain embodiments described below, the p*MHC-I and chaperone are incubated at a p*MHC-I: chaperone molar concentration of at least 10:1. In some embodiments, the p*MHC-I and chaperone are incubated at a p*MHC-I chaperone molar concentration of at least 10:1, 20:1, 30:1, 40:1, 50:1, 60:1, 70:1, 80:1, 90:1, 100:1, 500:1, or 1,000:1.

In some embodiments, the MHC class I of the p*MHC-I is an HLA-A. In an exemplary embodiment, the p*MHC-I includes an MHC class I that is HLA-A*24:02 or HLA-A*68:02.

In some embodiments, the MHC class I is a variant MHC class I that includes one or more mutations that reduces MHC class I binding affinity for TAPBR chaperone. Such a mutation advantageously facilitates subsequent peptide loading and/or peptide-MHC class I multimer complex production as described below. In some embodiments, the variant MHC class I includes one or more mutations in the $\alpha_3$ domain of the heavy chain that reduces MHC class I binding affinity for TAPBR chaperone.

In certain embodiments, either or both of the MHC class I heavy chain and p2-microglobulin molecules in the peptide receptive MHC-I composition are biotinylated. In an exemplary embodiment, the MHC-I heavy chain or light chain is biotinylated using a C-terminal BirA tag with any method known to one of skill in the art, including use of a biotin ligase. In an exemplary embodiment, the biotinylation occurs after the purification of the p*MHC-I complex. Biotinylation of peptide receptive MHC-I complex monomers allows for the attachment of such monomers to backbones (e.g., streptavidin or dextran) to form multimers (e.g., peptide receptive MHC-I complex tetramers) that can be used in various methods described herein.

C. Peptide-MHC Class I Complexes

The subject peptide receptive MHC-I complexes can be subsequently loaded with a peptide of interest. In this step, the purified peptide receptive MHC-I complex is incubated in the presence of the peptide of interest. Without being bound by any particular theory of operation, it is believed that when present in molar excess of the peptide receptive MHC-I complexes, the peptide of interest is loaded onto the MHC class I, thereby forming a peptide-MHC class I complex that includes the peptide of interest (pMHC-I). The resulting peptide-MHC class I (pMHC-I) complexes can further be used to form multimers, for example, tetramers. Uses for such multimers (e.g., the identification of antigen specific T cells) are further described herein.

In some embodiments, the peptide of interest is incubated at a molar excess of at least 2, 5, 10, 15, 20, 25, 30, 35, 40, 45, 50, 75 or 100 times to the peptide receptive MHC-I complex. In an exemplary embodiment, the peptide of interest is incubated at a molar excess of 50 times to the peptide receptive MHC-I complex. Such incubations can be carried out at room temperature for at least 30 minutes, 1 hour, 2 hours, 5, hours, 10 hours, 15 hours, 20 hours or a day.

Peptides of interest are typically 8 to 13 amino acids in length. In some embodiments, the peptide of interest is an antigen. In an exemplary embodiment, the peptide of interest is a tumor antigen. Tumor antigen peptides in the context of the MHC class I and multimer complexes described herein can be useful, for example, in the identification of T cells reactive to the antigen of interest.

Purification of the formed peptide-MHC class I (pMHC-I) complexes from the released chaperone can be carried out using size exclusion chromatography (SEC). The newly formed pMHC-I can be confirmed using any technique known in the art, including, for example, liquid chromatography-mass spectrometry techniques.

In some embodiments, the MHC class I of the peptide-MHC class I complexes is an HLA-A. In an exemplary embodiment, the HLA-A is HLA-A*24:02 or HLA-A*68:02. In one embodiment, the pMHC-I is biotinylated. In certain embodiments, the HLA includes an amino acid substitution in the $\alpha_3$ domain of the heavy chain. Such a mutation advantageously reduces HLA binding affinity for TAPBR chaperone, thereby facilitating subsequent peptide loading and/or peptide-MHC class I multimer complex production as described below.

D. Peptide-MHC Class I Multimer Complexes

Peptide-MHC class I (pMHC-I) complexes made using the subject methods described herein can undergo further multimerization to form multimers that include two or more of the pMHC-Is (i.e., pMHC-I multimers.) In certain embodiments, the multimers include 2, 3, 4, 5, 6, 7, 8, 9 or 10 pMHC-I molecules.

In some embodiments, pMHC-I multimers can be produced by attachment of biotinylated pMHC class I to a backbone (e.g., a streptavidin, avidin or dextran backbone), thereby forming a pMHC-I multimer. In an exemplary embodiment, the biotinylation occurs following the purification of p*MHC-I monomers and prior to the formation of peptide receptive MHC-I complexes. In some embodiments wherein large scale production of pMHC-I multimer libraries is desired, aliquots of the peptide receptive MHC-I complexes are incubated with various peptides of interest and allowed to undergo peptide loading. The resulting pMHC-class I complexes are then multimerized in the presence of a suitable multimer backbone to form pMHC-class I multimers (e.g., tetramers). In some embodiments, the backbone is a streptavidin backbone. In certain embodiments, the backbone is an avidin backbone. In other embodiments, the backbone is a dextran backbone.

In other embodiments, peptide receptive MHC-I complexes are biotinylated and then attached to a backbone (e.g., a streptavidin, avidin or dextran backbone), thereby forming peptide receptive MHC-I complex multimers (e.g., tetramers). Such peptide receptive MHC-I complex multimers can be used for the large scale production of pMHC-I multimers comprising one or more peptides of interest by contacting the peptide receptive MHC-I complex multimers with the one or more peptides of interest. For example, in one embodiment, aliquots of the peptide receptive MHC-I complex multimers are contacted with different peptides of interest, thereby forming a library of pMHC-I multimers. After loading of the pMHC-I multimers with peptides of interest, the resulting loaded pMHC-I multimers can be washed to remove any free chaperones, labels (e.g., nucleic acid barcodes) and/or peptides of interest. Following such a washing step, the exchanged pMHC-I multimers can be stored (e.g., 4° C. for several weeks) or used immediately. In some embodiments, the free chaperones, labels and/or peptides of interest are removed by spin column dialysis.

In certain embodiments, the placeholder peptide-MHC class I (p*MHC-I) complexes are biotinylated and the biotinylated p*MHC-Is are incubated in the presence of chaperones, dipeptides and multimer backbones (e.g., streptavidin-PE) under conditions wherein peptide receptive MHC-I complex multimers (e.g., tetramers) are formed. Such peptide receptive MHC-I complex multimers (e.g., tetramers) can be loaded with peptides of interest (e.g., antigen peptides) as described above.

In some embodiments, the placeholder peptide-MHC class I (p*MHC-I) complexes are incubated in the presence of chaperones, dipeptides and multimer backbones using a "stoichiometric" approach with equimolar quantities of p*MHC-I and chaperone (e.g., TAPBR).

In certain embodiments, a "catalytic" approach is taken wherein biotinylated p*MHC-Is are incubated in the presence of chaperones, dipeptides, multimer backbones (e.g., streptavidin-PE) and peptides of interest under conditions wherein peptide-MHC class I (pMHC-I) multimers (e.g., tetramers) are formed. In such embodiments, the p*MHC-I and chaperone are incubated at a p*MHC-I: chaperone molar concentration of at least 10:1, 20:1, 30:1, 40:1, 50:1, 60:1, 70:1, 80:1, 90:1, 100:1, 500:1, or 1,000:1. In exemplary embodiments, the p*MHC-I and chaperone are incubated at a p*MHC-I: chaperone molar concentration of 100:1. In such embodiments, molecular tags (e.g., DNA barcodes) can also be added in the incubation to form wherein peptide-MHC class I (pMHC-I) multimers (e.g., tetramers) with tagged backbones to facilitate tracking and detection as explained below.

In some embodiments, the pMHC-I multimer is a dimer. In some embodiments, the pMHC-I multimer is a trimer. In preferred embodiments, the pMHC-I multimer is a tetramer. In one embodiment, the multimer is a dextramer. Dextramers include ten pMHC-I complexes attached to a dextran backbone. Dextramers allow for the detection, isolation, and quantification of antigen specific T-cell populations due to an improved signal-to-noise ratio not present in prior generations of multimers. See, e.g., Bakker and Schumacher, *Current Opinion in Immunology* 17(4): 428-433 (2005); and Davis et al., *Nature Reviews Immunology* 11:551-558 (2011).

In some embodiments, the backbone is conjugated with a detectable label (e.g., a fluorophore or a radiolabel) that allow the multimer to be detected in various applications. In certain embodiments, the detectable label is as fluorophore. See, e.g., Nepom et al., *J Immunol* 188 (6) 2477-2482 (2012). In one embodiment, the detectable label is a radiolabel. In certain embodiments, the backbone includes a barcode (e.g., a nucleic acid barcode) that allows the MHC class I multimer to be used in large scale high throughput processes. See, e.g., Bentzen et al., *Nature Biotechnology* 34(1): 1037-1045 (2016). In an exemplary embodiment, unique barcodes are used for each of the different peptides of interest included in the pMHC-I multimers, thereby allowing for the tracking, sorting and identification of particular pMHC-I multimers in high throughput applications. In particular embodiments, each barcode includes a unique nucleotide sequence.

In some embodiments, the pMHC-I multimer complex is coupled to a toxin (e.g., saporin). Such pMHC-I multimer conjugates can be used to modulate or deplete specific T cell populations. See, e.g., Maile et al., *J. Immunol.* 167: 3708-3714 (2001); and Yuan et al., *Blood* 104: 2397-2402 (2004).

E. Peptide-MHC Class I Multimer Libraries

The methods provided herein allow for the large scale production of stable peptide receptive MHC-I complexes that can in turn be used to produce pMHC-I multimer libraries that include a plurality different peptides of interest for high throughput applications.

In one aspect provided herein, peptide receptive MHC-I complex multimers (e.g., tetramers) are used to form a peptide-MHC class I (pMHC-I) multimer library that includes pMHC-I multimers having different peptides of interest. Such pMHC-I multimers can be made by contacting aliquots of peptide receptive MHC-I complex multimers with different peptides of interest. In some embodiments, the peptides of interest are different peptides from an antigen of interest. In certain embodiments, the antigen of interest is a tumor antigen.

In some embodiments, pMHC-Is that include the same peptide of interest are attached to backbones to form pMHC-I multimers and the step is performed for a plurality of pMHC-Is that include a library of different peptides of interest. The resulting pMHC-I multimers (e.g., tetramers) are subsequently pooled to form the pMHC-I multimer library.

In some embodiments, each of the pMHC-I multimer in the library have the same MHC class I allele. In certain embodiments, the MHC class I is HLA-A. In an exemplary embodiment, the HLA-A is HLA-A*24:02 or HLA-A*68:02.

In some embodiments, the library includes pMHC-I multimers with different MHC class I alleles. In some embodiments, the library includes pMHC-I tetramers.

In certain embodiments, the pMHC-I multimer library includes over 10, 20, 30, 40, 50, 60, 70, 80, 90, 100, 200, 250, 300, 400, 500, 600, 700, 800, 900, 1,000, $1 \times 10^4$, $1 \times 10^5$, $1 \times 10^6$, $1 \times 10^7$, or $1 \times 10^8$ different peptides. In some embodiments, each pMHC-I multimer in the library includes a detectable marker. In some embodiments, each pMHC-I multimer in the library includes a nucleic acid bar code or a fluorophore that is used to identify peptide of interest included in the pMHC-I multimer, wherein each barcode or fluorophore corresponds to a different peptide of interest. In some embodiments, each of the pMHC-I multimer in the library includes the same detectable label.

F. Methods of Use

In certain embodiments, the pMHC-I multimer is a pMHC-I tetramer. MHC class I tetramers provided herein can be used to study pathogen immunity, for the development of vaccines, in the evaluation of antitumor response, in allergy monitoring and desensitization studies, and in autoimmunity. See, e.g., Nepom et al., *J Immunol* 188 (6) 2477-2482 (2012); and Davis et al., *Nature Reviews Immunology* 11:551-558 (2011).

In some embodiments, the pMHC-I multimers are used to characterize T cell (e.g., CD8 T cell) responses to a vaccine, including, but not limited to influenza, yellow fever, tuberculosis, and HIV/SIV vaccines. In an exemplary embodiment, the vaccine is a cancer vaccine. In particular embodiments, the cancer vaccine is melanoma or chronic myeloid leukemia. In such embodiments, a sample (e.g., a blood sample) of a vaccinated patient is contacted with one or more of the subject pMHC-I multimers that include one or more peptide of interests derived from the vaccine to identify and monitor antigen specific T cells that are produced in response to the vaccine.

Peptide-MHC class I multimers provided herein can also be used to isolate and enrich particular antigen specific T cells for therapeutic use. See, e.g., Cobbold et al., *J. Exp. Med.* 202: 379-386 (2006); and Davis et al., *Nature Reviews Immunology* 11:551-558 (2011). In this particular application, patient samples are contacted with sortable pMHC-I multimers that include a peptide antigen of interest and a label that allows for sorting (e.g., a fluorophore or nucleic acid label). Antigen specific T cells that bind the pMHC-I multimer are subsequently isolated and purified, for example, using flow cytometry or similar cell sorting and identification techniques.

In certain embodiments, the peptide-MHC class I multimers provided herein are used for epitope mapping. In this method, a plurality of peptide-MHC class I multimers that include different peptides derived from an antigen of interest (e.g., a tumor antigen) are contacted with a sample from a subject. Antigen specific T cells are detected and the corresponding epitope peptide sequences are identified any technique known in the art, include, for example, flow cytometry and cell sorting techniques. See, e.g., Bentzen et al., *Nat Biotechnol.* 34(10):1037-1045 (2016).

In some embodiments, the peptide-MHC class I multimers provided herein are used to determine a T cell profile of one or more subjects. In such an embodiment, a sample from a subject is contacted with a library of pMHC-I multimers that include a library of peptide of interest and a detectable label. Identification of antigen specific T cells that bind particular peptides of interest presented in the context of the pMHC-I multimers is achieved using the detectable label. The methods described herein allow for the large scale production of pMHC-I multimer libraries that can in turn be used for high throughput T cell profiling.

In another aspect, the pMHC-I multimers are used therapeutically for the targeted elimination of particular antigen specific T cells in a subject. In one embodiment, the pMHC-I multimers are conjugated to a cytotoxic agent or a toxin. When administered to a subject, the pMHC-I multimer conjugates attach to and facilitate the elimination of particular antigen specific T cells.

Peptide-MHC class I multimers used in the methods described herein can be tracked and detected using any suitable techniques including, but not limited to, techniques utilizing detectable labels and nucleic acid barcodes that allow identification of particular peptide-MHC class I multimers. In addition, T cells of interest isolated in such methods can also be identified using similar techniques.

T cells of interest that interact with pMHC-I multimers can be isolated using any suitable technique including, for example, flow cytometry techniques. Isolated T cells and corresponding peptide-MHC class I multimers can then be characterized using any suitable method, for example, the ECCITE-seq method as explained below in conjunction with 10× Genomics 5P V(D)J kit. This method incorporates a cellular barcode into cDNA generated from both tetramer oligos and TCR mRNA, thus the pairing of cellular barcodes can connect TCR sequences and other mRNAs with pMHC-I multimers specificities.

EXAMPLES

Introduction

T cells recognize foreign or aberrant antigens presented by MHC-I expressing cells through the T cell receptor (TCR) and is the first critical step towards establishment of protective immunity against viruses and tumors (Germain & Margulies, *Annu Rev Immunol* 11:403-450 (1993)). Fluorescently tagged, multivalent MHC class-I reagents (multimers) displaying individual peptides of interest have revolutionized detection of antigen specific T cells (Altman et al., Science 274:94-96 (1996)). Staining with multimers followed by flow cytometry is routinely used to interrogate T cell responses, to characterize antigen-specific TCR repertoires and to identify immunodominant clones (Glanville et al., Nature 547:94 (2017); DeWitt et al., Elife 7:e38358 (2018); and Dash et al., Nature 547:89 (2017)). However, polyclonal repertoires are estimated to contain $10^5$-$10^8$ TCRs of distinct antigen specificities (Arstila et al., Science 286:958-961 (1999)). Preparing libraries of properly conformed peptide/MHC-I (pMHC-I) molecules displaying an array of peptide epitopes to probe such repertoires remains a significant challenge, due to the inherent instability of empty (i.e. peptide deficient) MHC-I molecules. To circumvent the problem of unstable peptide deficient MHC-I molecules, conditional MHC class I ligands are used (Toebes et al., Nat Med 12:246-251 (2006)). Conditional ligands, bound to the MHC-I, can be cleaved by exposure to UV light (Bakker et al., Proceedings of the National Academy of Sciences 105:3825-3830 (2008)), or to increased temperature (Luimstra et al., J Exp Med 215, 1493-1504, doi: 10.1084/jem.20180156 (2018)). Upon cleavage and in the presence of a peptide of interest, a net exchange occurs where the cleaved conditional ligand dissociates and the peptide of interest associates with the MHC-I, thereby forming the desired pMHC-I complex. Such conditional ligands, however, also have limitations. The use of photo-cleavable peptides necessitates a more elaborate protein purification protocol, and may lead to increased aggregation and sample loss during the peptide exchange step. Dipeptides, which compete with the C-terminus of bound peptides to promote exchange (Saini et al., Pro. Natl Acad. Sci. USA 112:202-207 (2015)), and the stabilization of empty MHC-I molecules using an engineered disulfide bond (Saini et al., Sci Immunol 4, doi:10.1126/sciimmunol.aau9039 (2019)) have been recently proposed as alternatives to catalyze peptide exchange under physiological conditions.

TAPasin Binding Protein Related (TAPBPR) is a chaperone protein homologue of Tapasin involved in the quality control of pMHC-I molecules (Boyle et al., Proc Natl Acad Sci U SA 110:3465-3470 (2013)). TAPBPR associates with MHC-I molecules to edit the repertoire of displayed peptides at the cell surface (Hermann et al., Elife 4:e09617 (2015)). In a similar manner to Tapasin (Chen & Bouvier, The EMBO Journal 26:1681-1690 (2007)), TAPBPR binds several MHC-I alleles in vitro to promote the exchange of low- for high-affinity peptides (Morozov et al., Pro. Natl. Acad. Sci. 113:E1006-E1015 (2016)). Using solution NMR, a detailed characterization of the TAPBPR peptide exchange cycle for the murine H-2D$^d$ molecule was recently performed (McShan et al., Nat. Chem. Biol. 14:811 (2018)). This work revealed a critical role for N-terminal peptide interactions with the MHC-I peptide-binding groove, which allosterically regulates TAPBPR release from the pMHC-I. Peptide binding is therefore negatively coupled to chaperone release and, conversely, the affinity of incoming peptides for the MHC-I groove is decreased by 100-fold in the presence of TAPBPR molecule (McShan et al., Nature Chemical Biology 14:811 (2018)), due to a widening of the MHC-I groove, as directly observed in X-ray structures of MHC-I/TAPBPR complexes (Jiang et al., Science 358, 1064-1068 (2017); and Thomas & Tampé, Science 358, 1060-1064 (2017)). In follow up work (McShan et al., Proc. Natl Acad. Sci. USA 116:25602-25613 (2019)), the molecular determinants which confer specificity of interactions between TAPBPR and different class-I MHC alleles have been elucidated. This work revealed an approx. 5% "minor" conformation with a widened peptide-binding groove and altered dynamics at the $a_3/\beta_2m$ interface exhibited by some MHC alleles, which enables binding to TAPBPR, consistently with reports that polymorphisms within the F-pocket of the groove relate to recognition by Tapasin (Rizvi et al., J Immunol 192, 4967-4976 (2014)) and TAPBPR (Ilca et al., Cell Rep 29:1621-1632 (2019)).

Figure 1:
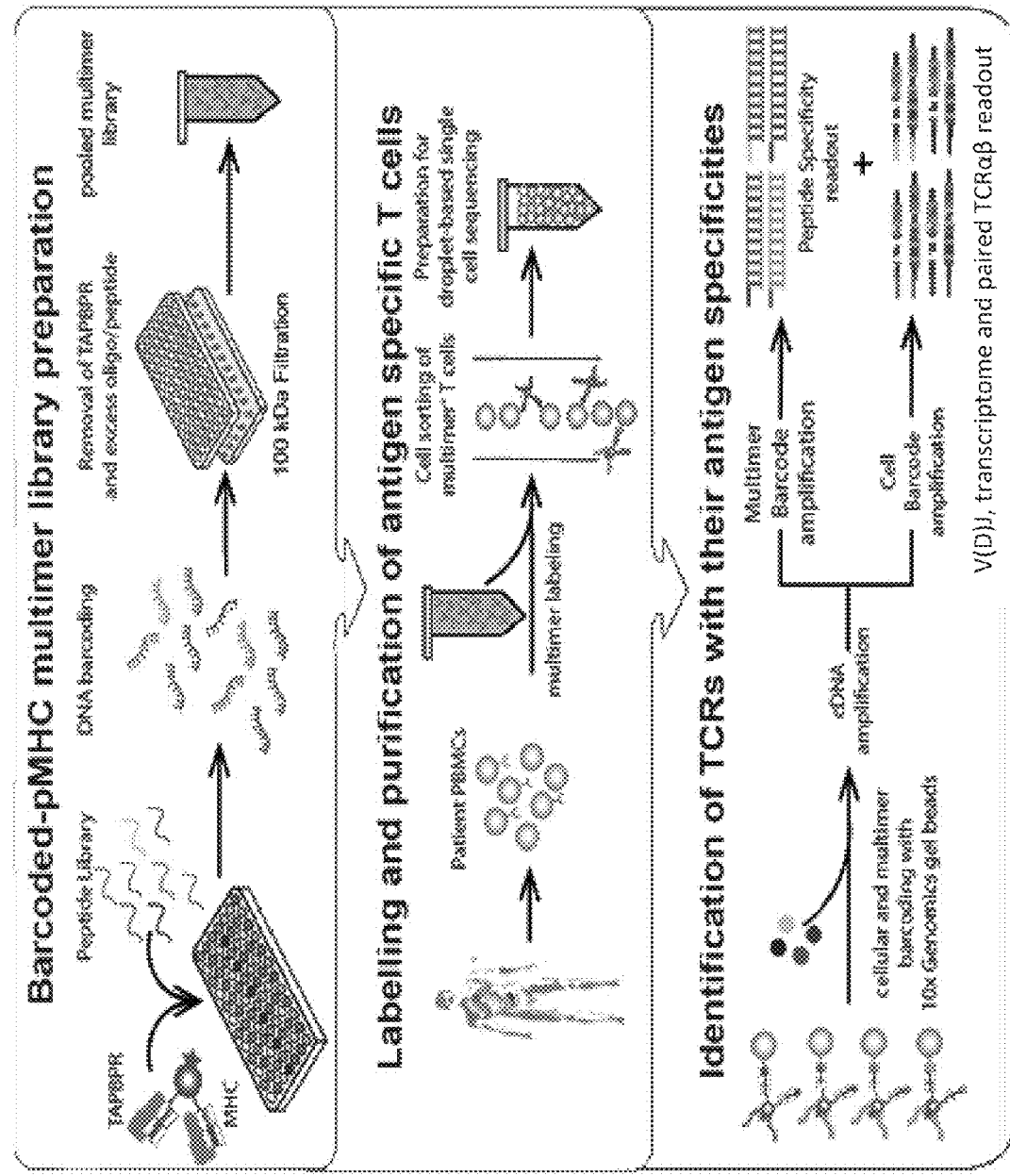
FIG. 1 provides a schematic of a method for linking peptide specificities with T cell transcriptomes as described herein. Fluorophore-labeled, empty MHC-I/TAPBPR multimers are loaded with peptides of interest on a 96-well plate format and individually barcoded with DNA oligos designed for 10× Genomics and Illumina compatibility. TAPBPR and excess peptide, along with free oligo, are removed by centrifugation and the multimers are pooled together. A single patient sample can be stained with the pooled multimer library, and collected by fluorescence-activated cell sorting. Tetramer associated oligos and cellular mRNA from individual cells are then barcoded using 10× Genomics gel beads, followed by cDNA synthesis, library preparation and library sequencing. This workflow enables the transcriptome and paired ap TCR sequences to be linked with pMHC specificities in a single experiment.

These mechanistic insights were leveraged to design conditional ligands for the production of peptide deficient MHC-I/TAPBPR complexes for multiple murine and human MHC-I allotypes, independent of photo-cleavable peptides. Empty MHC-I/TAPBPR complexes are stable for months, can be readily multimerized and loaded with peptides of interest in a high-throughput manner. Focusing on a common human allele, HLA-A*02:01, the capability of the system was extended by incorporating multi-modal cellular indexing technology (ECCITE-seq) (Mimitou et al., Nat Methods 16:409-412 (2019); and Stoeckius et al., Nat Methods 14:865 (2017)). The resulting library of barcoded, TAPBPR exchanged tetramers can be directly applied in a multiplexed analysis of numerous antigen-specificities simultaneously, enabling the identification of TCR V(D)J sequences together with other T cell transcriptional markers of interest in a single cell format (FIG. 1). The use of a protein chaperone to accomplish peptide exchange, a task previously addressed using UV-sensitive synthetic peptide ligands (Bakker et al., Proc. Natl Acad. Sci. USA 105:3825-3830 (2008)), in vitro translation systems (Zhang et al., Nat Biotechnol, doi:10.1038/nbt.4282 (2018)) or disulfide-linked MHC molecules ((Saini et al., Sci Immunol 4, doi: 10.1126/sciimmunol.aau9039 (2019)), leads to clear gains in terms of ease of use, efficiency and sensitivity. Moreover, the indexing design allows a convenient workflow that is fully compatible with a commercially available kit, thereby allowing TCR specificities to be interrogated easily at large scale. Given the central role of T cell responses, this work is of immediate practical relevance to experimental immunologists and cancer biologists, with clear biomedical ramifications toward the development of T cell-based diagnostics and autologous therapies.

Results

Isolation of Empty MHC-I/TAPBPR Complexes Using Placeholder Peptides

Figure 2A:
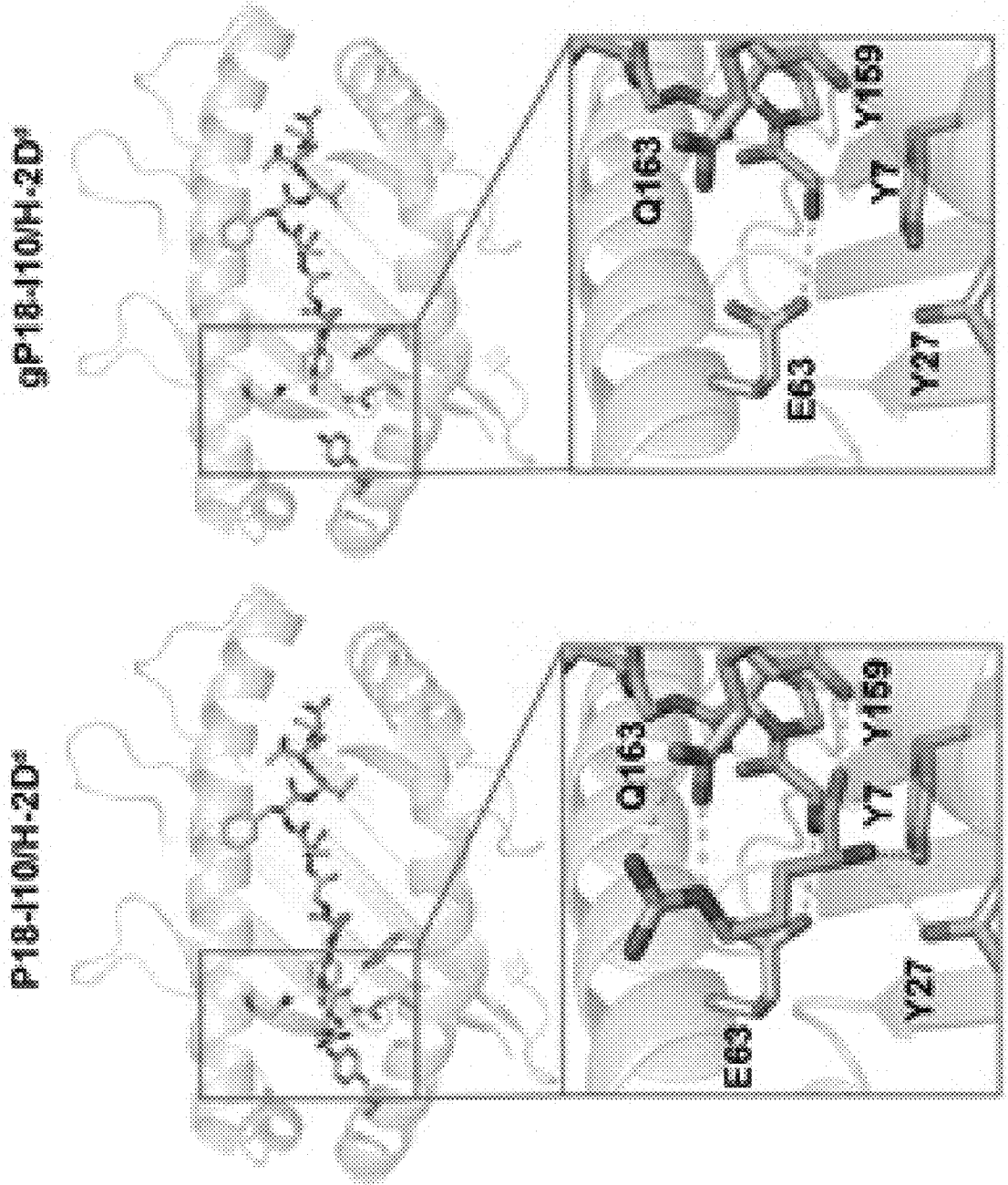
FIG. 2A-FIG. 2C depict the structure-guided design of placeholder peptides for murine MHC-I molecules. Crystal structures showing stabilizing contacts in the A-pocket of the MHC-I peptide-binding groove for: (A) P18-I10/H-2D$^d$ (PDB 3ECB[1]) with the bound peptide shown in light red. (B) and (C) Structure of p29/H-2L (PDB 1LD9[2]), and QL9/H-2L (PDB 3TF7[3]), with bound peptides shown in yellow.
Figure 2B:
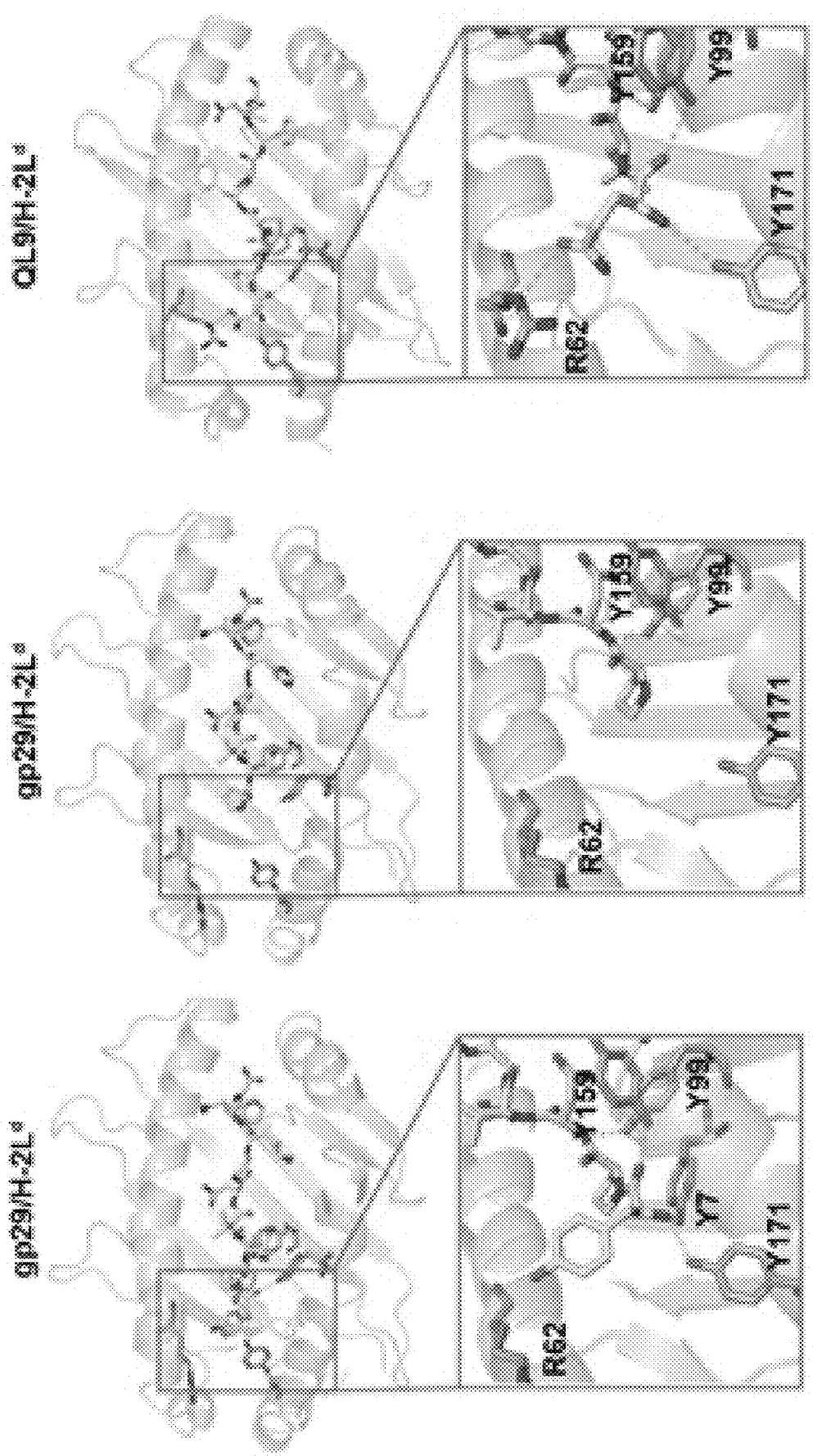
Figure 2C:
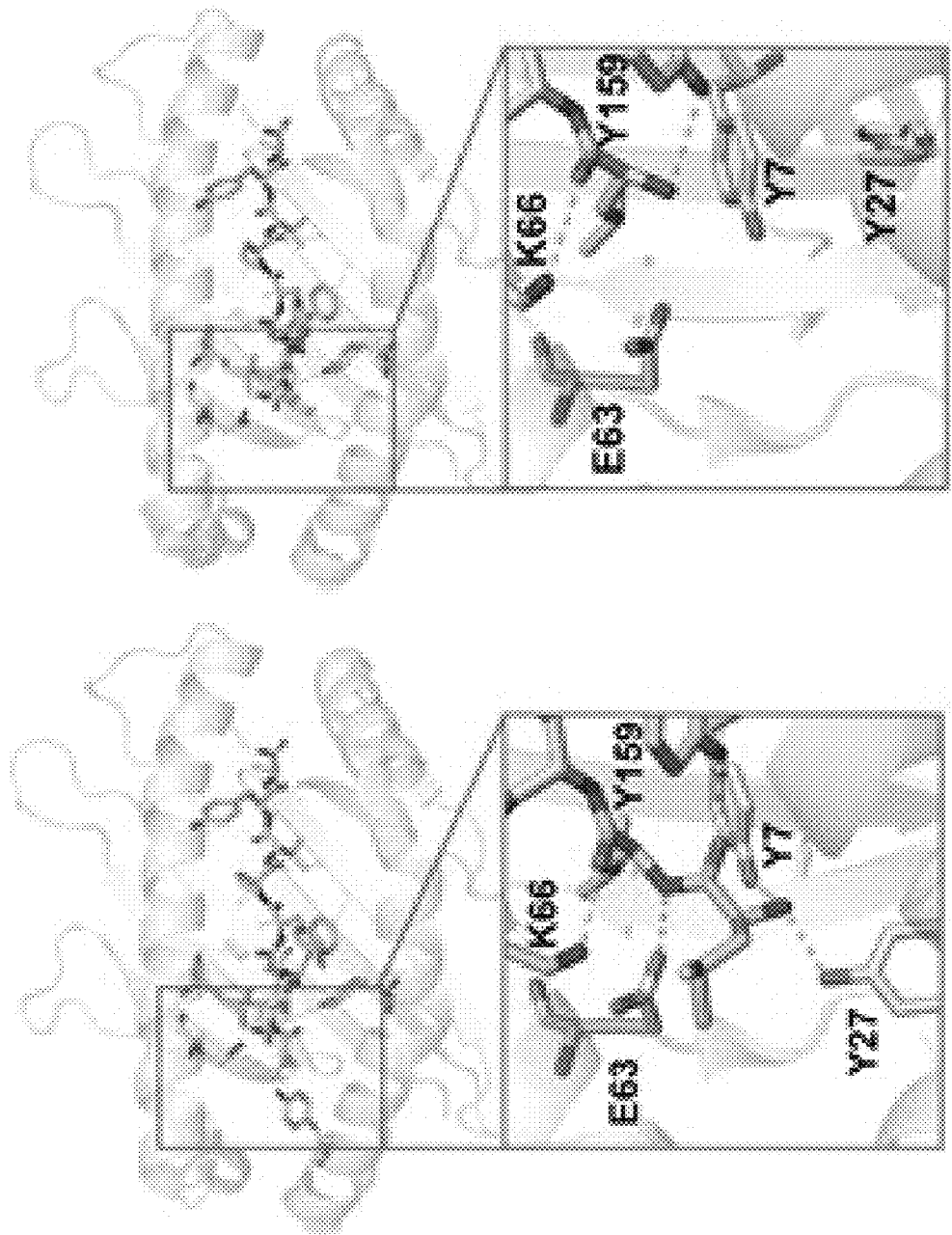
Figure 8A:
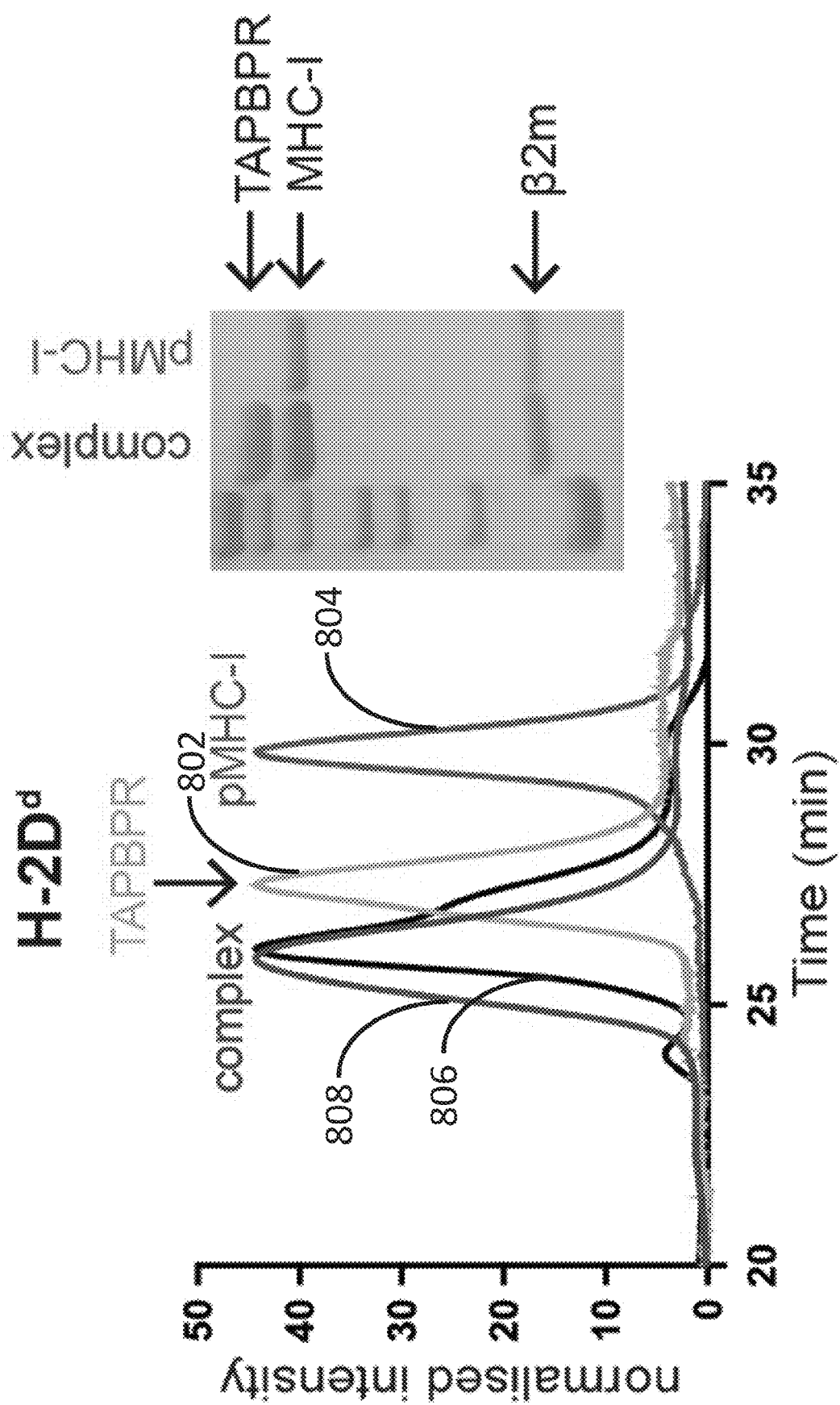
Figure 8B:
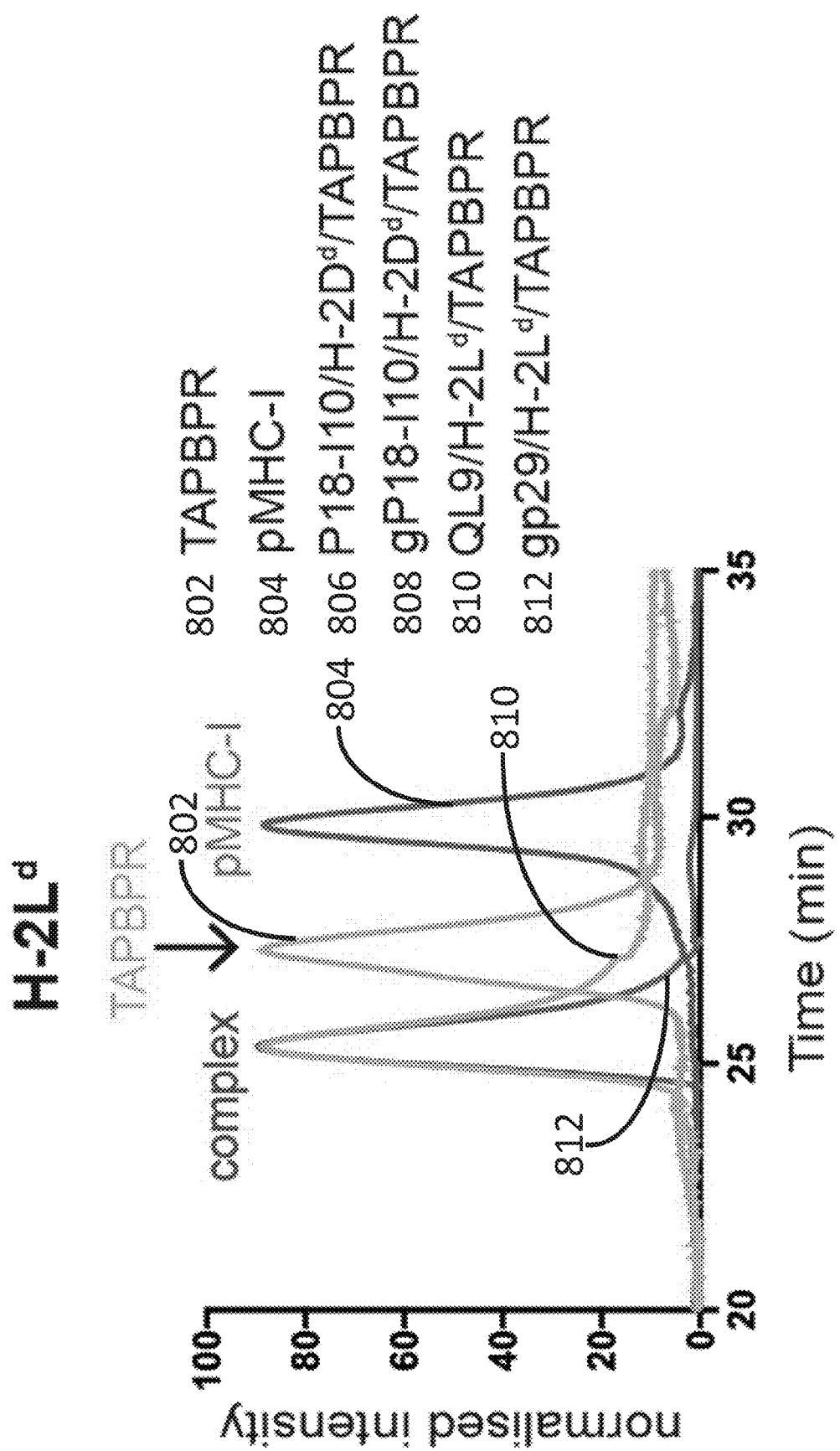
Figure 8C:
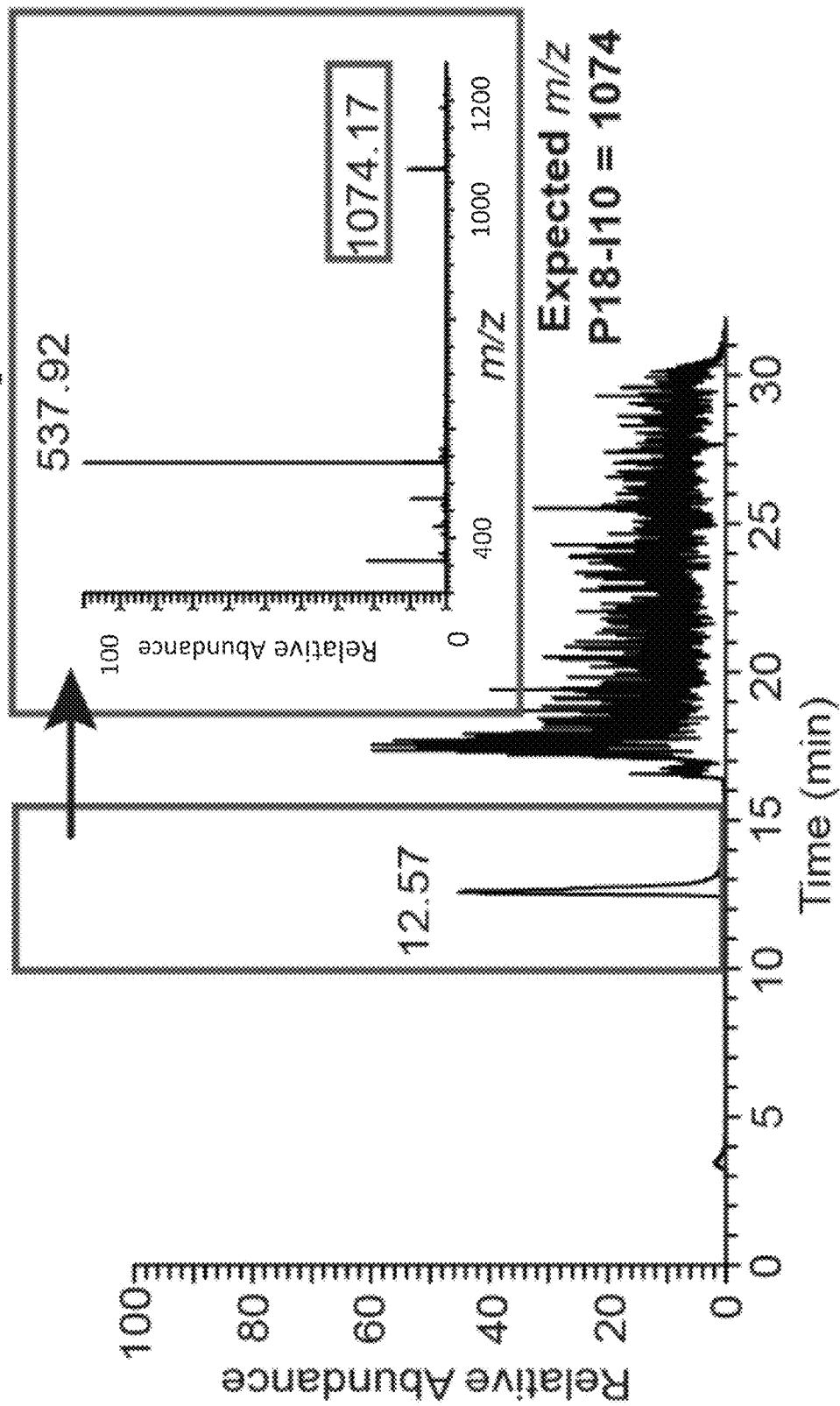
Figure 8D:
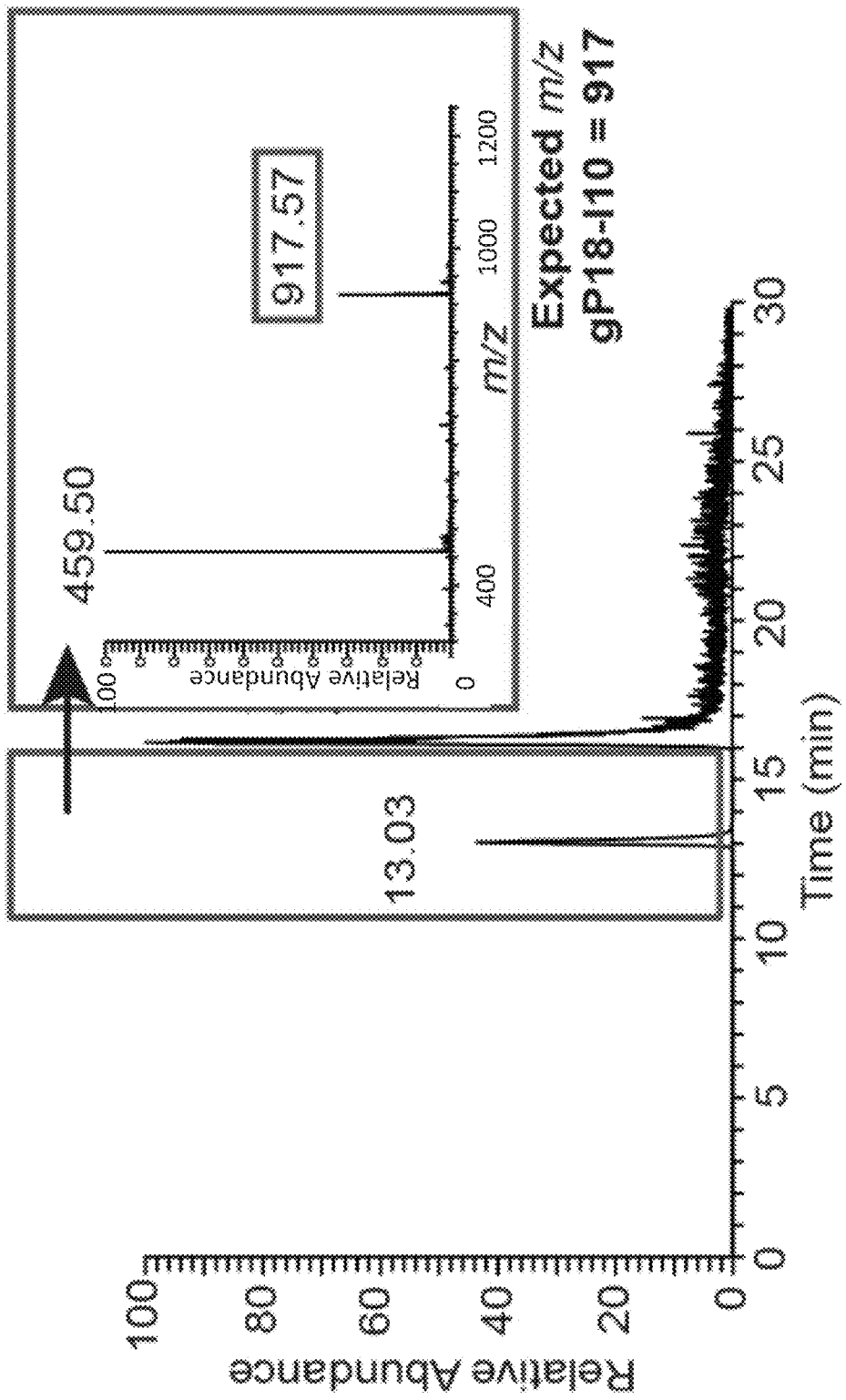
Figure 8E:
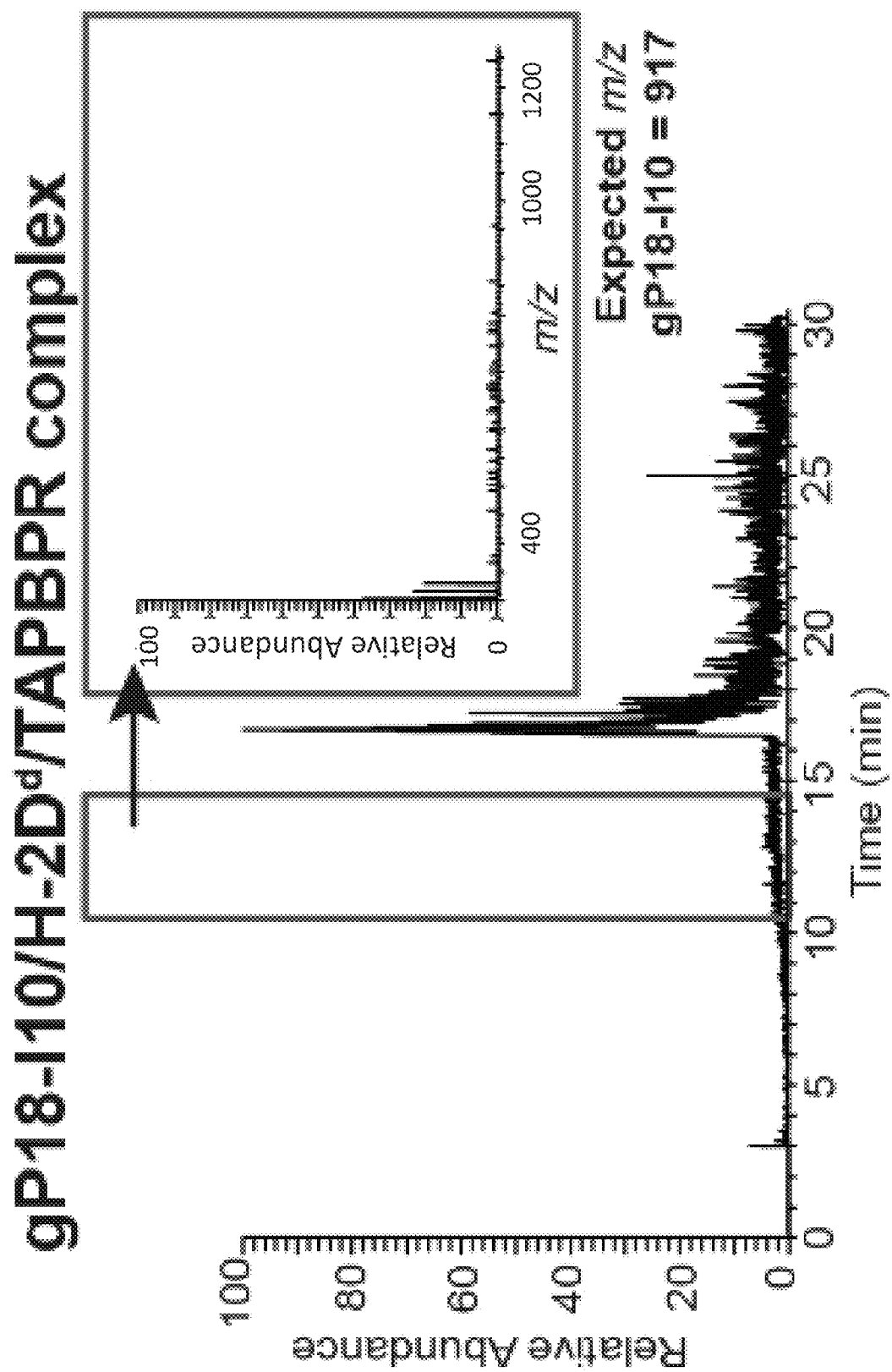
Figure 8F:
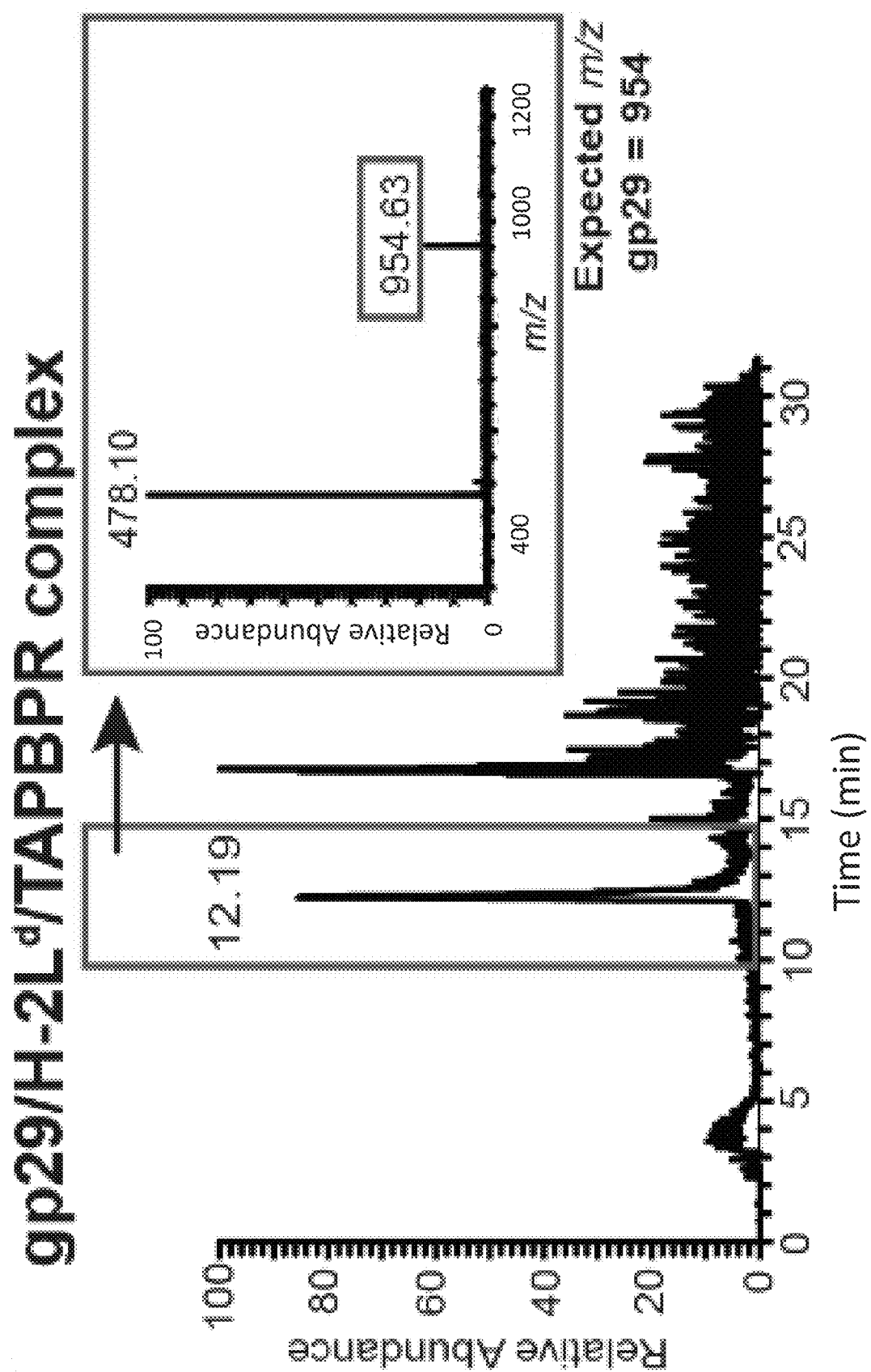
Figure 8G:
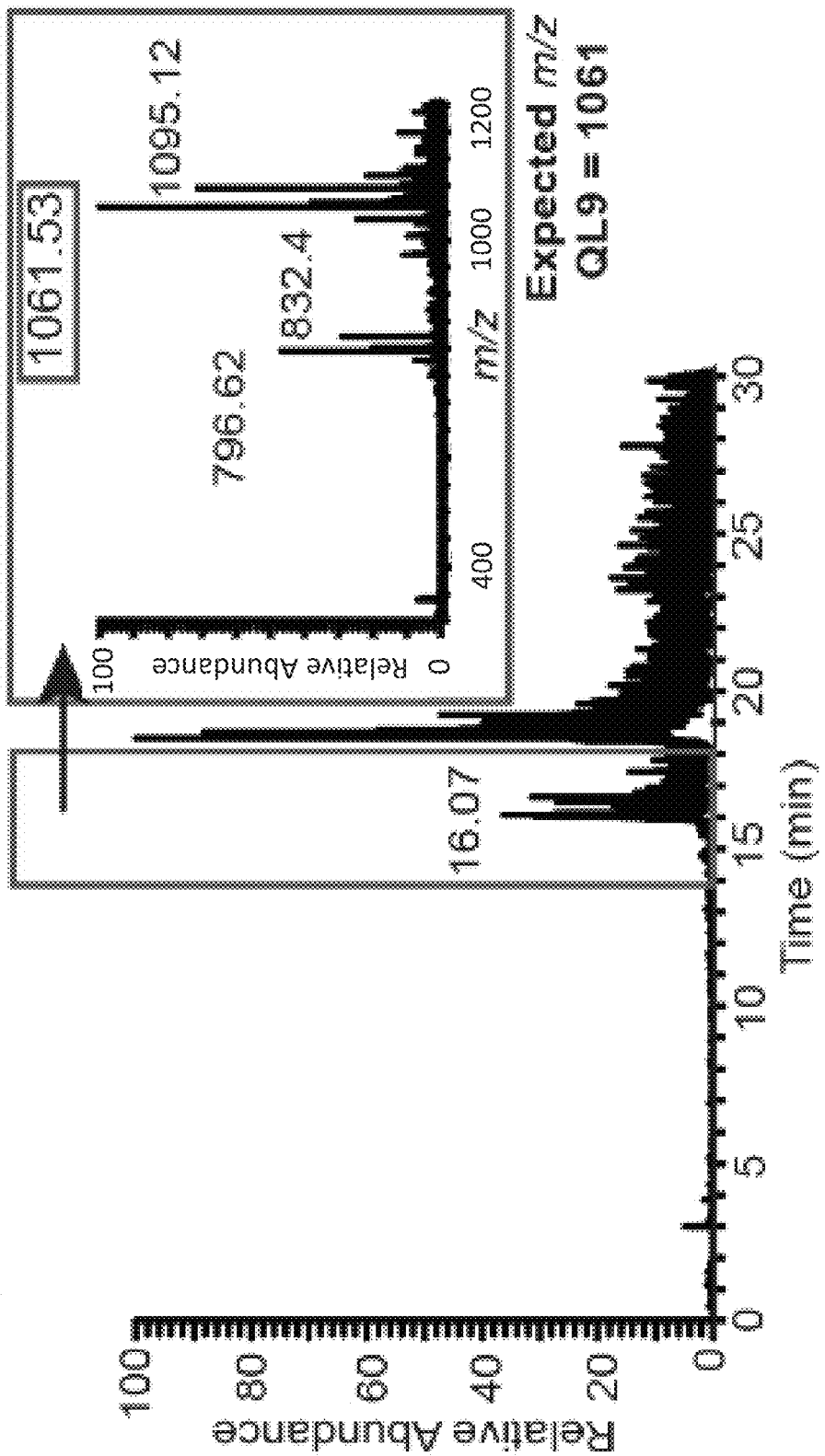
Figure 8H:
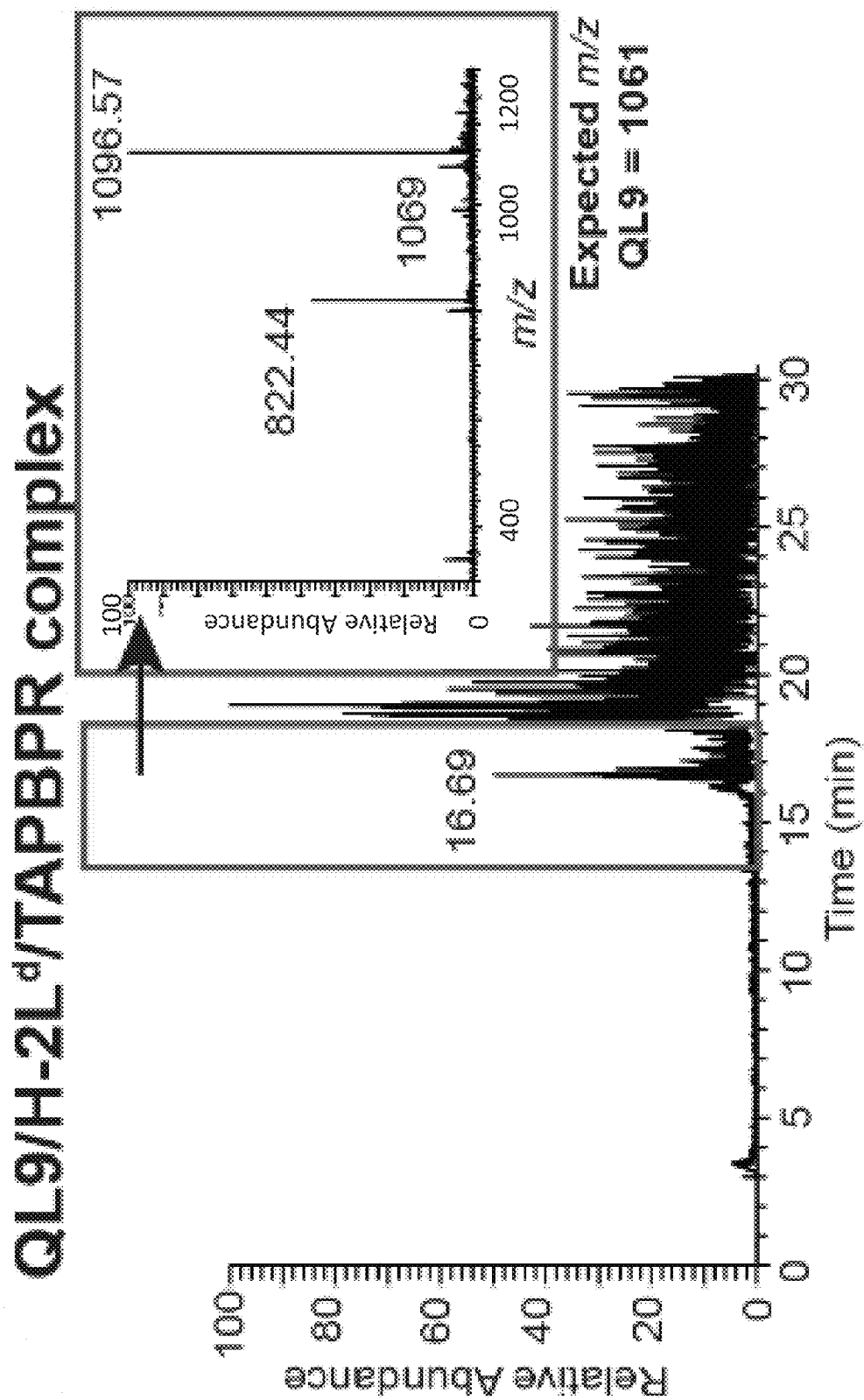

To circumvent the need for photo-cleavable ligands, previously used to demonstrate high-affinity TAPBPR binding to empty MHC-I molecules (Morozov et al., Pro. Natl. Acad. Sci. 113:E1006-E1015 (2016)), the use of destabilizing placeholder peptides was explored. Recently, a destabilizing N-terminally truncated mutant of the P18-I10 peptide _GPGRAFVTI (SEQ ID NO:13) (gP18-I10, FIG. 2a) has been described (McShan et al., Nat. Chem. Biol. 14:811 (2018)). gP18-I10 showed a high affinity for a free H-2D$^d$ groove during in vitro refolding, but dissociated in the presence of TAPBPR to generate stable, empty H-2D$^d$/TAPBR complexes (FIGS. 8a and d). In contrast, full length P18-I10 remained captured in the groove of the H-2D$^d$/TAPBPR complex (FIGS. 8a and b). The previously reported 100-fold increase in the peptide off-rate for gP18-I10 relative to full-length P18-I10 peptide (McShan et al., Nat. Chem. Biol. 14:811 (2018)) resulted from the loss of specific polar contacts in the H-2D$^d$ A-pocket (FIG. 2a), as further reflected in predicted $IC_{50}$ values (24 µM gP18-I10 vs 23 nM for P18-I10). Therefore, this destabilizing peptide has been termed a goldilocks peptide (gP18-I10). Extending the same concept to a different murine MHC-I molecule, H-2L$^d$, an N-terminal truncation of the high-affinity p29 nonamer _PNVNIHNF (SEQ ID NO:14) ($IC_{50}$ of 16.5 μM) was tested. However, the resulting 8mer peptide remained bound to the H-2L$^d$/TAPBPR complex (FIGS. 8a and e, FIG. 2b), indicating that truncation of the extreme N-terminal residue cannot be used as a general rule to generate goldilocks peptides (FIG. 8e). As p29 fits the typical H-2L$^d$ binding motif of xPxx[NA]xx[FLM], QLSPFPFDL (SEQ ID NO:15) (QL9), a predicted low-affinity peptide ($IC_{50}$ of 9.27 μM) with non-canonical Leu and Phe residues at position 2 and 5, respectively, was explored. Using QL9 as a placeholder peptide, empty H-2L$^d$/TAPBPR complexes were obtained by further adding 10 mM Gly-Phe dipeptide (GF), which promotes peptide release by directly competing for interactions in the F-pocket of the peptide-binding groove (Saini et al., *Pro. Natl Acad. Sci. USA* 112:202-207 (2015)) (FIGS. 8f-g, FIG. 2b). Taken together, these results establish the principle that destabilization of peptide interactions at both ends of the groove, through a range of approaches, can be used to generate peptide-deficient MHC-I/TAPBPR complexes.

TAPBPR-Mediated Peptide Loading on Disease Relevant HLA Alleles

Figure 3B:
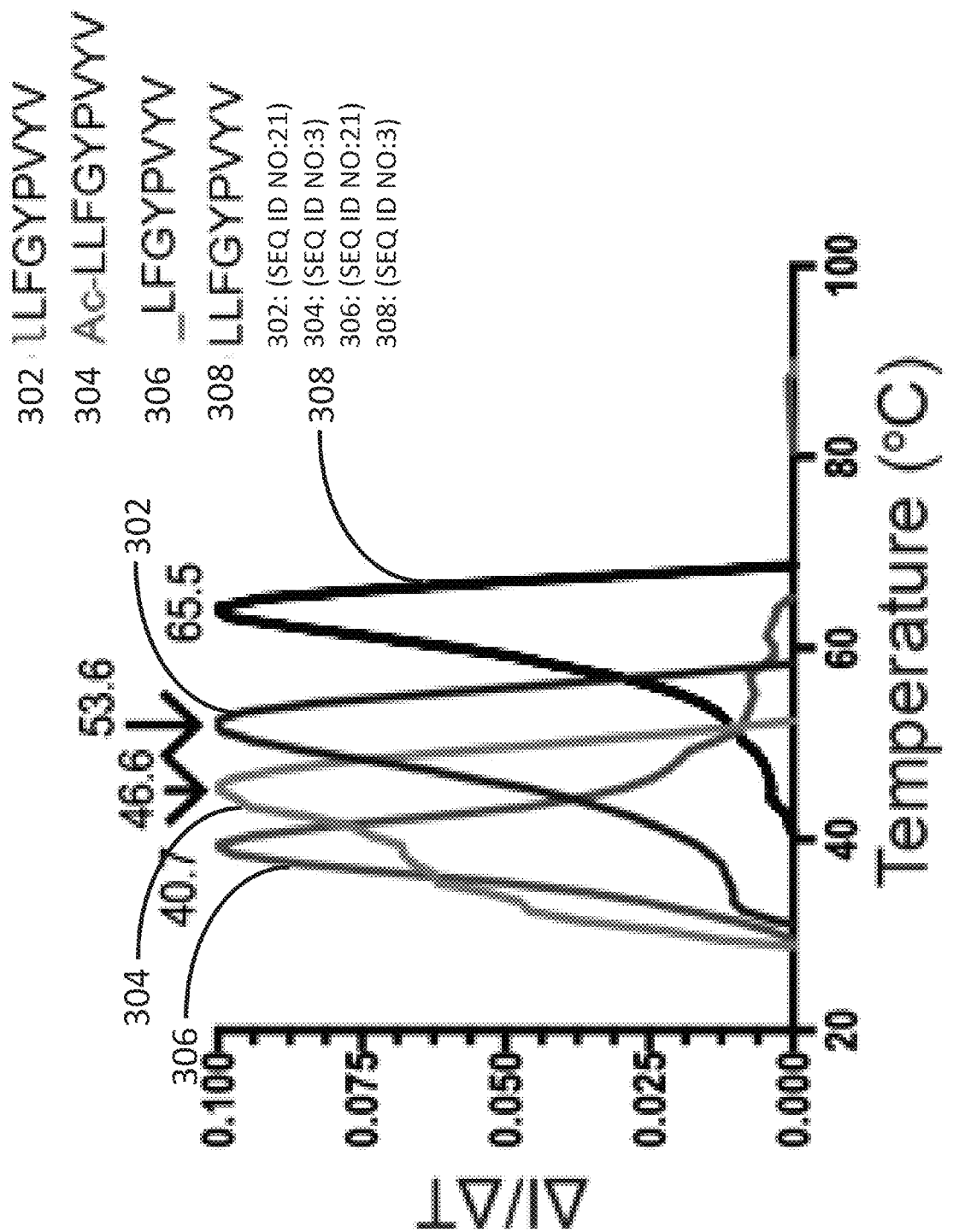
Figure 3C:
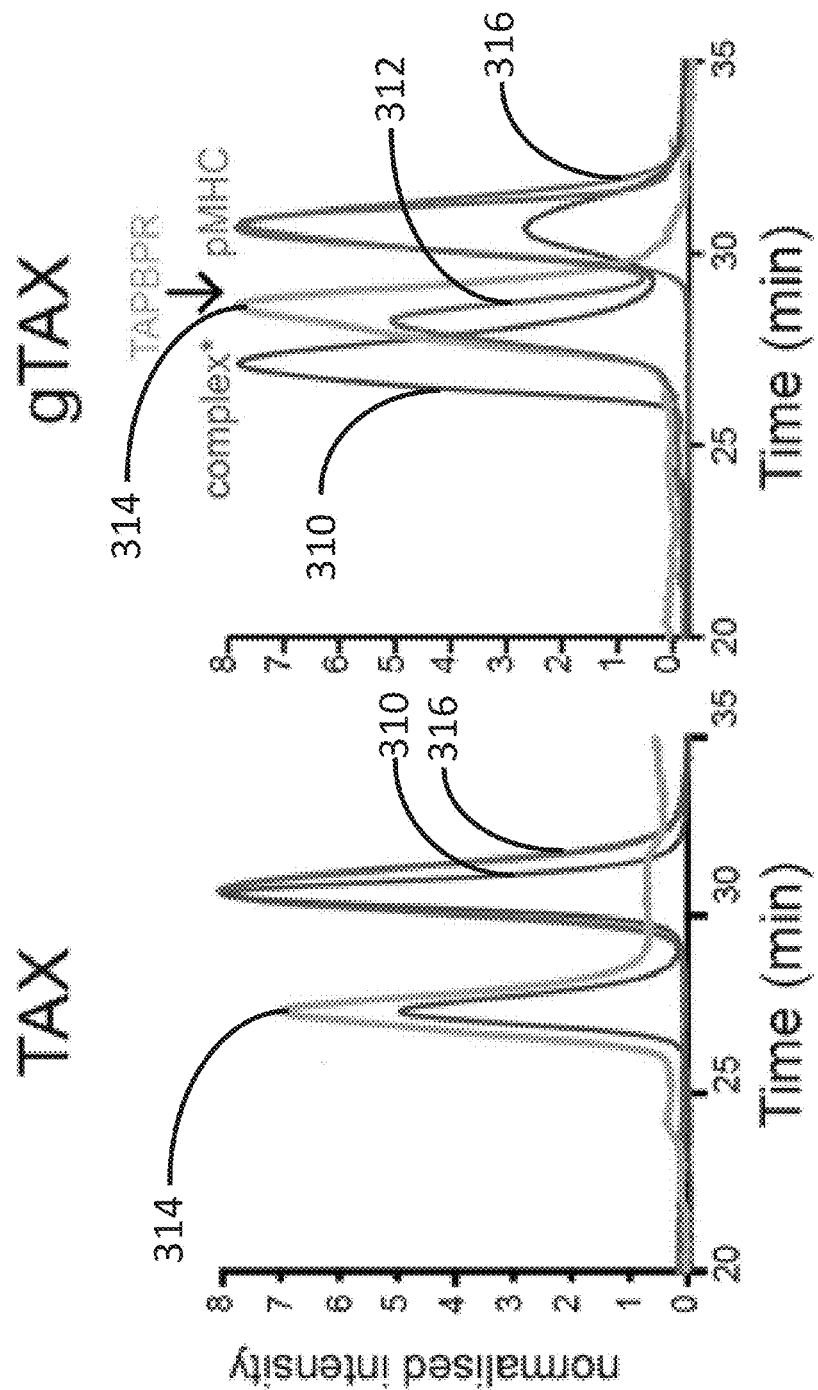
Figure 3D:
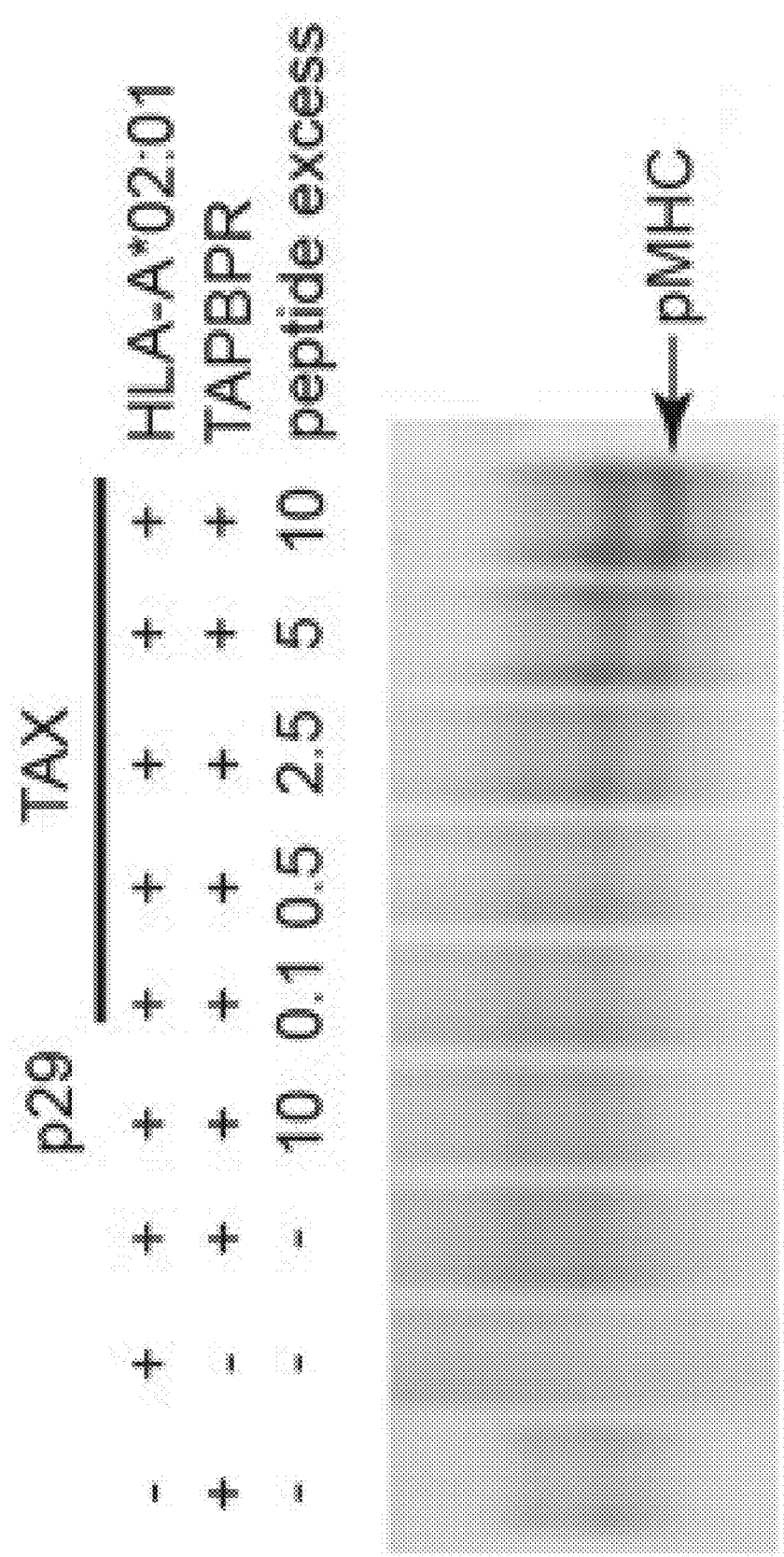
Figure 3E:
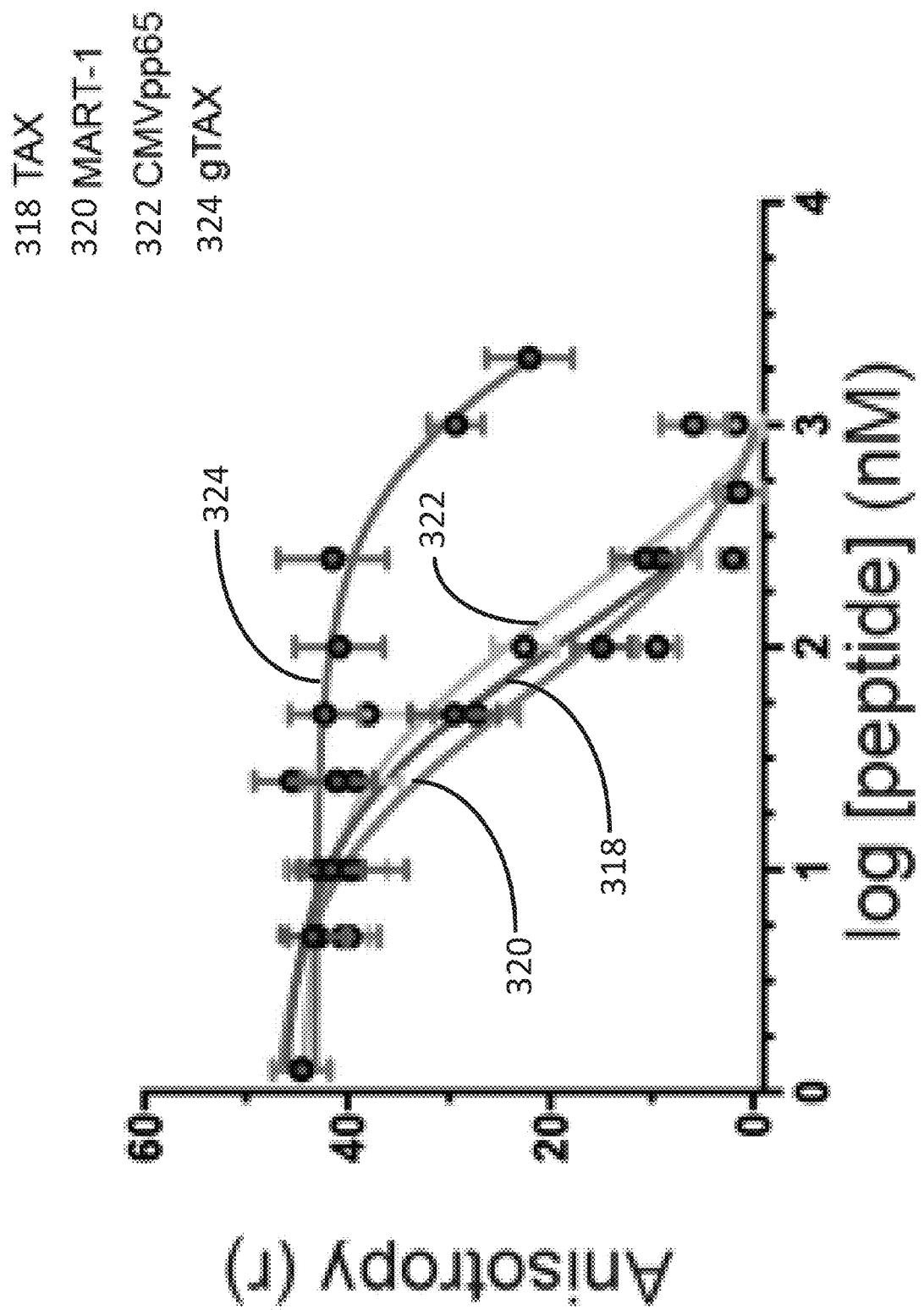
Figure 3F:
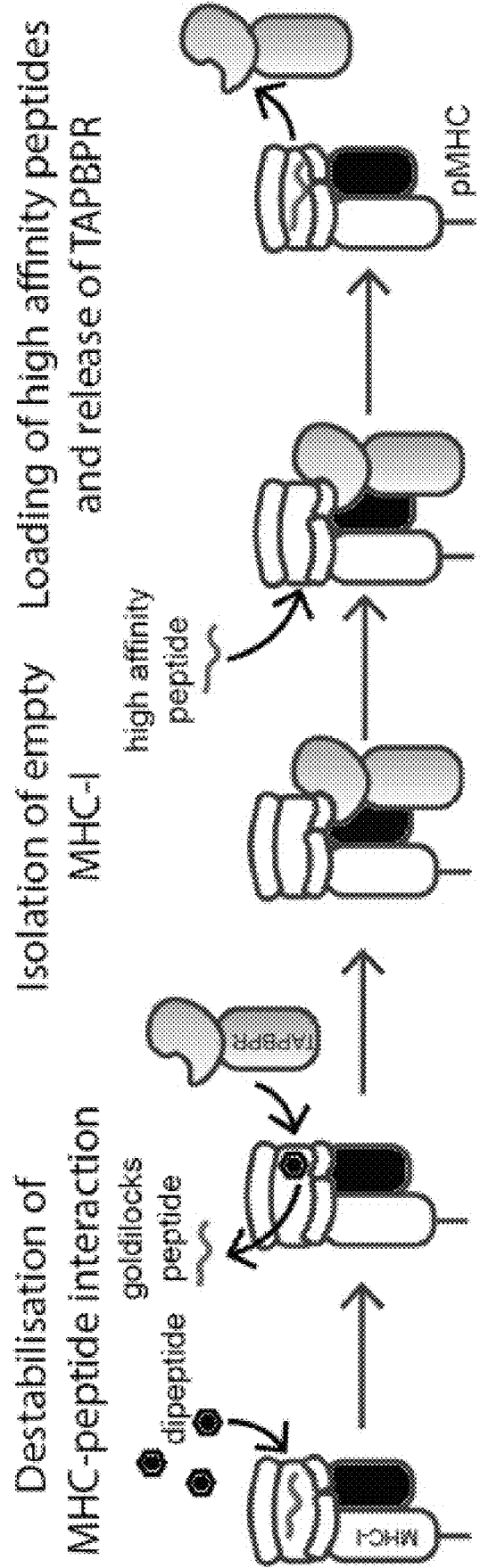
Figure 3G:
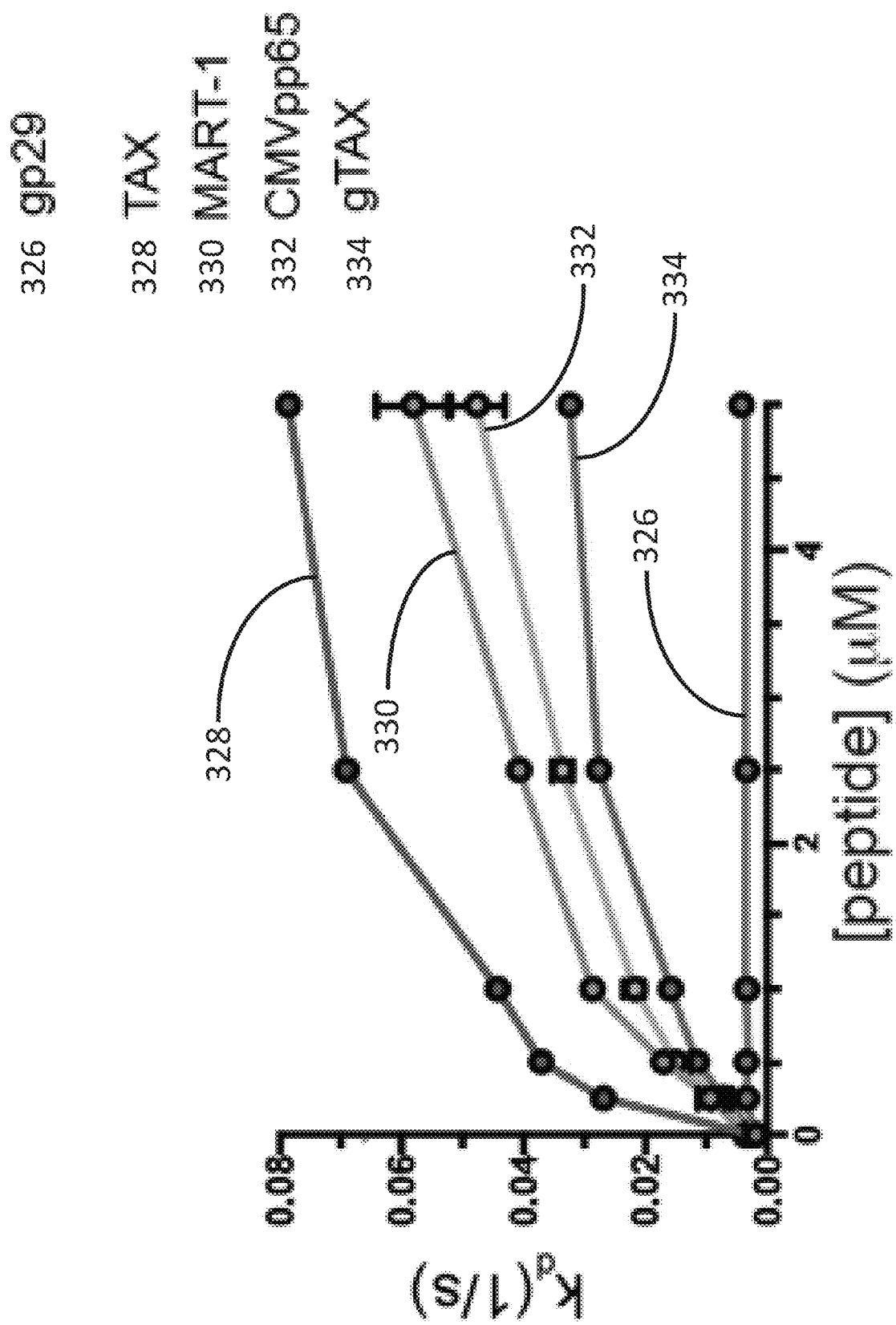
Figure 9A:
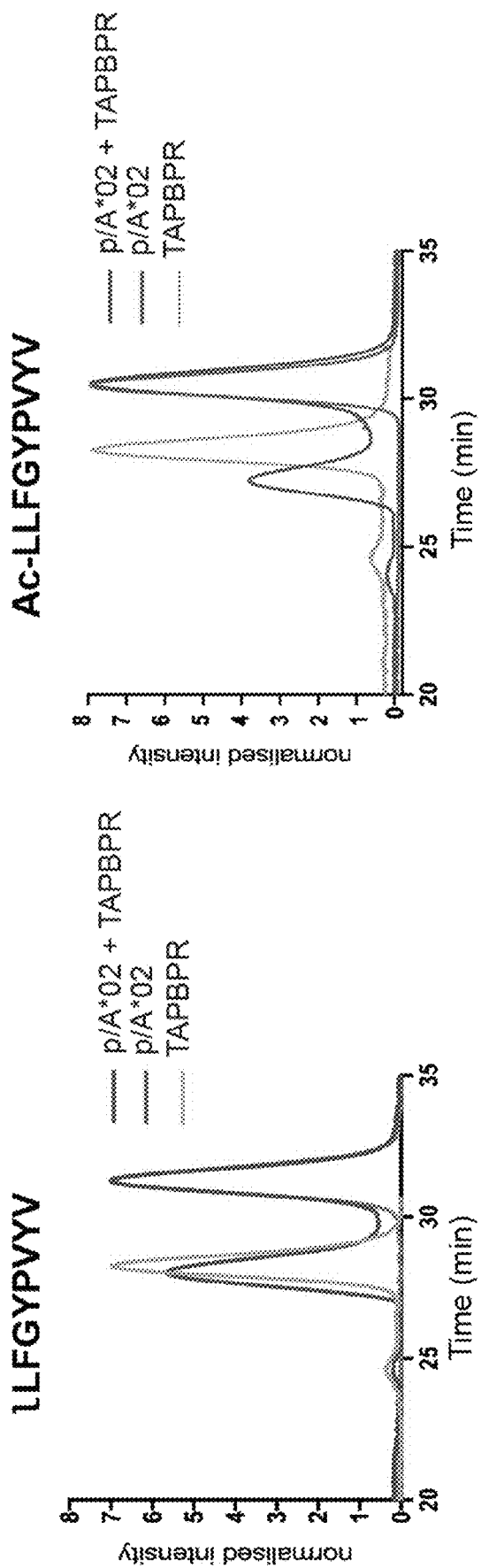
Figure 9C:
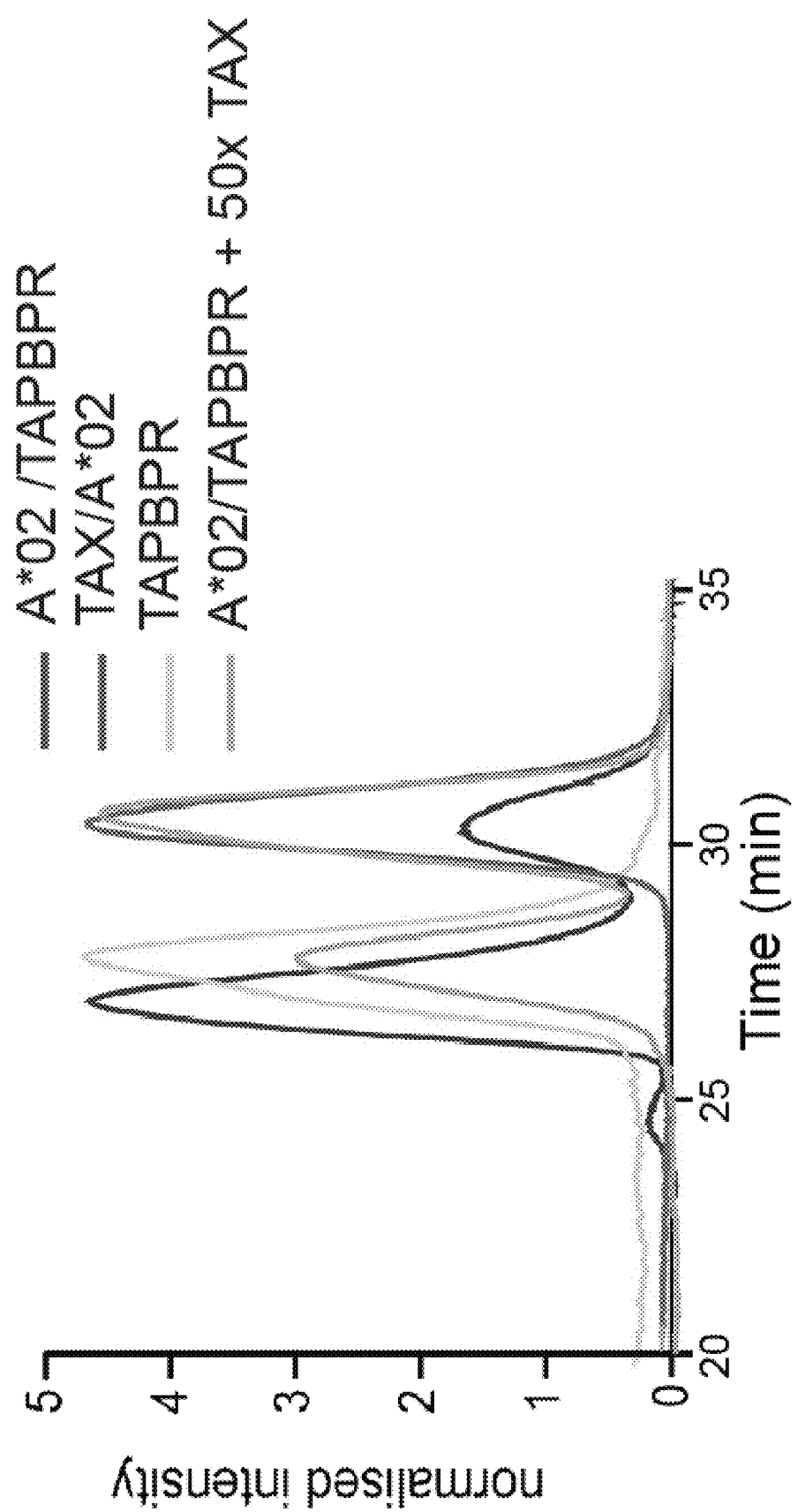
Figure 9D:
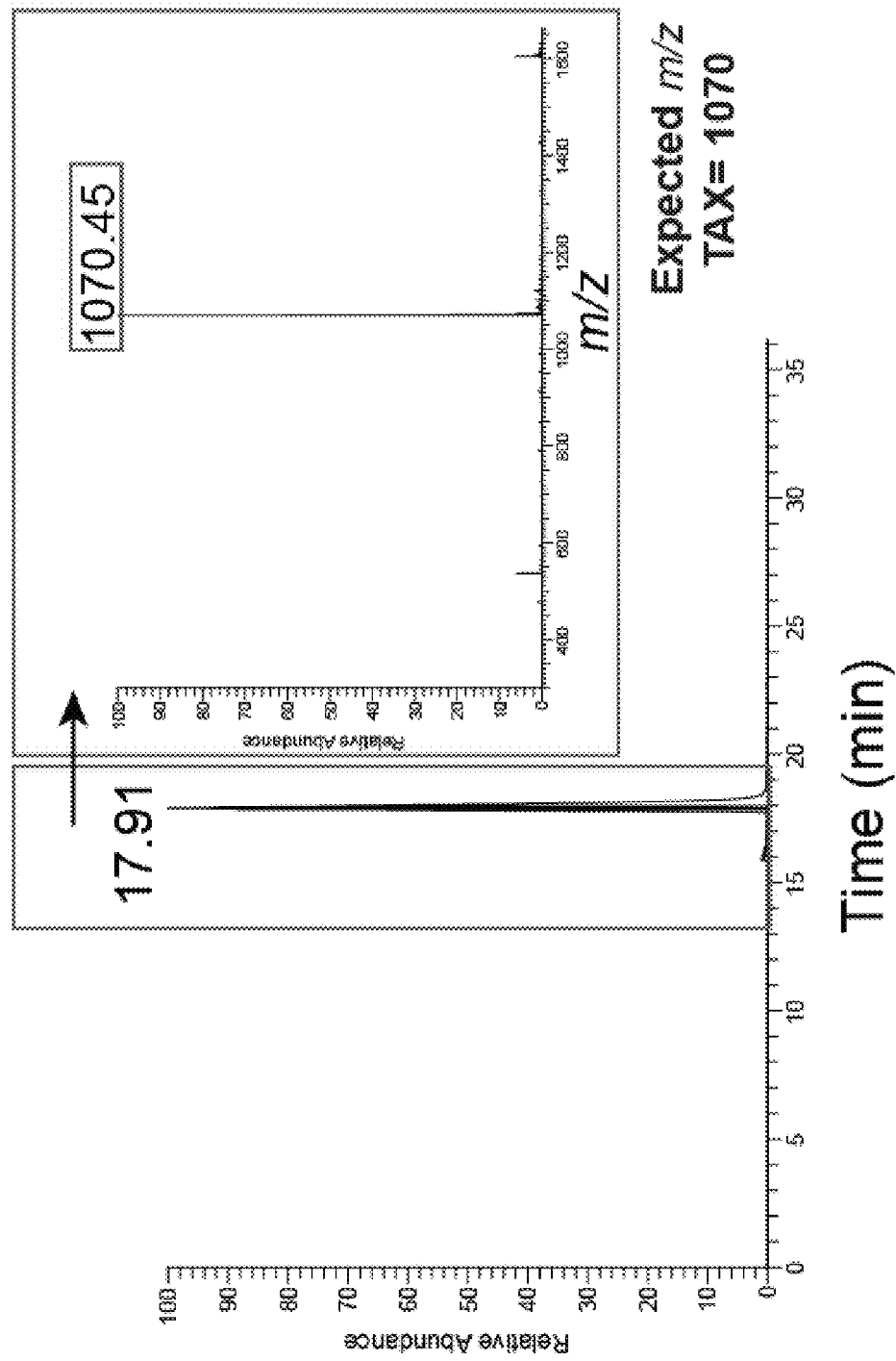

To extend these findings using murine MHC-I alleles towards a high-throughput method for the production of pMHC tetramer libraries for human alleles, focus was placed on the common allele HLA-A*02:01 which displays a wide range of immunodominant viral and tumor epitopes, rendering the study of HLA-A*02:01 restricted responses highly relevant (González-Galarza et al., *Nucleic acids Res.* 43:D784-D788 (2014)). Guided by the existing TAX/HLA-A*02:01 crystal structures (Khan et al., *J. Immunol.* 164: 6398-6405 (2000)), a number of variants of the LLFGYPVYV (SEQ ID NO:3) (TAX) peptide were designed by progressively reducing N-terminal polar contacts with MHC-I groove residues while maintaining the anchor positions 2 and 8 (x[LM]xxxxx[ILV]) (FIG. 3a). Comparison of thermal stabilities ($T_m$) of HLA-A*02:01 refolded using N-terminal variants of TAX revealed a progressive reduction in $T_m$ as a result of destabilization of the peptide complex upon loss of N-terminal polar contacts (FIG. 3b). Both gTAX/HLA-A*02:01 and Ac-LL-FGYPVYV (SEQ ID NO:3)/HLLA-A*02:01, which gave the lowest $T_m$ values at 40° C. and 46° C. due to loss of polar contacts and steric clashes between the N-terminal acetyl and sidechains of groove residues (FIG. 3a), respectively, promoted the formation of peptide-deficient MHC-I/TAPBPR complexes in the presence of 10 mM GM dipeptide (FIGS. 3c, f and 9a) as shown by liquid chromatography-mass spectrometry (LC-MS) (FIG. 9b). In contrast, the variant 1LFGYPVYV (SEQ ID NO:21) where the N-terminal L-Leu was substituted by the D-Leu enantiomer (1) leading to suboptimal packing interactions in the A-pocket (FIG. 3a) and consequently a reduced $T_m$ value of 54° C. (FIG. 3b), did not promote the formation of a stable complex with TAPBPR. The stability of empty HLA-A*02:01/TAPBPR complexes was examined by SDS-PAGE gel, to find that they remained intact for up to 6 months at −80° C., without compromising their performance in peptide exchange reactions. Incubation with 10-fold molar excess of high-affinity TAX peptide induced dissociation of the complex, as observed both by native gel and size-exclusion chromatography (SEC) assays (FIGS. 3d and 9c), with the loaded peptide detectable by LC-MS (FIG. 9d). Accordingly, high-affinity peptides (TAX, CMVpp65 or MART-1) could be readily loaded into the empty complex, out competing fluorescently labelled TAMRA-TAX for HLA-A*02:01 binding (FIG. 3e). Using Bio-layer interferometry, the TAPBPR dissociation rate was measured from HLA-A*02:01, which showed a significant increase in the presence of high-affinity peptides (TAX, CMVpp65 or MART-1), compared to an irrelevant peptide, used as a negative control (p29) (FIG. 3g).

Using the TAX/HLA-A*02:01 system as a benchmark, it was determined that the overall yield of pMHC molecules prepared by TAPBPR exchange is approx. 2.5 times higher relative to the use of a photo-cleavable ligand (Bakker et al., *Proc. Natl Acad. Sci.* 105:3825-3830 (2008)), and approx. 10 times higher relative to the use of an empty HLA-A*02:01 molecule with an engineered disulfide bond (Saini et al., *Sci Immunol* 4, doi:10.1126/sciimmunol.aau9039 (2019)) (FIG. 20). An additional benefit of these method is that the MHC-I/TAPBPR complexes are stable for several weeks at 4° C., while their preparation and handling does not require dark conditions, as is the case for MHC molecules refolded with photo-cleavable ligands (Bakker et al., *Proc. Natl Acad. Sci.* 105:3825-3830 (2008)). Using a similar approach, suitable goldilocks peptides were designed for the disease-relevant HLA-A*24:02 and HLA-A*68:02 alleles (FIG. 4a), and demonstrated exchange of the goldilocks for high affinity peptides in the presence of TAPBPR by native gel (FIG. 4b) and by differential scanning fluorimetry experiments (FIG. 4c). Several additional classical HLA alleles (Ilca, et al., *Cell Rep* 29:1621-1632 (2019)) are likely amenable to TAPBPR-mediated peptide exchange using these method.

Loading High Affinity Peptides Using Catalytic Amounts of TAPBPR

In some applications, purification of empty, stoichiometric MHC-I/TAPBPR complexes can be a limiting step. On the other hand, refolded goldilocks/MHC complexes can be aliquoted and stored at −80° C. for several months. To evaluate whether exchange of goldilocks for high affinity peptides can occur when TAPBPR is offered in sub-stoichiometric concentrations, a native gel electrophoresis assay was used. This allowed for the monitoring of the formation of different pMHC species upon overnight incubation in the presence of 10-fold molar excess of different peptides and varying molar ratios of TAPBPR (FIG. 10a). Under these conditions, complete peptide exchange on gTAX/HLA-A*02:01 was obtained using down to 1:1000 TAPBPR:MHC molar ratio, while no exchange was observed for a non-specific peptide, or in the absence of TAPBPR. In this assay the electrophoretic mobility of different pMHC molecules is dependent on the net charge of the bound peptide, which allowed for the resolving of distinct protein bands of HLA-A*02:01 loaded with peptides of disparate charges from −2 to +1 in overnight catalytic peptide exchange reactions (FIG. 10b). Taken together, these results highlight the use of TAPBPR as a peptide exchange catalyst, which can be advantageous for high throughput applications.

T Cell Staining Using TAPBPR-Exchanged pMHC Molecules

Figure 5A:
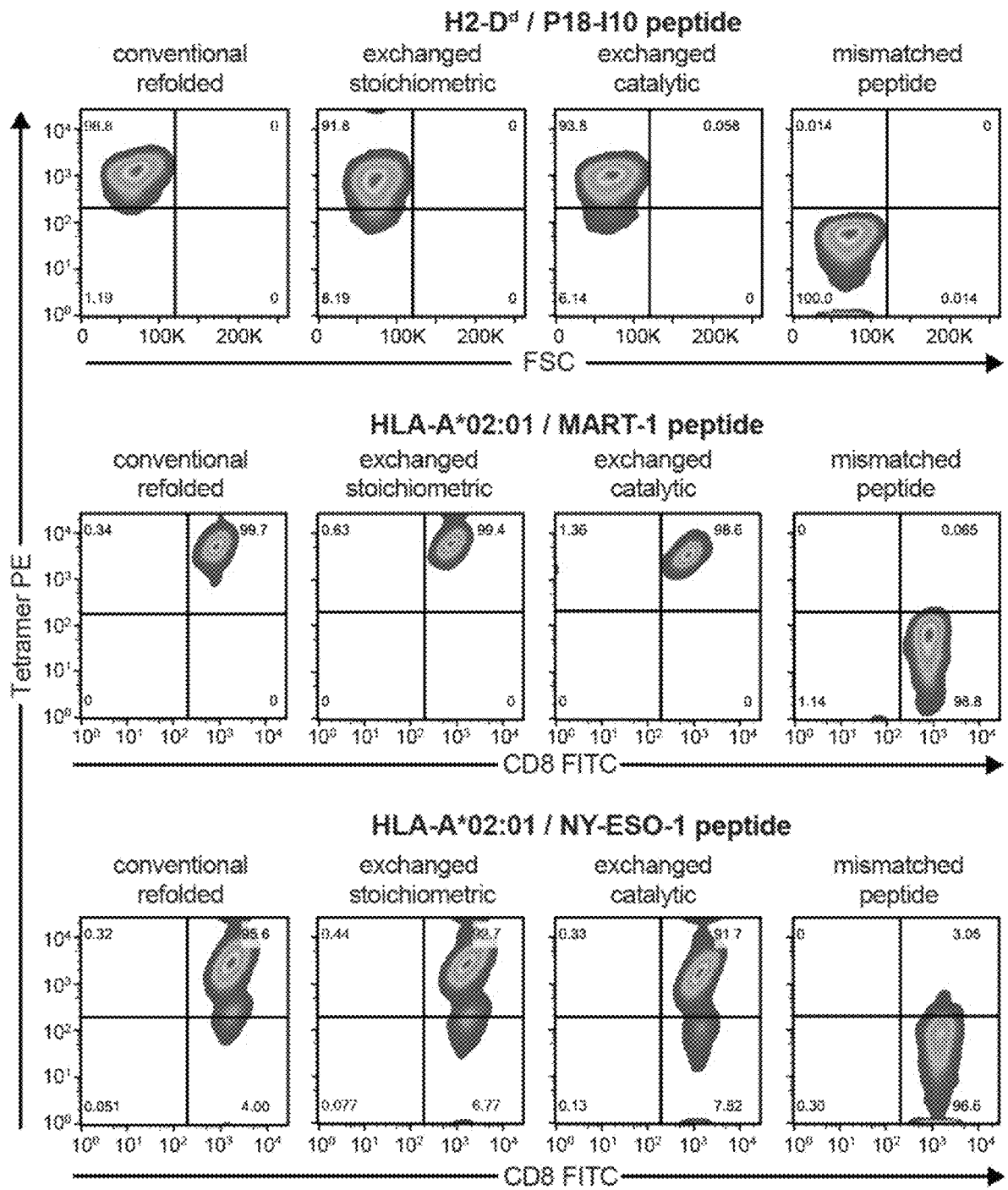
Figure 5B:
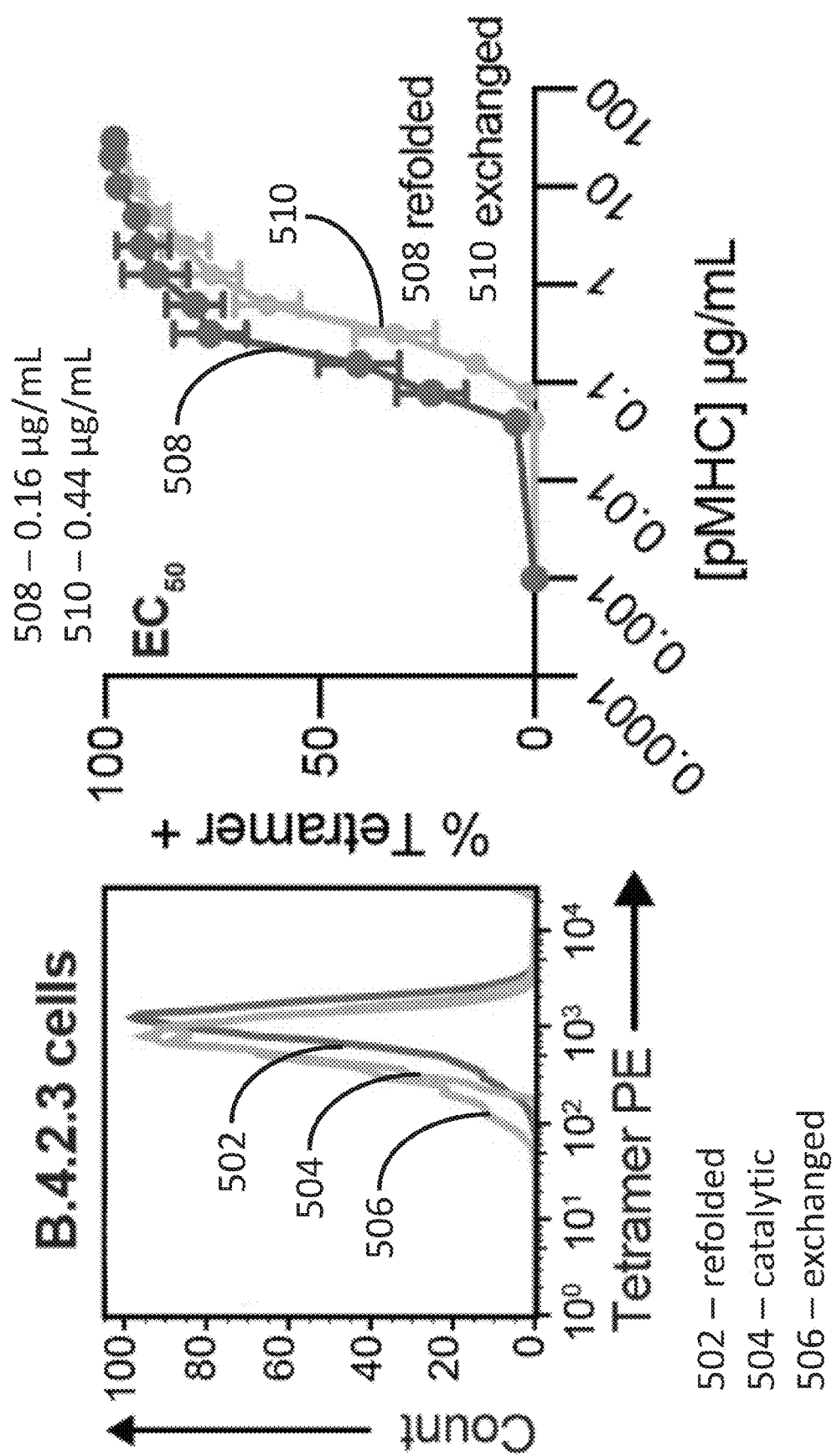
Figure 5C:
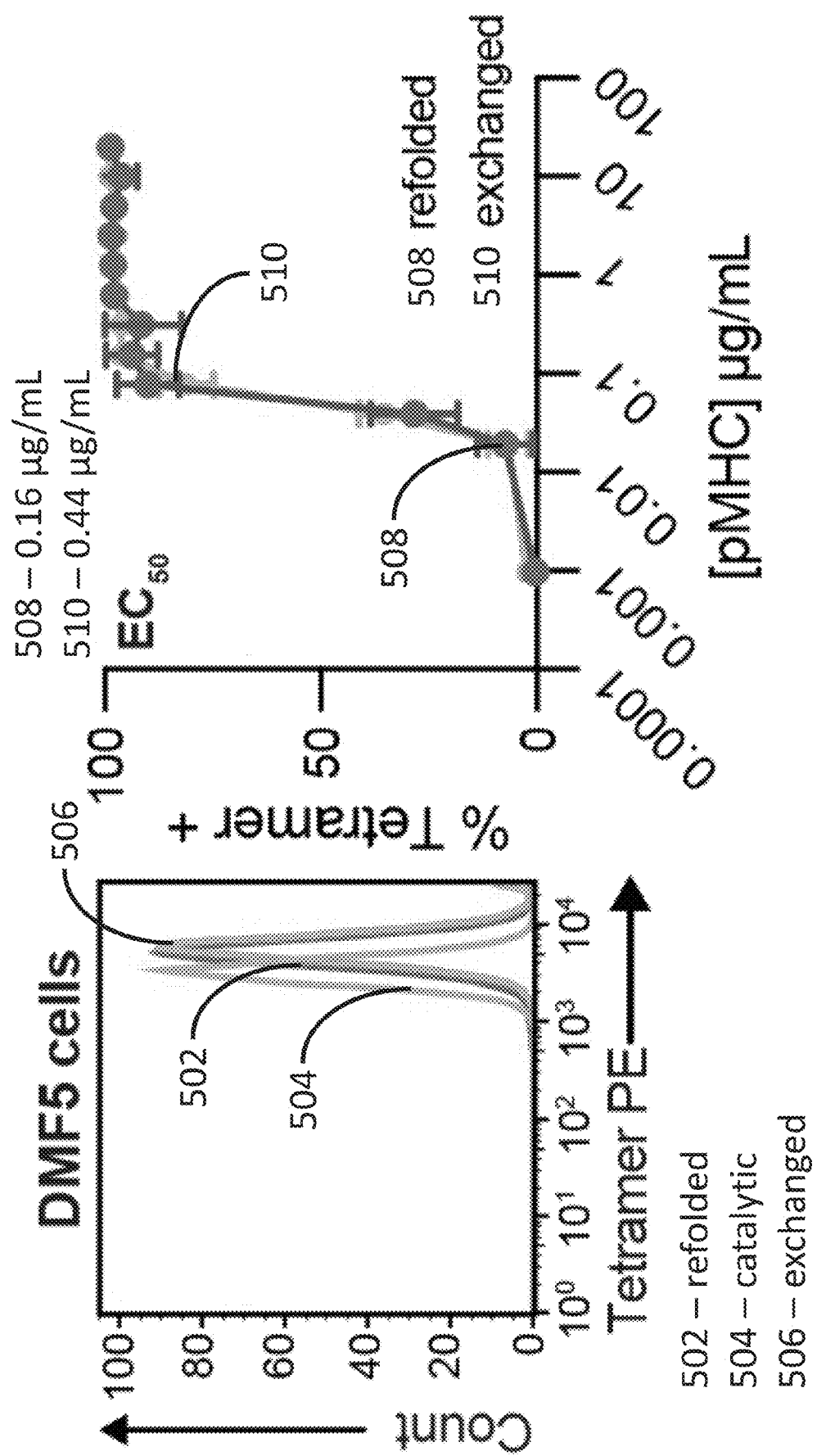
Figure 5D:
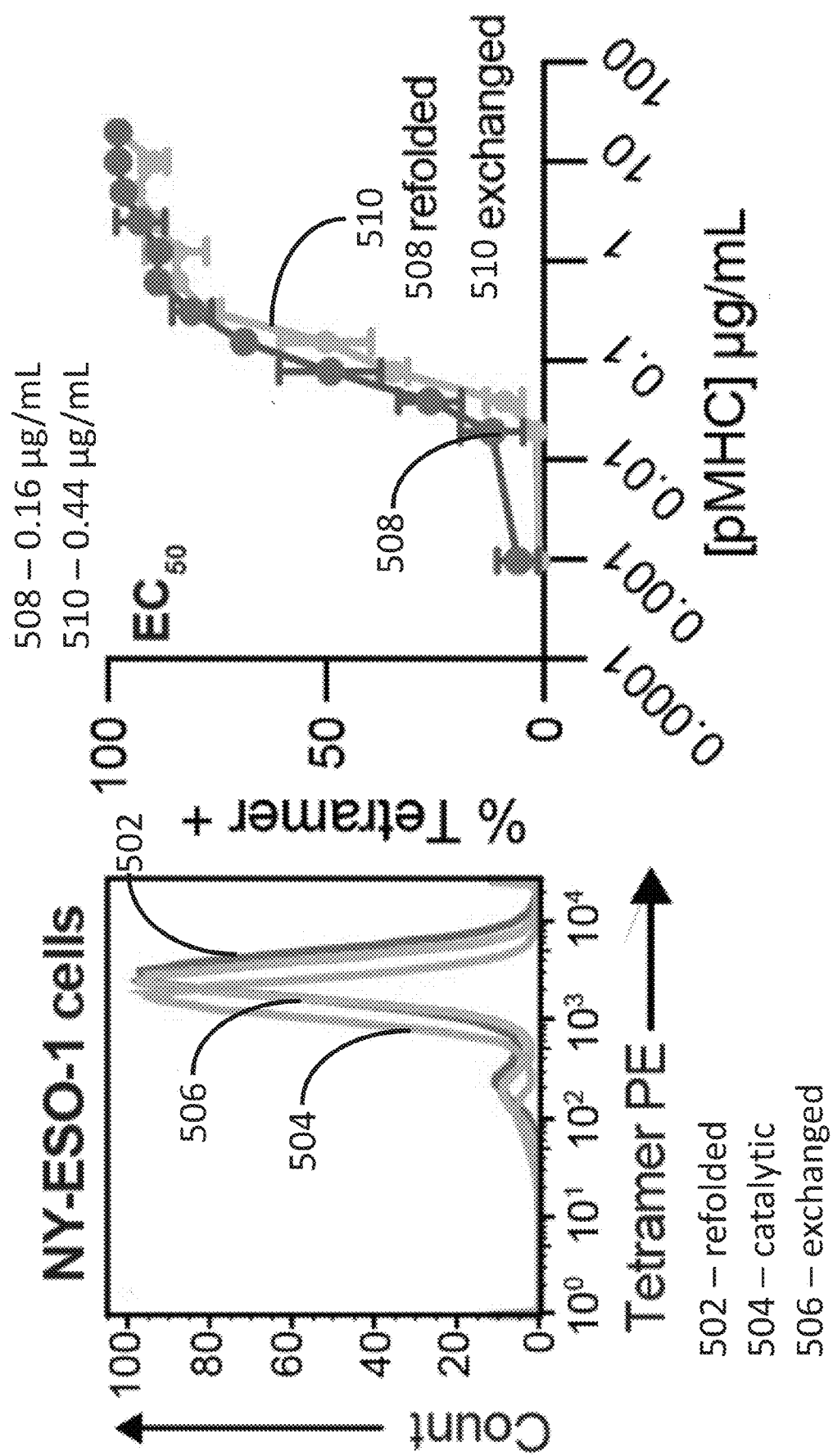

The performance of TAPBPR-exchanged phycoerythrin (PE)-tetramers were the compared, relative to PE-tetramers refolded in vitro using standard protocols (Garboczi et al., *Proc. Natl Acad. Sci. USA* 89:3429-3433 (1992)). Staining of a B4.2.3 TCR transgenic T cell line (Natarajan et al., *Nature communications* 8, 15260 (2017)) with 1 g/ml of TAPBPR-exchanged P18-I10/H-2D$^d$ tetramers prepared using either a stoichiometric (1:1) or catalytic (1:100) TAPBPR:MHC ratio, showed an identical population of tetramer positive cells relative to refolded pMHC-I tetramers. No staining was observed using an irrelevant motif peptide (sequence AGPARAAAL)(SEQ ID NO:22), which binds with high affinity to H-2D$^d$ but is not recognized by the B4.2.3 TCR (FIG. 5a, b). The staining efficiency was further quantified using tetramer titrations, which showed a staining saturation curve with an $EC_{50}$ of 0.16 g/mL compared to 0.44 μg/mL for refolded TAPBPR-exchanged tetramers, respectively (FIG. 5c, with gating strategy shown in FIG. 11). The 2.5-fold reduced staining efficiency can be attributed to sample loss due to the formation of aggregation prone, peptide-deficient H-2D$^d$ molecules during the overnight incubation with peptide. However, given that the observed $EC_{50}$ value remains well below the standard tetramer staining concentration of 1 μg/ml, TAPBPR exchange can still be used to obtain reliable staining results with the added benefit that, in contrast to refolding, TAPBPR exchange can be performed at high-throughput for a library of peptides (see below). A similar trend was observed in MART-1/HLA-A*02:01 tetramer staining of Jurkat/MA T cells transduced with a MART-1 specific TCR, DMF5 (FIG. 5a, b-middle), and in NY-ESO-1/HLA-A*02:01 tetramer staining of T cells transduced with a NY-ESO-1 specific TCR (Johnson et al., J. Immunol. 177:6548-6559 (2006)) (FIGS. 5a and b-bottom). Here, TAPBPR exchanged tetramers showed identical $EC_{50}$ values relative to refolded tetramers, highlighting the robustness of TAPBPR exchange for the preparation of human pMHC-I molecules in a high-throughput setting (FIG. 5c middle and bottom). No staining was observed using tetramers prepared by exchanging the mismatched peptides, NY-ESO-1 and MART-1 on T cells expressing the DMF5 and NY-ESO-1 TCRs, respectively (FIGS. 5a and b).

Monitoring Peptide Loading Through the Release of TAPBPR

Since TAPBPR has been shown to promote the release of high affinity peptides from the MHC groove in vitro (McShan et al., Nat. Chem. Biol. 14:811 (2018)), the persistence of TAPBPR following exchange may partially regenerate empty MHC-I molecules, thereby reducing the staining efficiency of the resulting tetramers. In a library format this may also lead to scrambling of excess peptides between MHC tetramers upon mixing, which would limit the use of molecular indices or barcodes to label tetramers according to their displayed peptides (see below). Specifically, the presence of TAPBPR induced the exchange of CMVpp65 loaded on HLA-A*02:01 tetramers for free MART-1 peptide, which can be detected by staining of DMF5+ T cells (FIG. 12b). To prevent this, full removal of TAPBPR molecules was readily achieved by spin column dialysis, immediately following the tetramerization and peptide loading steps as confirmed by SDS-PAGE (FIG. 1 and FIG. 12a). The resulting pMHC-I tetramers did not capture free high affinity peptides, even when present at high (20×) molar excess, and peptide exchange between tetramers was undetectable by flow cytometry (FIGS. 12b and c).

Complete binding of high affinity peptides on empty, tetramerized MHC-I/TAPBPR complexes can be monitored using a simple SDS-PAGE assay, through the disappearance of a distinct TAPBPR band following the spin column dialysis step. Here, TAPBPR is used in a similar manner to a conformation-specific antibody to label empty MHC-I molecules present after the peptide exchange reaction. Using this assay, it was found that TAPBPR remained present on H-2D$^d$ tetramers following 1 h incubation with P18-I10 peptide, despite exhaustive spin column dialysis, due to the slow binding of peptide on empty H-2D$^d$/TAPBPR molecules (McShan et al., Nat. Chem. Biol. 14:811 (2018)) (FIG. 13a). As a result, H-2D$^d$ tetramers prepared upon incomplete loading with peptide show a 2.5 times higher $EC_{50}$ value relative to those obtained after complete peptide exchange, which can be readily achieved in an overnight peptide loading reaction, as confirmed by gel assay (FIG. 13b). Thus, an overnight incubation with peptide is a requirement for TAPBPR-mediated exchange on the murine MHC-I molecules tested here.

Fine-Tuning Interactions with TAPBPR Through α3 Domain Mutants

Figure 6B:
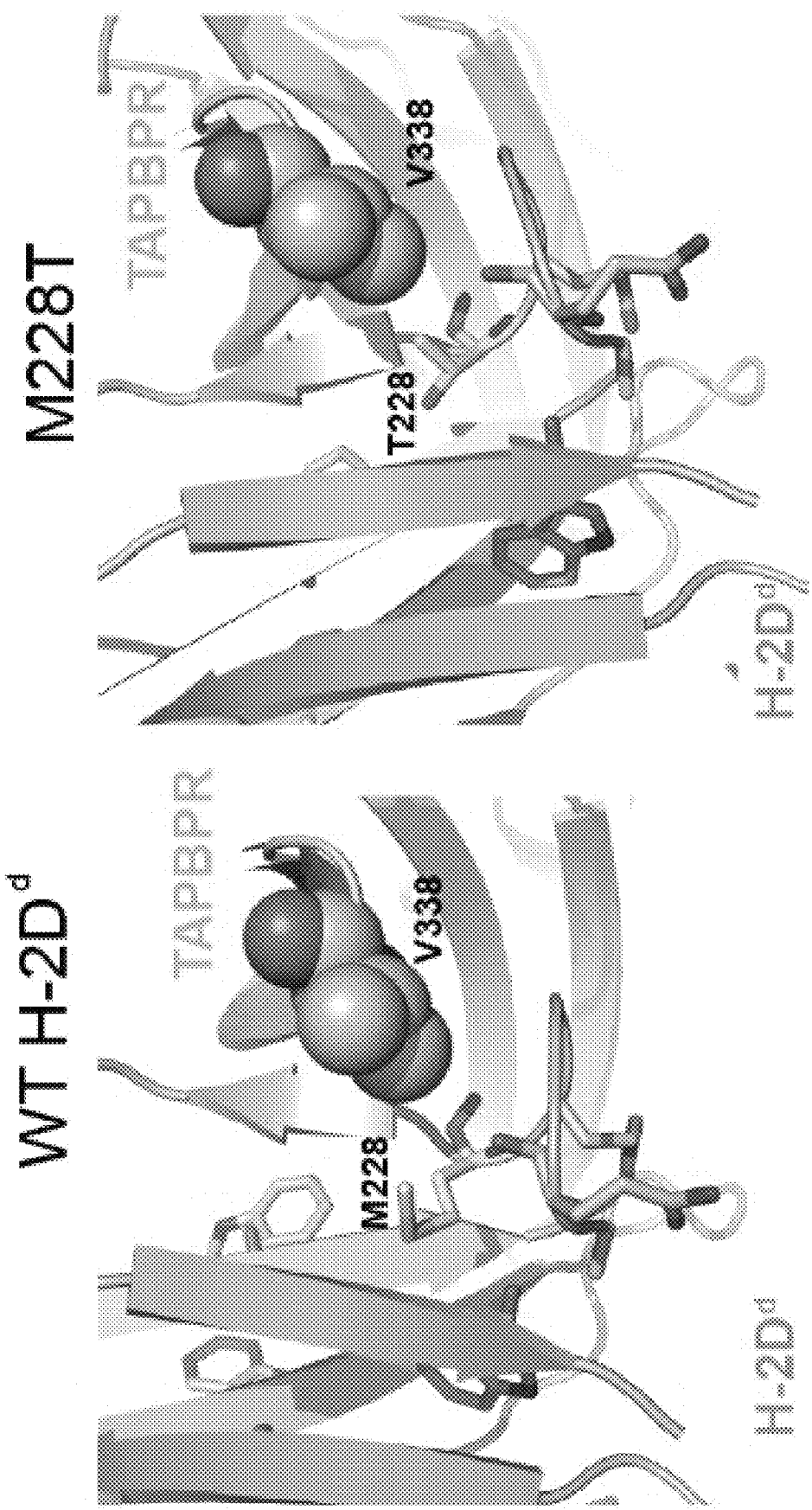
Figure 6C:
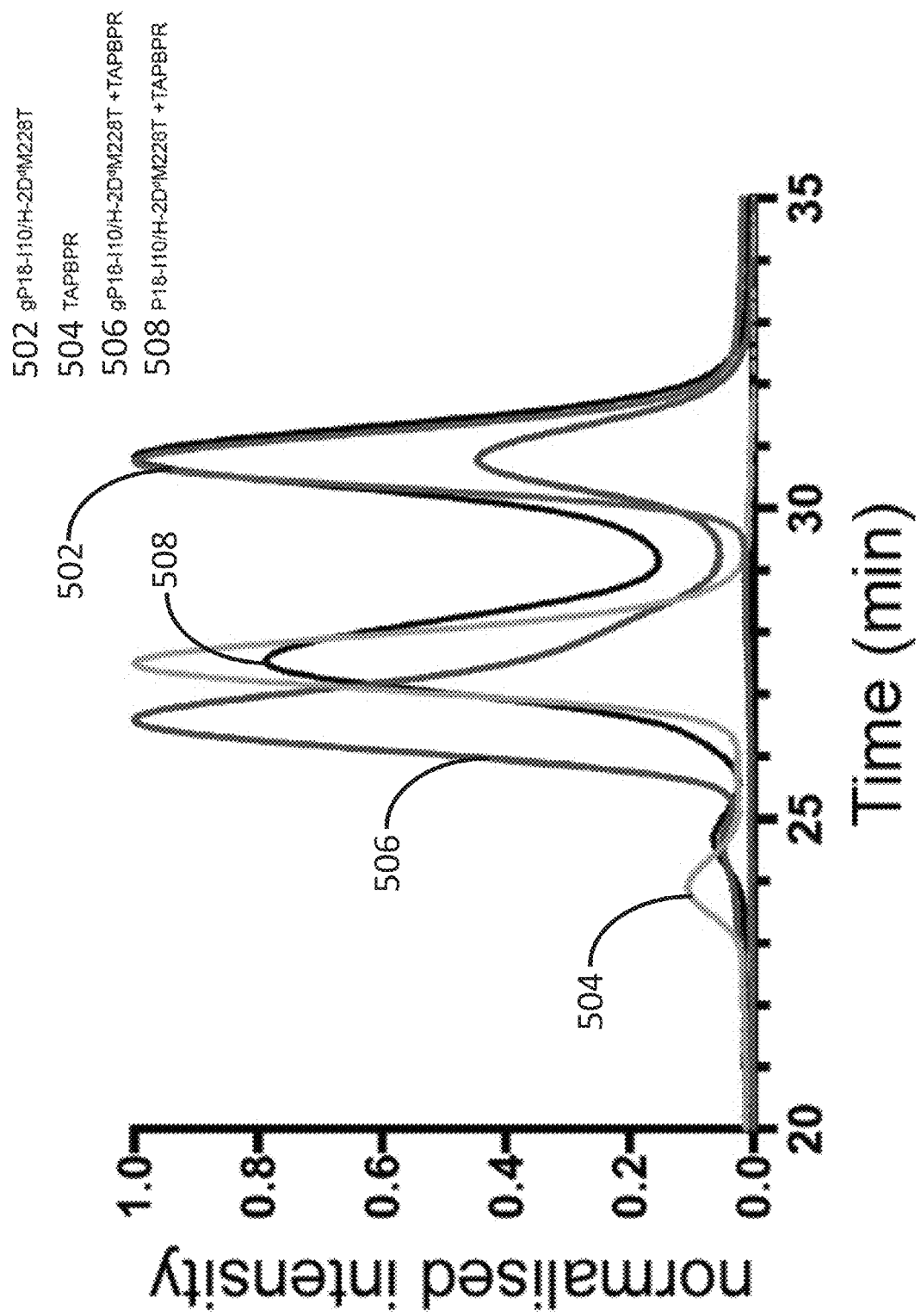
Figure 6D:
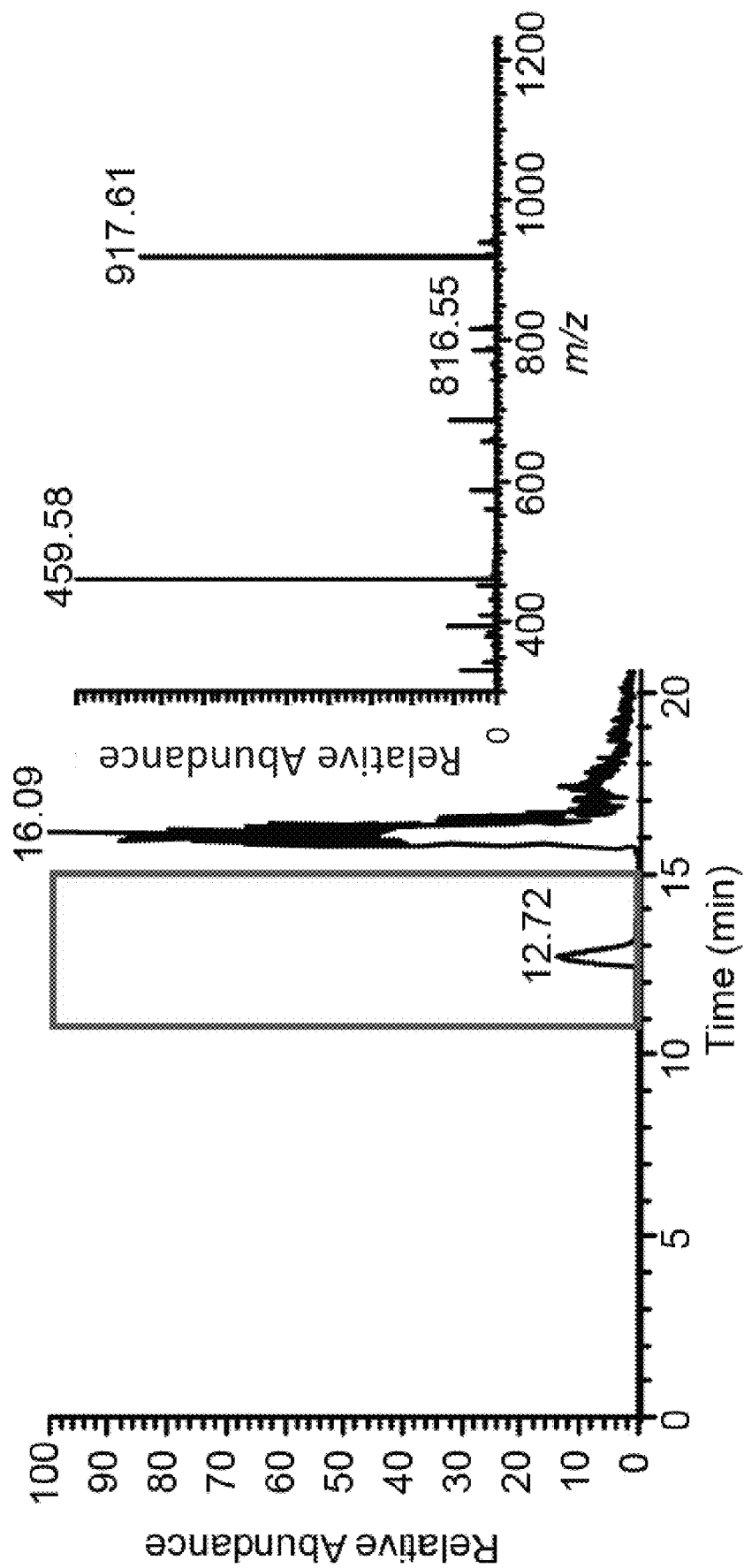
Figure 6E:
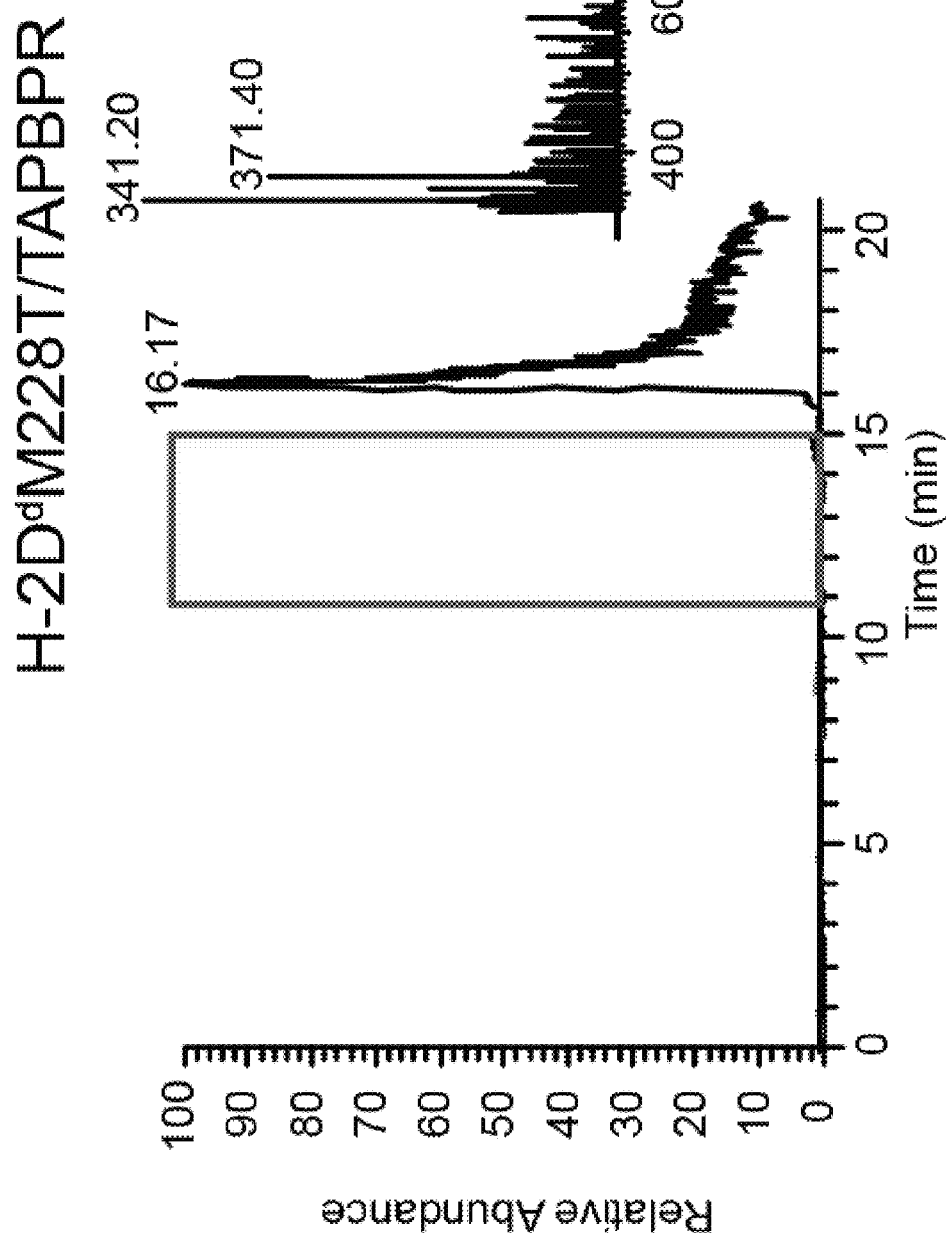

Next, studies were preformed to fine-tune TAPBPR interactions with murine MHC-I molecules previously shown to form stable complexes with TAPBPR even when bound to high affinity peptides (McShan et al., Nat. Chem. Biol. 14:811 (2018)), an effect which limits their use towards high-throughput tetramer library production due to persistent peptide exchange activity in the pooled library. Towards reducing the affinity of TAPBPR for murine molecules, designed mutations at the α$_3$ domain of the heavy chain were explored, which participates in direct interactions with TAPBPR, and does not contribute to the formation of the peptide binding groove. Specifically, Met 228 is located at an edge loop of the α$_3$ immunoglobulin fold and forms a hydrophobic contact with TAPBPR residues in the X-ray structure of the H-2D$^d$/TAPBPR complex (Jiang et al., Science 358, 1064-1068 (2017)) (FIG. 6a, b). It was hypothesized that a mutation at this position from a Met, present in H-2D$^d$ and H-2L$^d$, to a polar Thr residue, present in HLA-A*02:01, would lead to a reduced binding affinity of peptide-bound MHC-I molecules for TAPBPR. In contrast to the WT molecule, H-2D$^d$M228T did not bind TAPBPR when the high affinity P18-110 peptide was present in the MHC-I groove. Notably, TAPBPR maintained binding to empty H-2D$^d$M228T upon dissociation of the goldilocks gP18-110 peptide, to generate a peptide-receptive complex (FIG. 6c, d). These results highlight the requirements of a system that is amenable to large-scale tetramer library production using an approach that entails: i) formation of a stable TAPBPR complex with an empty molecule and ii) TAPBPR dissociation upon binding of high affinity peptides to the MHC-I groove.

Labelling Individual Peptide Specificities with DNA "Barcodes"

Figure 15B:
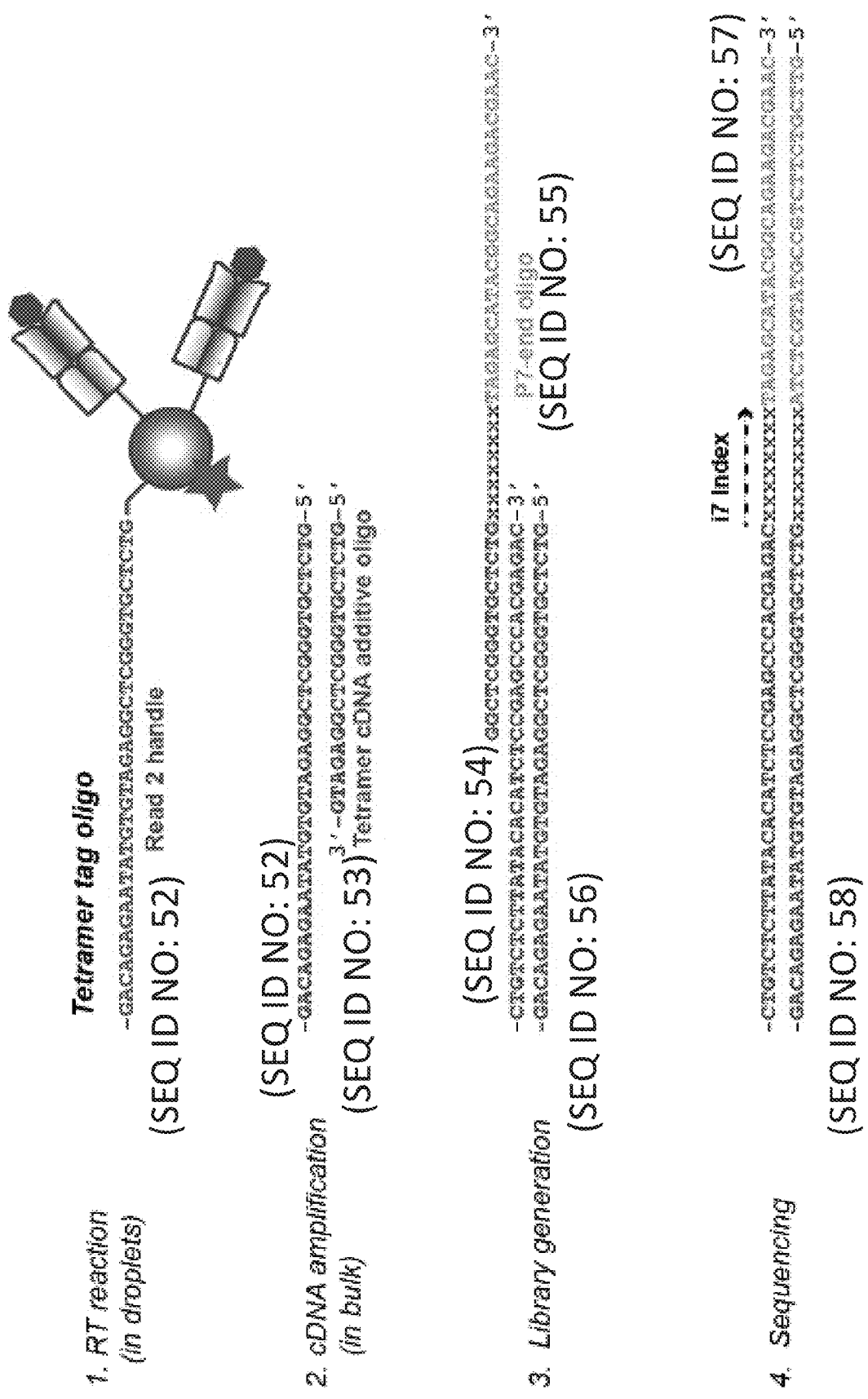
Figure 15C:
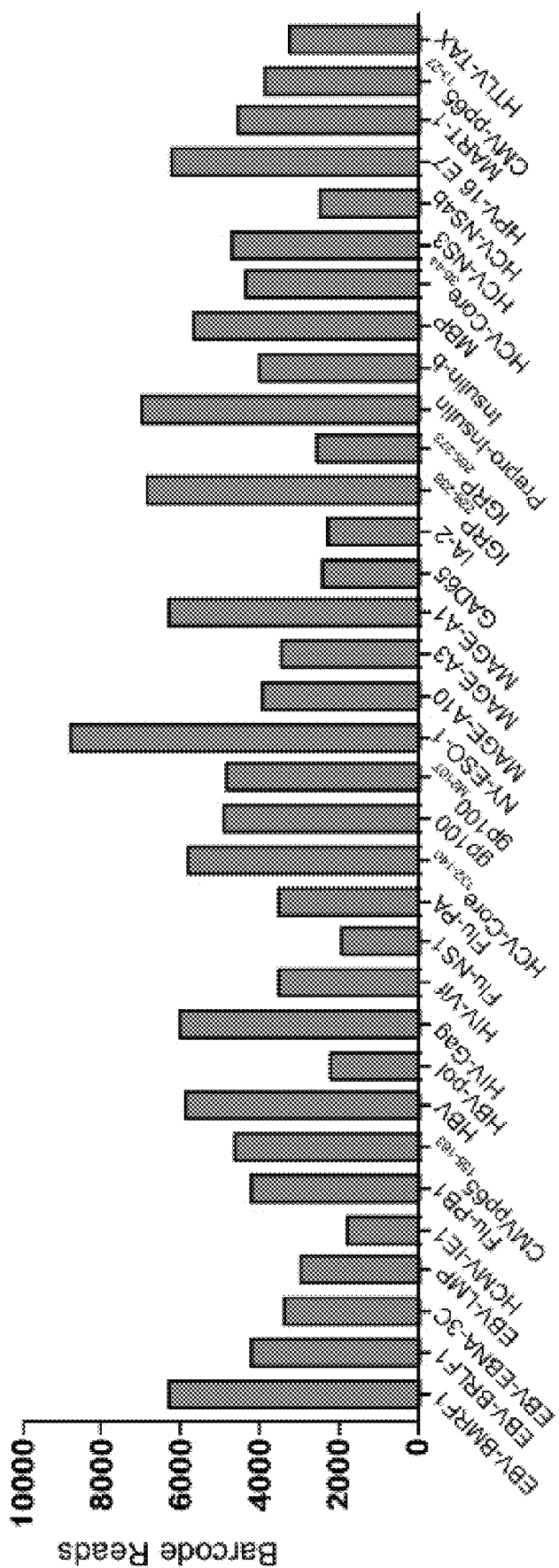
Figure 15D:
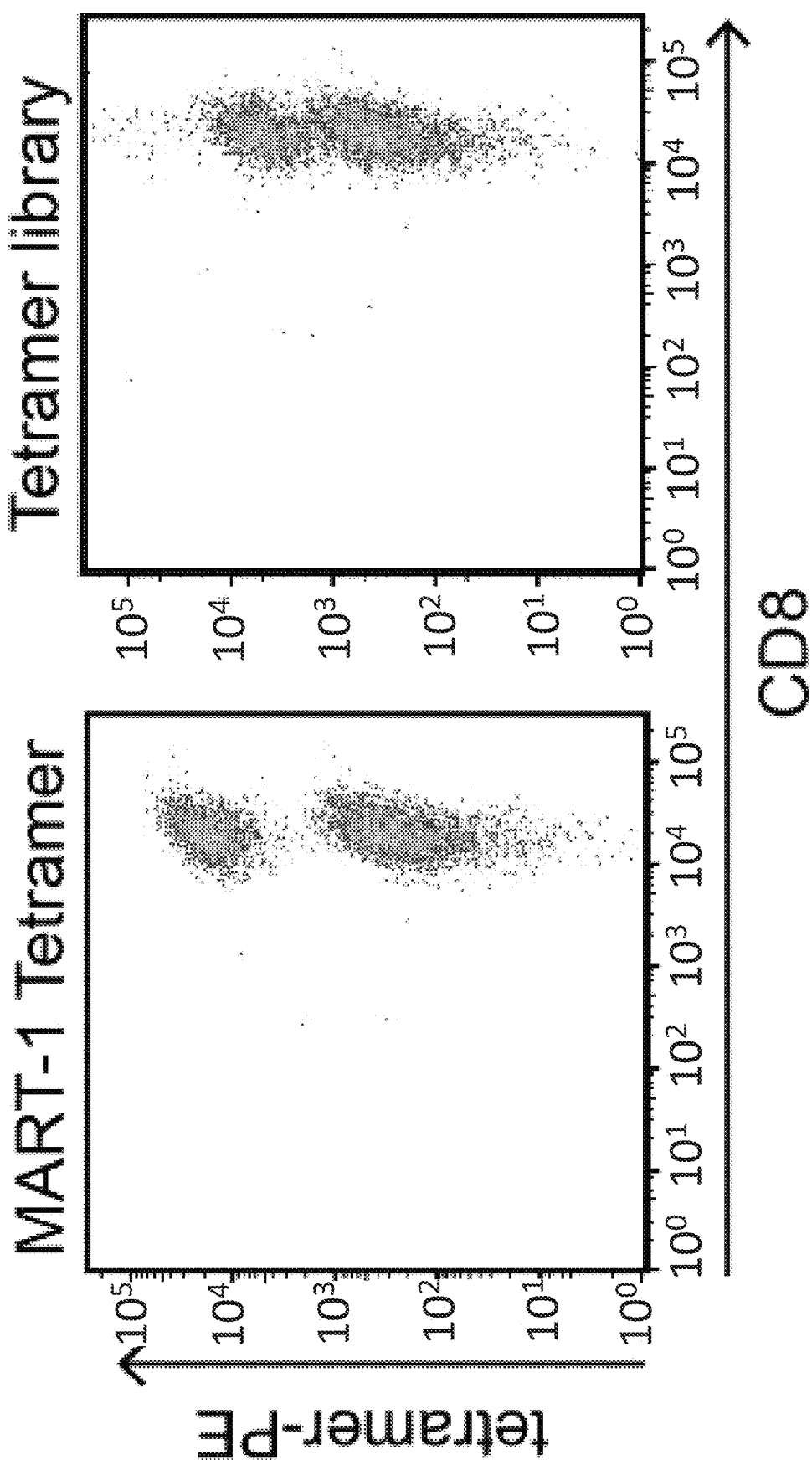
Figure 16A:
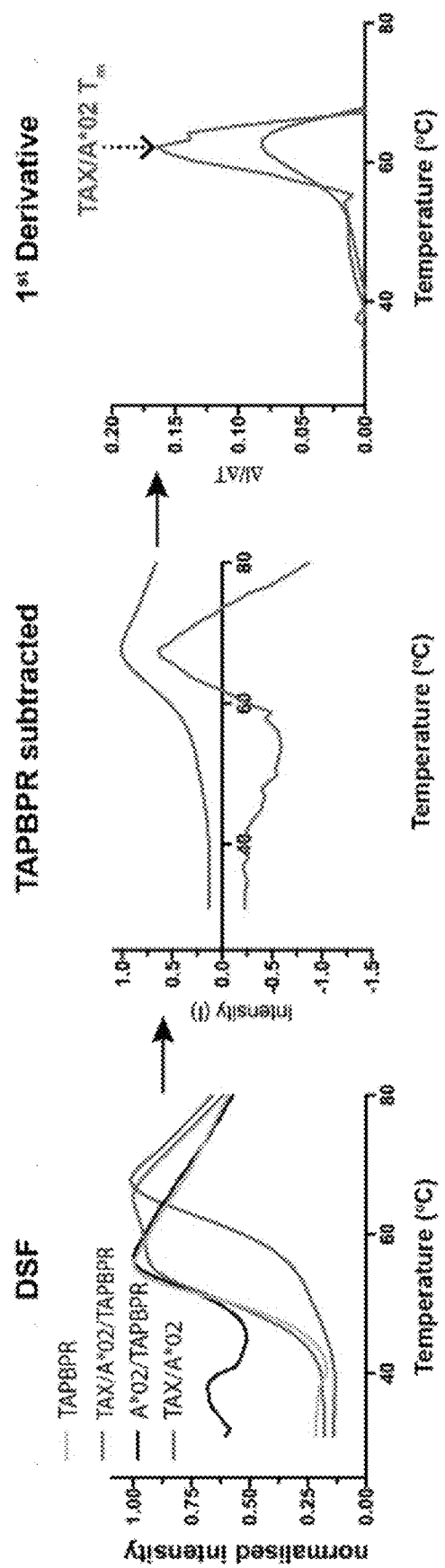
Figure 16B:
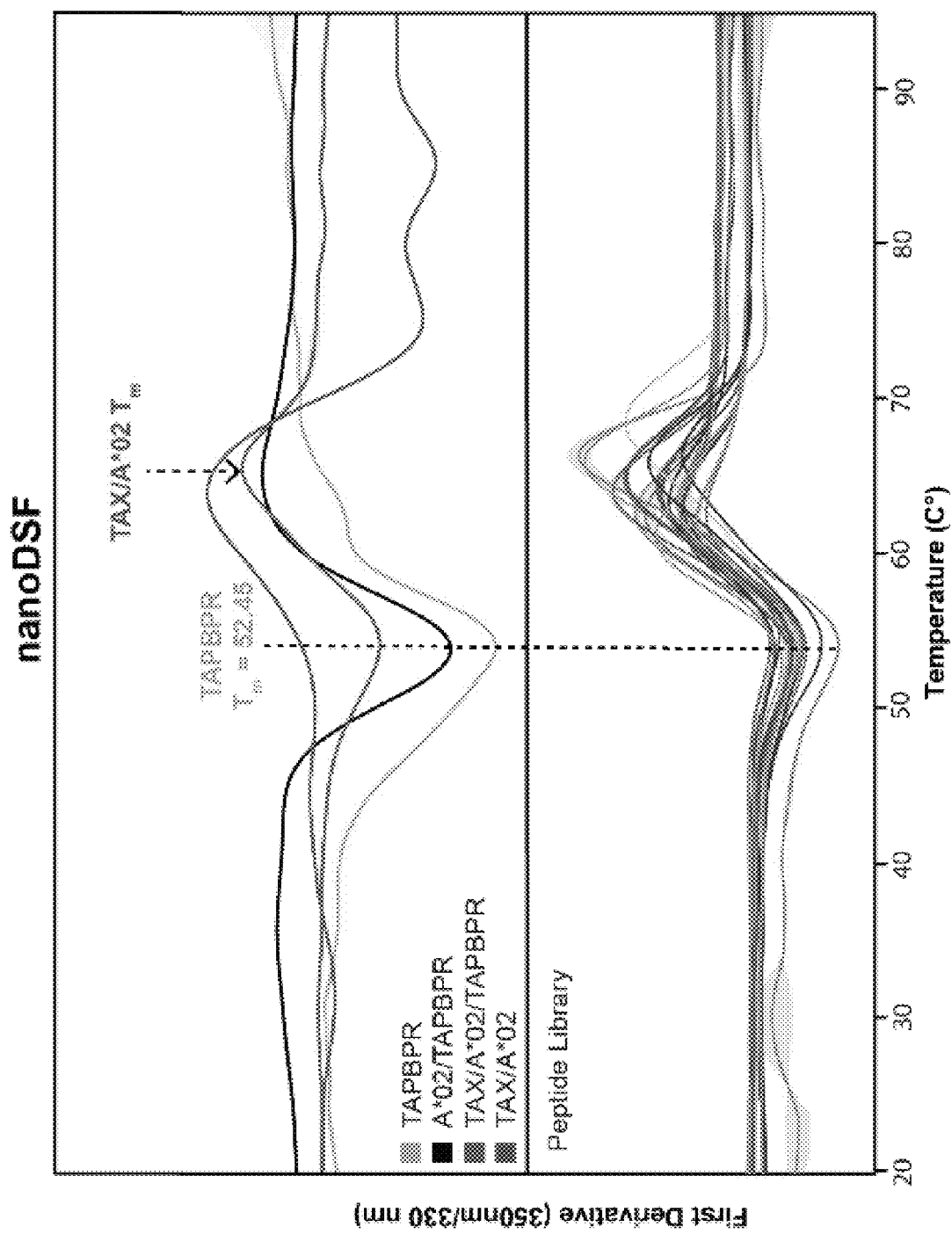
Figure 16C:
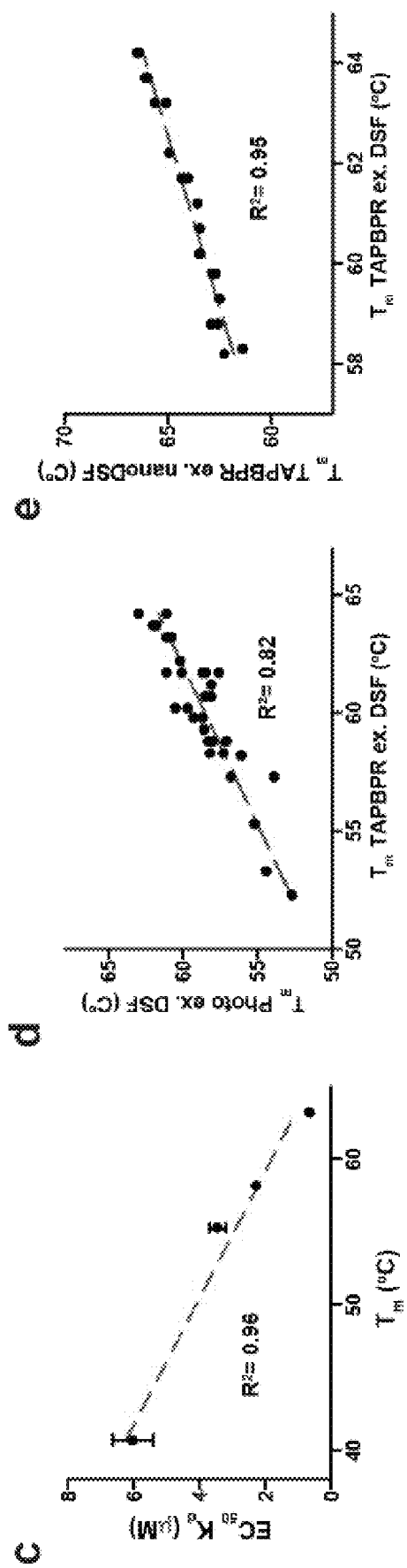

To test the above method on a high-throughput setting, two HLA-A*02:01 tetramer libraries, one containing 29 tumor epitopes identified in neuroblastoma tissues and another encompassing a range of 31 viral, neoantigen and autoimmune epitopes (FIGS. 21 and 22). To link pMHC specificities with TCR V(D)J sequences present in polyclonal samples fluorophore-labelled pMHC tetramers were barcoded, prepared using TAPBPR exchange, with biotinylated DNA oligonucleotides (oligos) (Bentzen et al., Nat. Biotechnol. 34:1037 (2016)) at a 1:1 molar ratio (DNA oligos:pMHC). Using tetramer staining titrations on DMF5 reporter cells, it was determined that the barcoded tetramers show a similar $EC_{50}$ value relative to the non-barcoded control (FIG. 14). An in-house oligo design compatible with 10× Genomics gel bead oligos in the 5' V(D)J product was used (FIG. 15a), adding an additional modality of cellular information to a recently described ECCITE-seq method (Mimitou et al., Nat. Methods 16:409-412 (2019)). This method incorporates a cellular barcode into cDNA generated from both tetramer oligos and cellular mRNAs, including TCR transcripts, thus connecting TCR sequences and other mRNAs with tetramer specificities. Formation of stable pMHC species upon loading of each peptide can be detected at high throughput using two complementary differential scanning Fluorimetry (DSF) assays (FIG. 16). Together with the SDS-PAGE (FIGS. 12a and 13a) and fluorescence/Biolayer interferometry assays (FIGS. 3e, g and 17), the DSF data provide an additional way to confirm binding of a candidate peptide to the empty MHC-I groove, and can be performed on a 96-well format. After exhaustive dialysis of TAPBPR, excess barcodes and peptides, all individual peptide loading reactions were pooled into a single tetramer library sample for staining. Both final libraries prepared in this manner were further validated for: (i) the presence of all barcodes, using bulk sequencing reactions (FIG. 15b) and (ii) staining of Jurkat/MA cells transduced with the DMF5 receptor specific to the MART-1 reference peptide included in each library. Here, the observed signal intensities ($10^3$-$10^4$) were sufficient to distinguish the approximately 33% population of DMF5 positive cells from the negative fraction (FIG. 15c).

Probing Polyclonal TCR Repertoires Using Barcoded pMHC Libraries

Figure 7A:
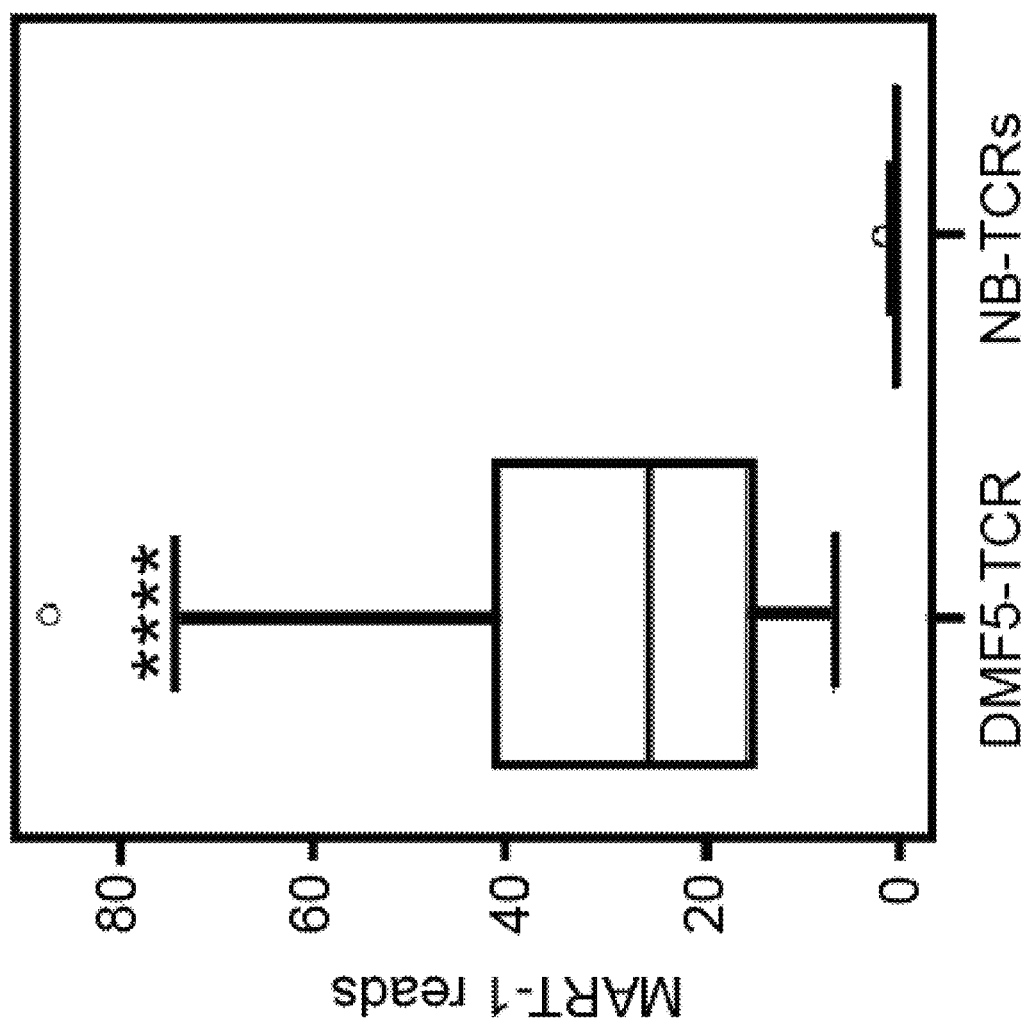

To confirm that the above approach has sufficient sensitivity to detect antigen-specific T cells within a heterogeneous sample, 1% DMF5 Jurkat/MA T cells were spiked into a sample of CD8-enriched PBMCs co-cultured with dendritic cells and stained with the library of 31 neoepitopes, including the MART-1 peptide. 100,000 tetramer positive cells were collected and 3,000 were sequenced. From this sparse sample, 256 cells with the highest number of DMF5 TCR reads were extracted and analyzed together with their corresponding MART-1 tetramer reads. In total, 85 cells with ≥10 MART-1 tetramer counts were recovered, 76 of which showed ≥10 DMF5 TCR reads (considered DMF5 positive), giving an approximate false positive rate of 10.6% (FIG. 7a). Conversely, 6 DMF5 positive cells showed ≤10 MART-1 tetramer counts, resulting in a false negative rate of 7.9%. The low number of cells with significant tetramer barcode reads could be a function of tetramer avidity, exacerbated by high dilutions through the 10× Genomics system prior to cDNA preparation. This analysis shows that the discrimination between antigen-specific and non-specific T cells present in a mixed sample can be accomplished on the basis of tetramer barcode reads with high confidence (p-value <0.0001 using a two-tailed Mann-Whitney test), suggesting that tetramer libraries prepared by TAPBPR-mediated exchange can be used to identify sparse populations of antigen-specific T cells within a heterogeneous sample.

Figure 7B:
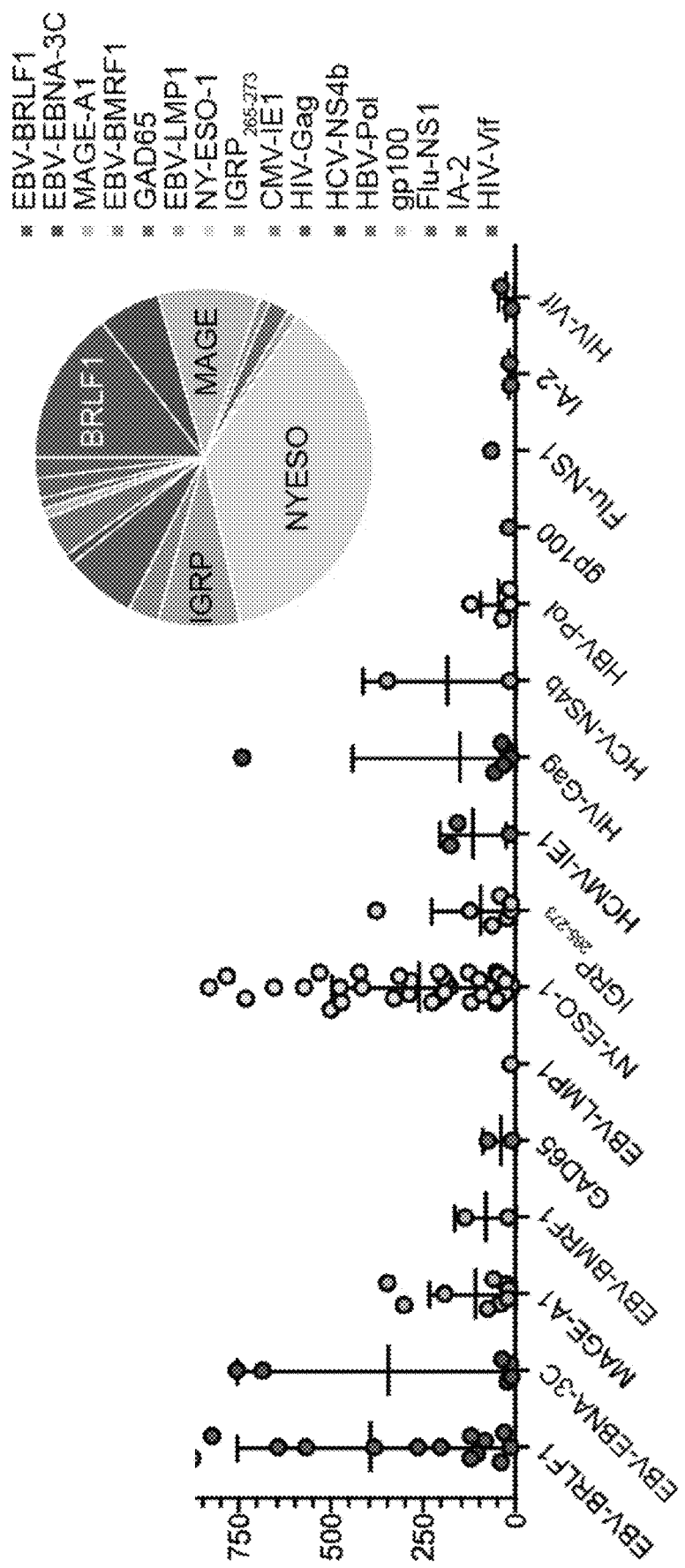
Figure 7C:
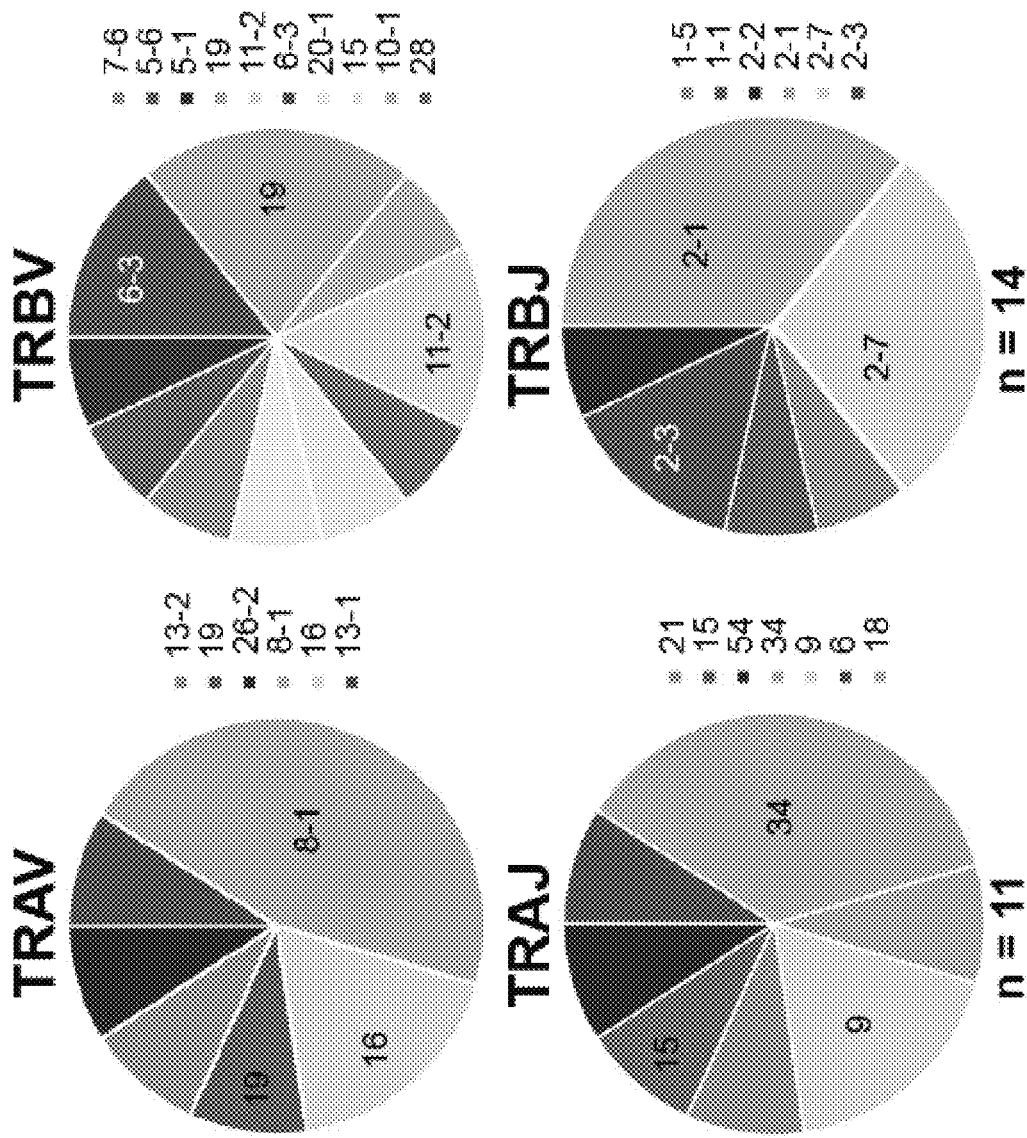
Figure 7D:
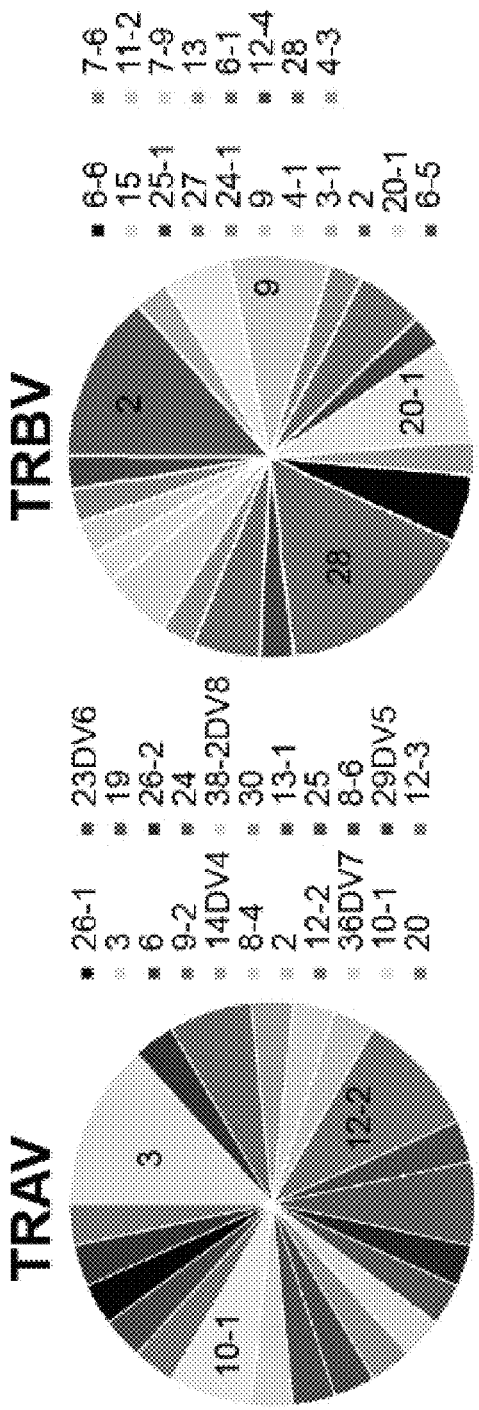

Finally, the above methodology was used to probe distinct TCR specificities present in a polyclonal repertoire of T cells. A total of $2 \times 10^6$ CD8+ T cells isolated from the spleen of an EBV-positive donor were stained using a barcoded tetramer library consisting of 34 viral, autoimmune and tumor epitopes (FIG. 22). After sorting (gating strategy shown in FIG. 18), 3,000 tetramer positive cells were loaded on the 10× platform for single-cell sequencing. ECCITE-seq analysis retrieved 1,722 cell barcodes, the majority of which were associated with <2 tetramer reads, giving a low apparent background. 110 cells were further identified as tetramer-enriched, defined as cells with >10 tetramer reads for at least one peptide specificity. 27 tetramer-enriched cells bound to >5 different peptide epitopes, 5 of which showed no bias towards a particular epitope and were excluded from subsequent analysis. Among the final set of 102 tetramer-enriched cells, a total of 16 distinct epitope specificities were identified, with an average of 200 reads per cell for each dominant tetramer (FIG. 7b). Specifically, a large fraction of tetramer-enriched cells had high reactivity for the NY-ESO-1 epitope (37 cells), followed by EBV-BRLF1 (16 cells), MAGE-A1 (10 cells) and $IGRP_{265-273}$ (7 cells). Towards validating the significance of these results, barcodes corresponding to the EBV-BRLF1 epitope (FIG. 7c) whose TCR repertoire has been previously characterized using adhoc tetramers prepared using conventional refolding protocols were the focus (Trautmann et al., *Eur. J. Immunol.* 32:3181-3190 (2002)). Inspection of V(D)J TCR sequence reads from tetramer-enriched cells identified a clear bias towards the usage of TRAV8-1 (50%) with TRAJ34 (50%), TRBV19 (21%), TRBJ2-1 (36%) and TRBJ2-7 (29%), a finding consistent with published reports on EBV-BRLF1 specific repertoires (Koning, et al., *J Immunol.* 190:931-939 (2013)). Whereas the β-chain CDR3 sequences were more variable, analysis of TRA CDR3 sequences further identified a known public α-chain CDR3 (CAVKDTDKLIF) which was previously linked to a functional TCR, specific for the EBV-BRLF1 epitope (Bentzen et al., *Nature Biotechnology* 34(1): 1037-1045 (2016)) (FIG. 7e). This sequence was observed in half of EBV-BRLF1 tetramer-enriched cells, and was not detected in cells enriched for any other tetramer. The TCR repertoire from 37 T cells with high barcode reads corresponding to the heteroclitic NY-ESO-1 epitope (SLL-MWITQA)(SEQ ID NO:11) were also analyzed. Here, the TCR α- and β-chain TCR sequences were more diverse, with some biases for TRBV28 (15%) and TRBJ2-7 (8%) usage (FIG. 7d). The observed diversity in TCR CDR3 regions that recognize NY-ESO-1 tetramers are consistent with the known high cross-reactivity of this epitope (Valmori et al., *Cancer Res* 60:4499-4506 (2000)), and provide clues for engineering more exclusive TCRs for immunotherapy applications (Bethune et al., *Proc. Natl Acad. Sci.* USA 115:E10702-E10711, doi:10.1073/pnas.1810653115 (2018)) (FIG. 7e). Taken together, these results corroborate the initial findings using the spiked DMF5/PBMC sample (FIG. 7a), and further suggest that the barcoded pMHC libraries prepared using TAPBPR exchange are of sufficient quality and staining efficiency to identify antigen-specific TCRs present within polyclonal repertoires.

DISCUSSION

A robust method has been outlined to isolate stable, empty MHC-I molecules at milligram quantities, that can be readily loaded with peptides of choice in a high-throughput manner. Rather than relying on chemically synthesized conditional ligands, this approach employs a molecular chaperone, TAPBPR, in an analogous manner to the antigen processing pathway used by cells to load MHC-I molecules with immunodominant peptides (Germain & Margulies, *Annu Rev Immunol* 11:403-450 (1993)). In combination with a simple indexing design that is compatible with the 10× Genomics system, this approach can efficiently link paired TCR V(D)J sequences and other transcription markers to their pMHC specificities in a polyclonal sample setting. The peptide exchange and barcode sequencing workflow has no theoretical upper limit with respect to library size, other than the cost of peptide and oligo synthesis, which renders it suitable for the simultaneous analysis of hundreds of epitope specificities in future experiments. In addition to expediting tetramer library preparation and the identification of novel TCR specificities, the described method can be readily extended to include the analysis of complete transcriptomes (Mimitou et al., *Nat Methods* 16:409-412 (2019); and Stoeckius et al., *Nat Methods* 14:865 (2017)), thereby providing a toehold for functional studies of TCR:pMHC recognition.

METHODS

Peptide Sequences

All peptide sequences are given as standard single letter code. Peptides used for MHC refoldings and production of the neoepitope library were purchased from Genscript at 98% purity or as pepsets from Mimotopes as crude peptides and dissolved in 8.25% Acetonitrile, 25% DMSO, and 66.75% $H_2O$. Peptides containing modifications: TAMRA-TAX and GILGFVFXL (where X=3-amino-3-(2-nitrophenyl)-propionic acid) were purchased from Biopeptik at 98% purity. 1LFGYPVYV (SEQ ID NO:21) and Ac-LLFGYPVYV (SEQ ID NO:3) were synthesized in house using standard FMOC chemistry. Peptide binding affinities were predicted using netMHCpan 4.0 (Jurtz et al., J. Immunol. 199:3360-3368 (2017)).

In Vitro Refolding of pMHC Molecules

Plasmid DNA encoding the luminal domain of class I MHC (MHC-I) heavy chains H-2D$^d$, HLA-A*02:01, H-2L$^d$ and human $\beta_2$-microglobulin (h$\beta_2$m,) were provided by the tetramer facility (Emory University), and transformed into Escherichia coli BL21(DE3) (Novagen). MHC-I proteins were expressed in Luria-Broth media, and inclusion bodies (IBs) were purified using standard protocols (Garboczi et al., Proc. Natl Acad. Sci. USA 89:3429-3433 (1992)). In vitro refolding of pMHC-I molecules was performed by slowly diluting a 200 mg mixture of MHC-I and h$\beta$2m at a 1:3 molar ratio over 24 hours in refolding buffer (0.4 M L-Arginine, 100 mM Tris pH 8, 2 mM EDTA, 4.9 mM reduced glutathione, 0.57 mM oxidized glutathione) containing 10 mg of synthetic peptide purchased from Genscript at 98% purity at 4° C. H-2D$^d$ heavy chain was refolded with RGPGRAFVTI(SEQ ID NO:12) (P18-I10) derived from HIV gp120 (Li, et al., J. Mol. Biol. 283, 179-191 (1998)) or _GPGRAFVTI(SEQ ID NO:13) (gP18-I10). H-2L$^d$ was refolded with _PNVNIHNF (SEQ ID NO:14) (gp29) or QLSPFPFDL (SEQ ID NO:15) (QL9) derived from oxo-2-gluterate dehydrogenase. HLA-A*02:01 was refolded with variants of LLFGYPVYV (SEQ ID NO:3) (TAX) derived from HTLV-1 including _LFGYPVYV (SEQ ID NO:21) (gTAX), N-terminally acetylated TAX (Ac-LLFGYPVYV (SEQ ID NO:3)), 1LFGYPVYV (SEQ ID NO:21) where the first residue is a D-leucine or with ELAGIGILTV (SEQ ID NO:23) (MART-1) derived from Melan-A. Refolds were allowed to proceed for 96 h followed by size exclusion chromatography (SEC) using a HiLoad 16/600 Superdex 75 column (150 mM NaCl, 25 mM Tris pH 8) at a flow rate of 1 mL/min, followed by anion exchange chromatography on a mono Q 5/50 GL column at 1 mL/min using a 40 minute 0-100% gradient of buffer A (50 mM NaCl, 25 mM Tris pH 8) and buffer B (1 M NaCl, 25 mM Tris pH 8). Typical protein yields from a 1L refold were 5 to 10 mg of purified pMHC-I.

Recombinant TAPBPR Expression and Purification

The luminal domain of TAPBPR was expressed using a stable Drosophila S2 cell line (Dr Kannan Natarajan, National Institutes of Health) induced with 1 mM $CuSO_4$ for 4 days and purified using affinity-based and size exclusion chromatography[17]. Briefly, His$_6$-tagged TAPBPR was captured from the supernatant by affinity chromatography using high-density metal affinity agarose resin (ABT, Madrid). Eluted TAPBPR was further purified by size exclusion using a Superdex 200 10/300 increase column at a flow rate of 0.5 mL/min in 100 mM NaCl and 20 mM sodium phosphate pH 7.2.

Size Exclusion Chromatography of MHC-I/TAPBPR Complexes

SEC analysis of MHC-I/TAPBPR interaction was performed by incubating 40 µM purified pMHC-I molecules with purified TAPBPR at a 1:1 molar ratio in 100 mM NaCl, 20 mM sodium phosphate pH 7.2 for 1 h at room temperature. Complexes were resolved on an Superdex 200 10/300 increase column (GE healthcare) at a flow rate of 0.5 mL/min in 100 mM NaCl and 20 mM sodium phosphate pH 7.2 at room temperature. MHC-I/TAPBPR complexes eluted at 26.5 min. In the case of H-2L$^d$ and HLA-A*02:01, 10 mM GF and GM were added respectively both to the initial incubation and to the running buffer during chromatography.

LC-MS Analysis

Peptide occupancy of SEC purified MHC-I was determined by HPLC separation on a Higgins PROTO300 C4 column (5 µm, 100 mm×21 mm) followed by electrospray ionisation performed on a Thermo Finnigan LC/MS/MS (LQT) instrument. Peptides were identified by extracting expected m/z ions from the chromatogram and deconvoluting the resulting spectrum in MagTran.

Preparation of Photo-Exchanged pMHC-I

H-2D$^d$ refolded with RGPGRAFJ*TI (photo-P18-I10) and HLA-A*02:01 refolded with GILGFVFJ*L, where J* is the photo-cleavable residue 3-amino-3-(2-nitrophenyl)-propionic acid, were UV-irradiated at 365 nm for 1 h in the presence of 20-fold molar excess peptide at room temperature. Reactions were iced for 1 h then centrifugated at 14,000 rpm for 10 min to remove aggregates. Photo-exchanged pMHC-I was then used for DSF analysis or tetramer preparation.

Differential Scanning Fluorimetry (DSF)

Figure 17A:
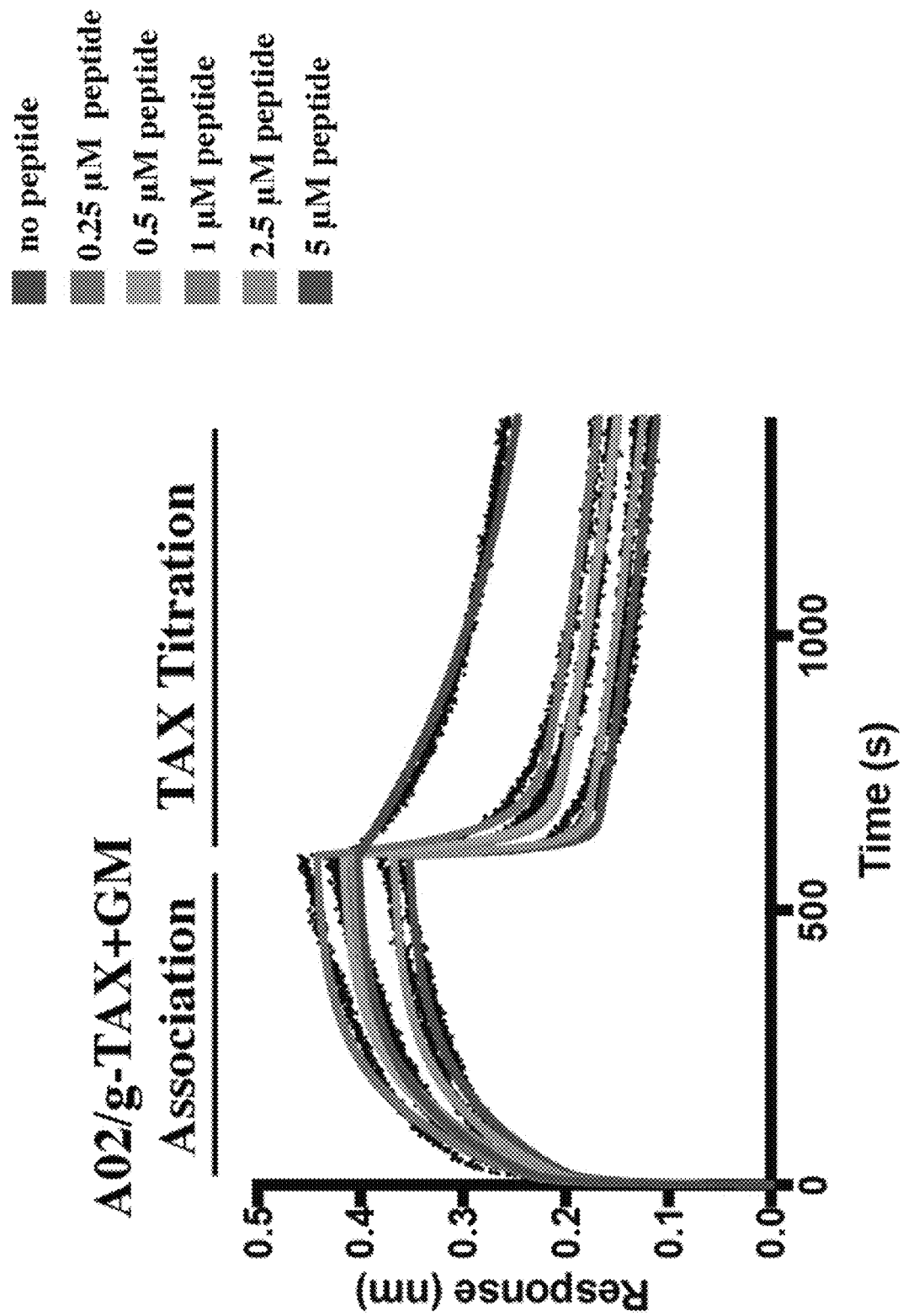
Figure 17B:
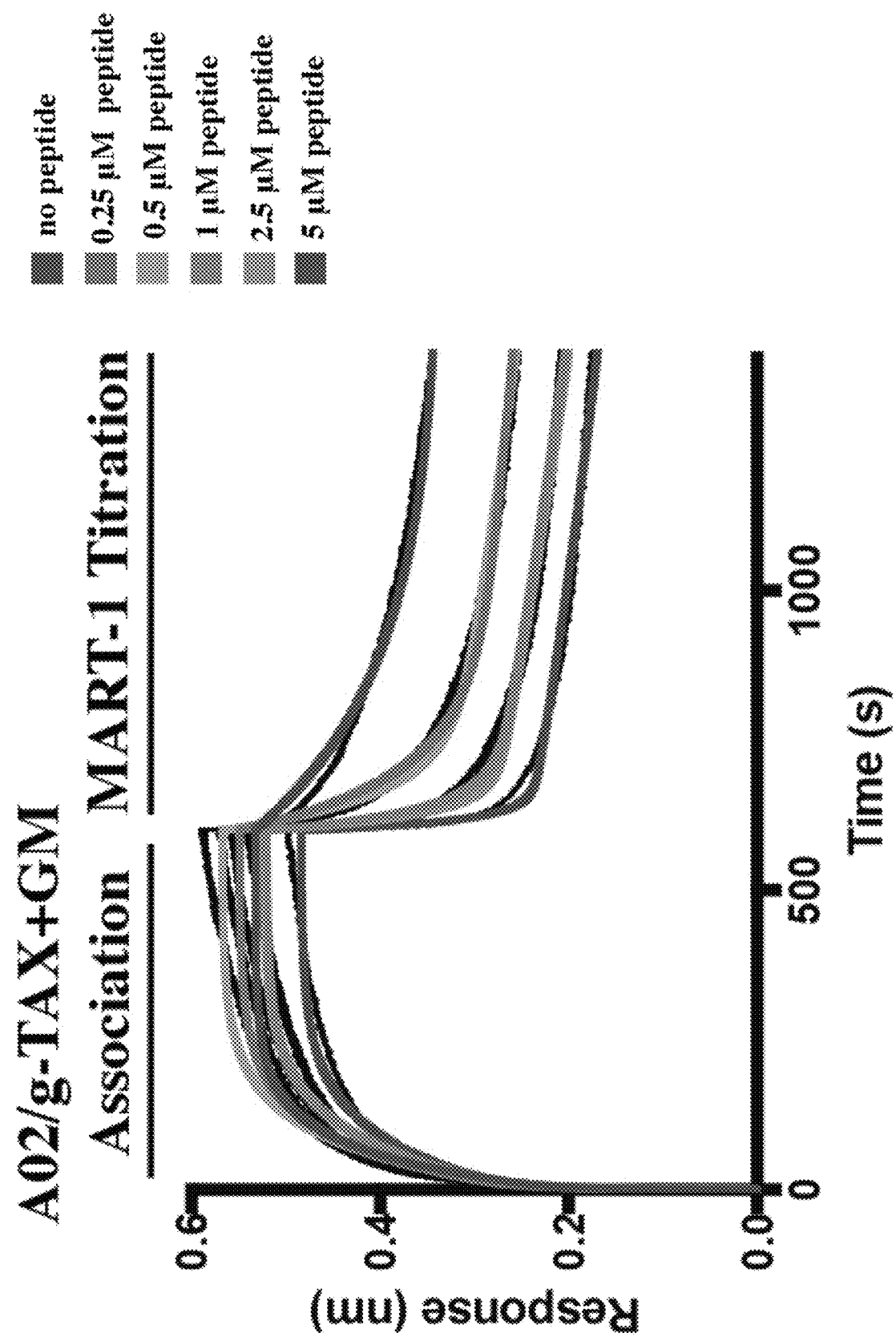
Figure 17C:
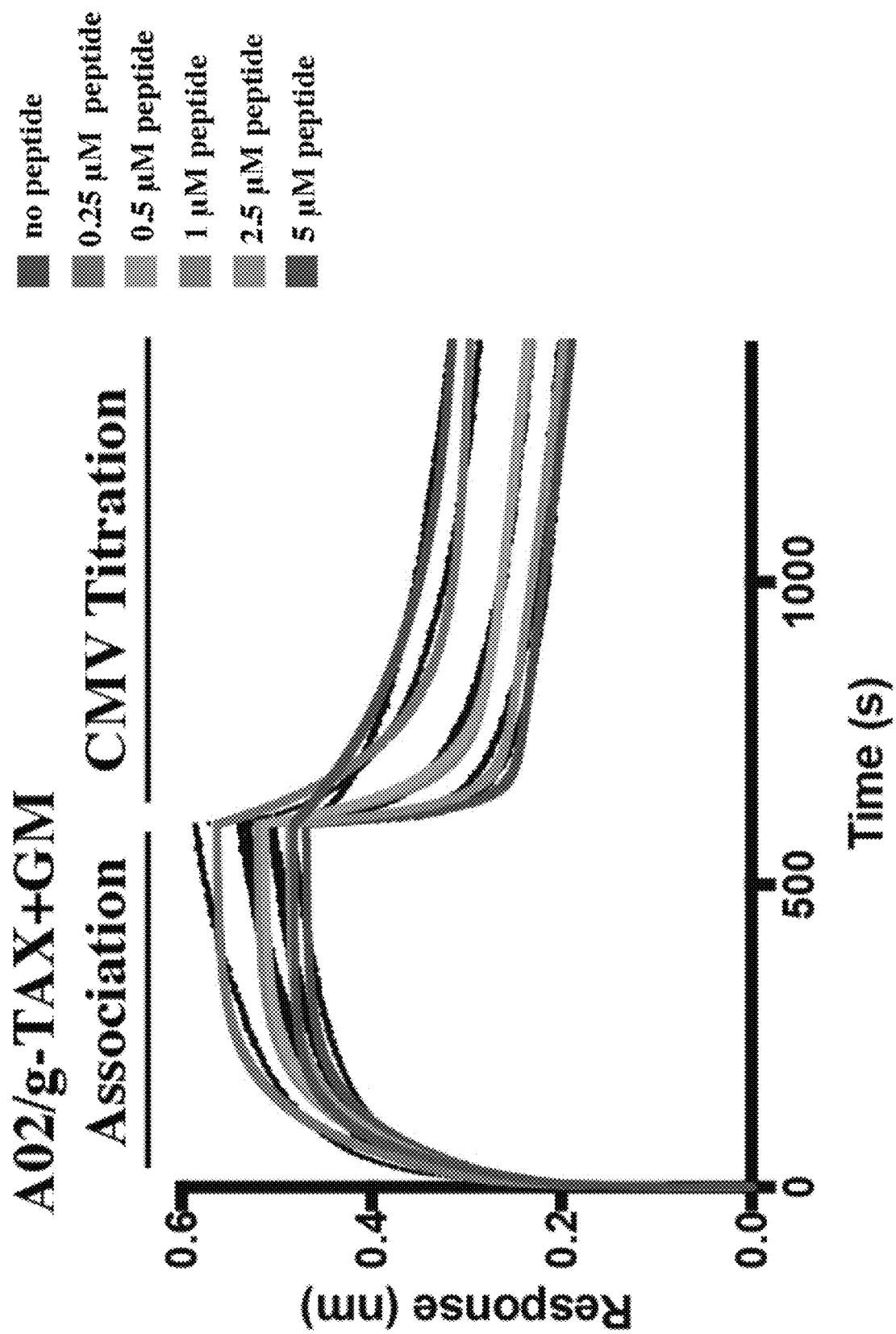
Figure 17D:
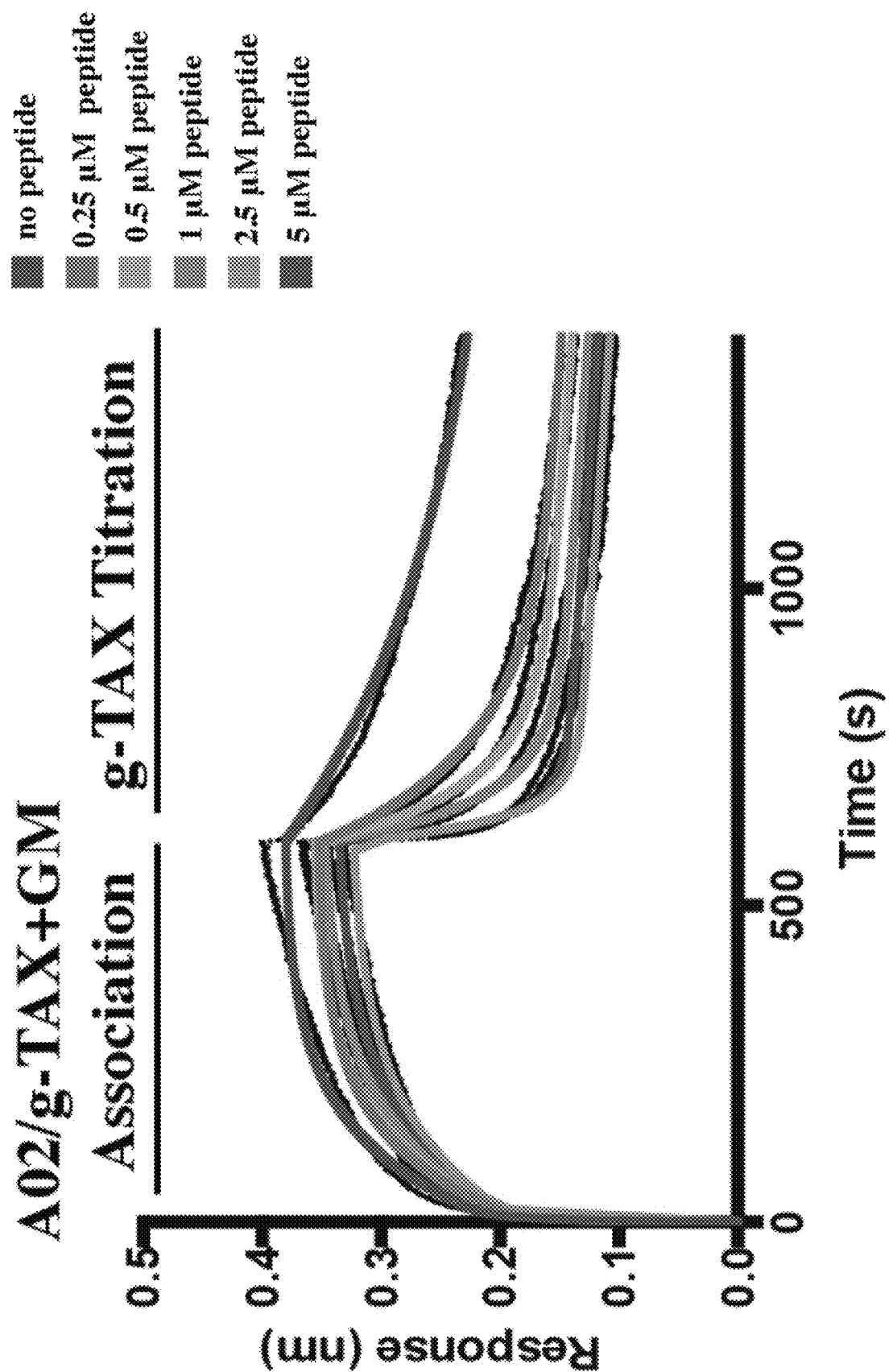
Figure 17E:
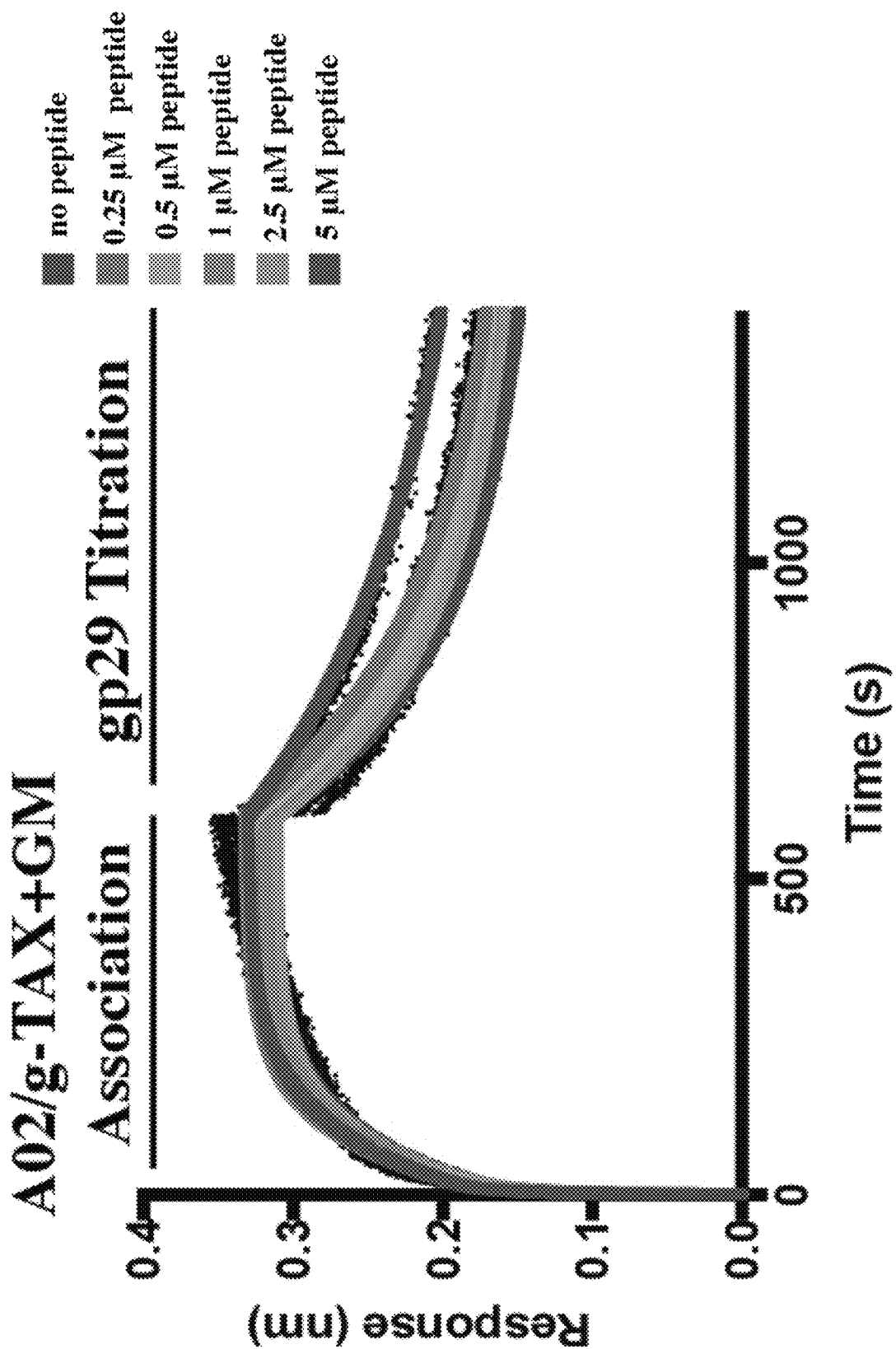
Figure 18A:
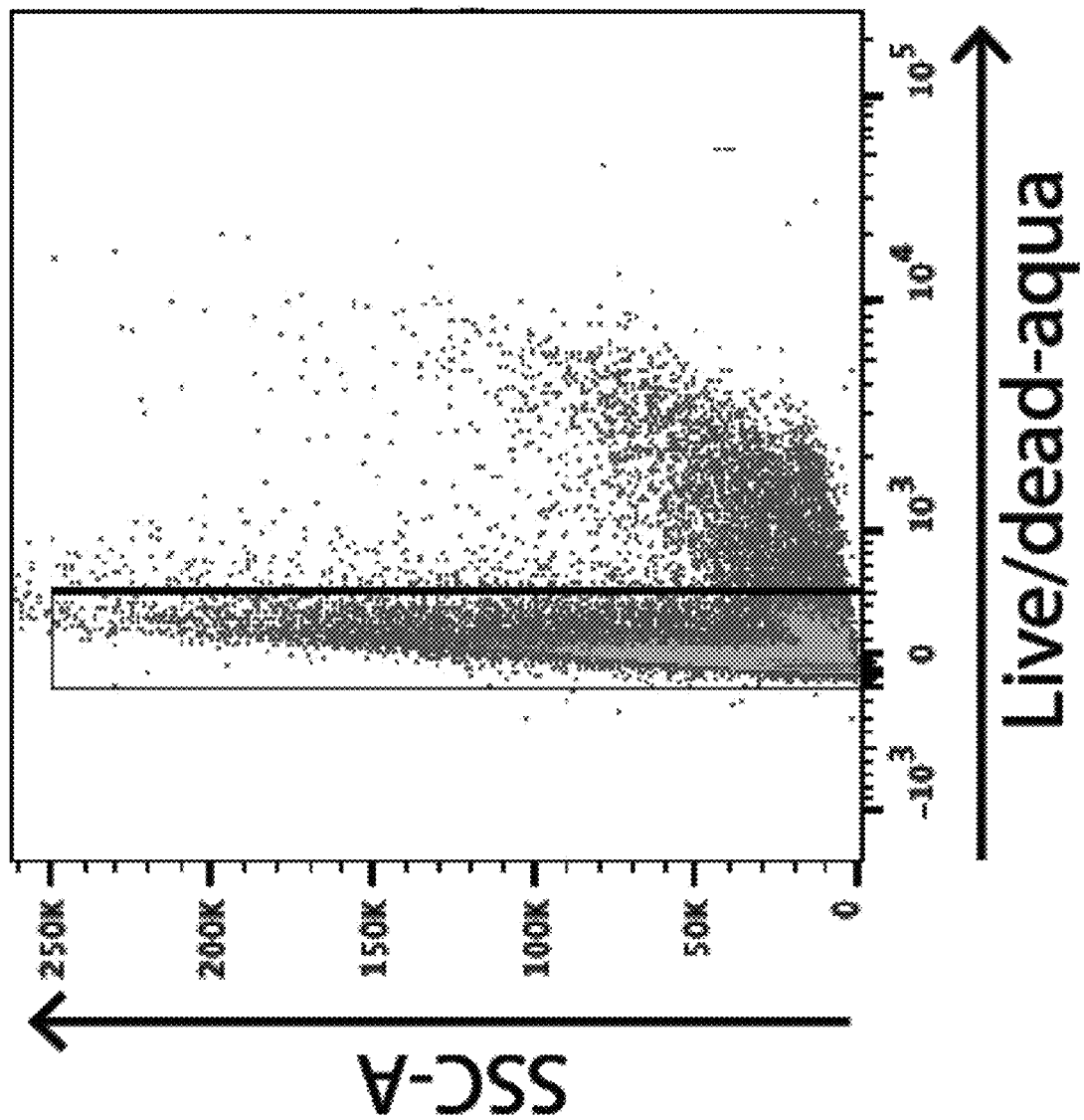
Figure 18B:
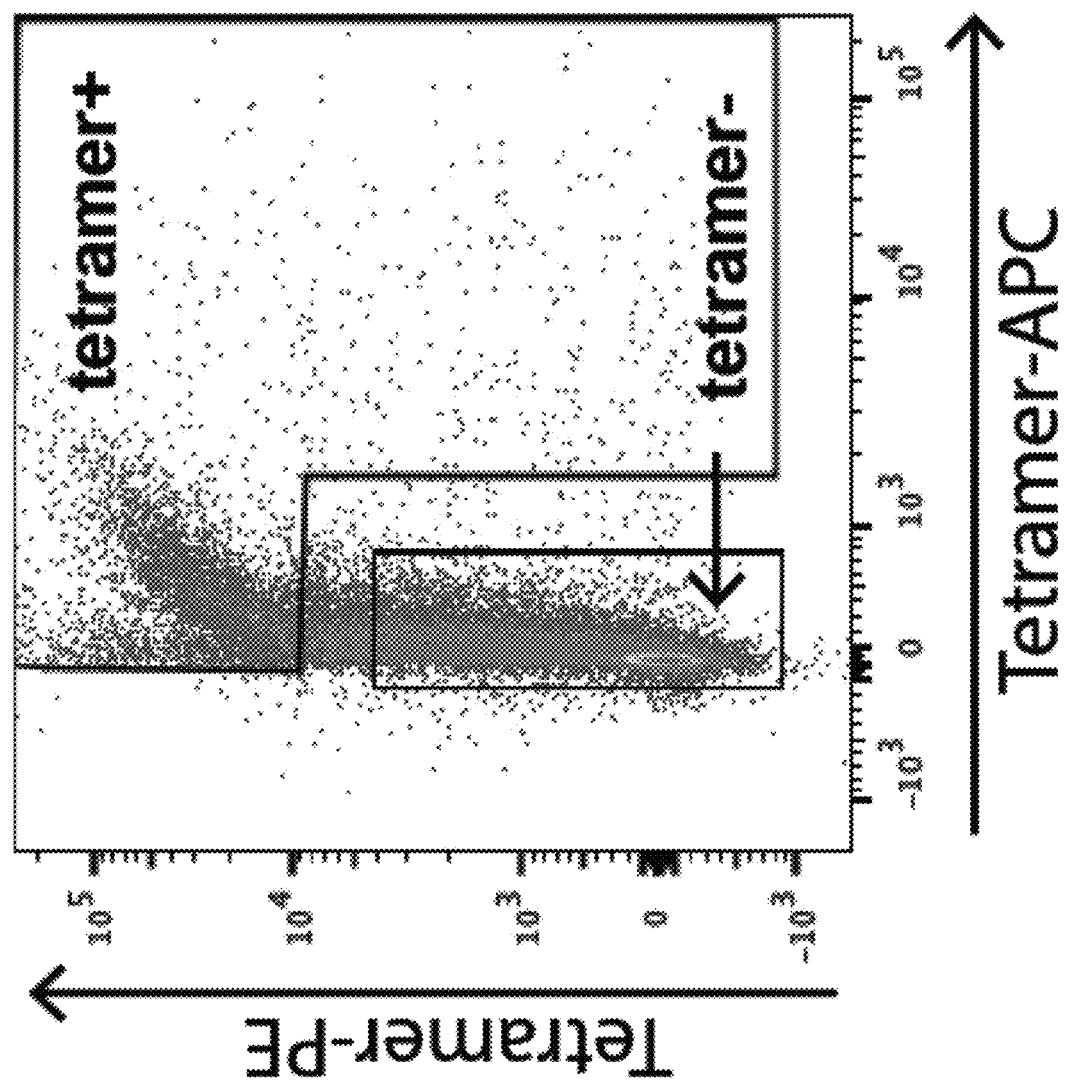
Figure 18C:
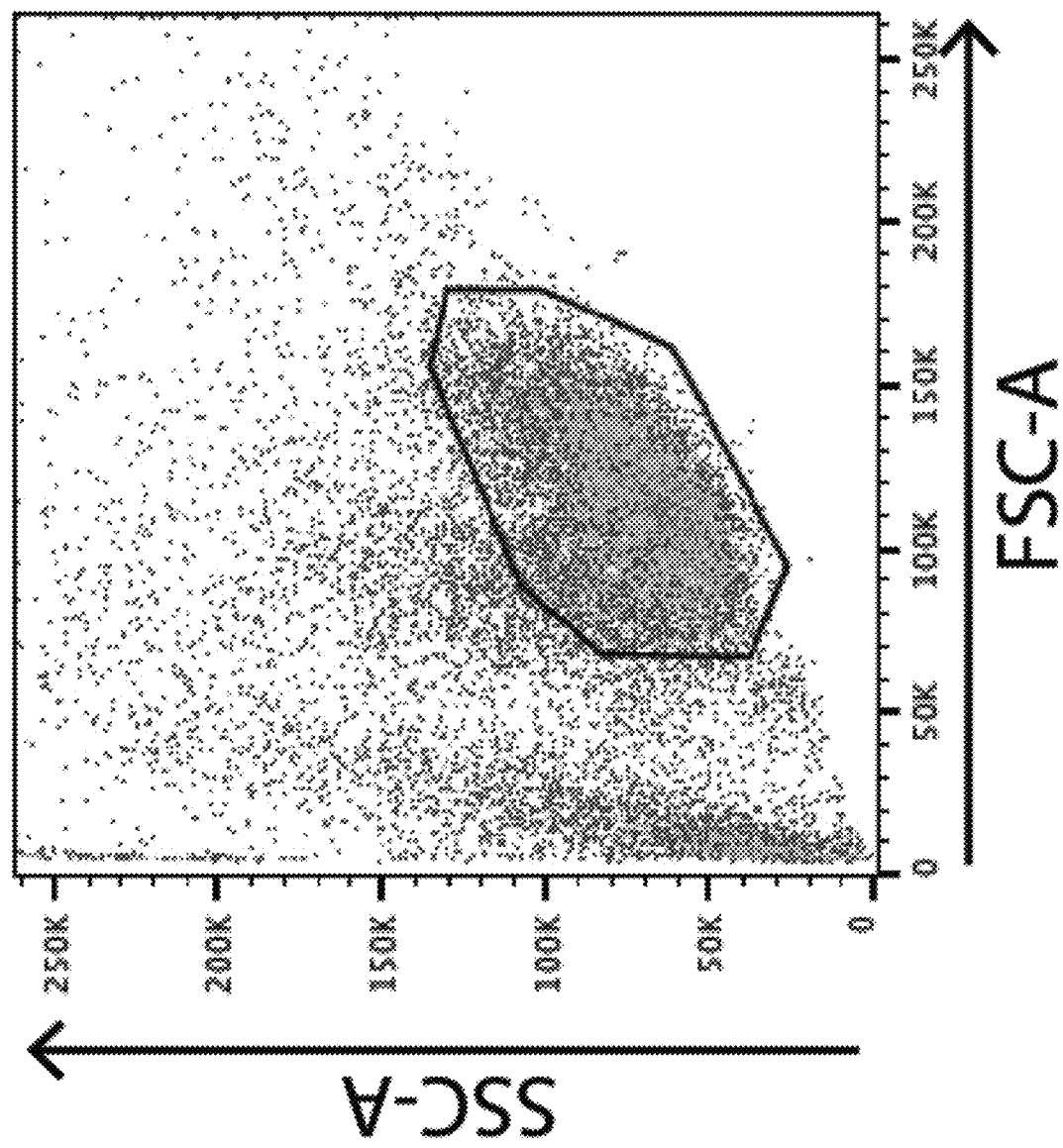
Figure 18D:
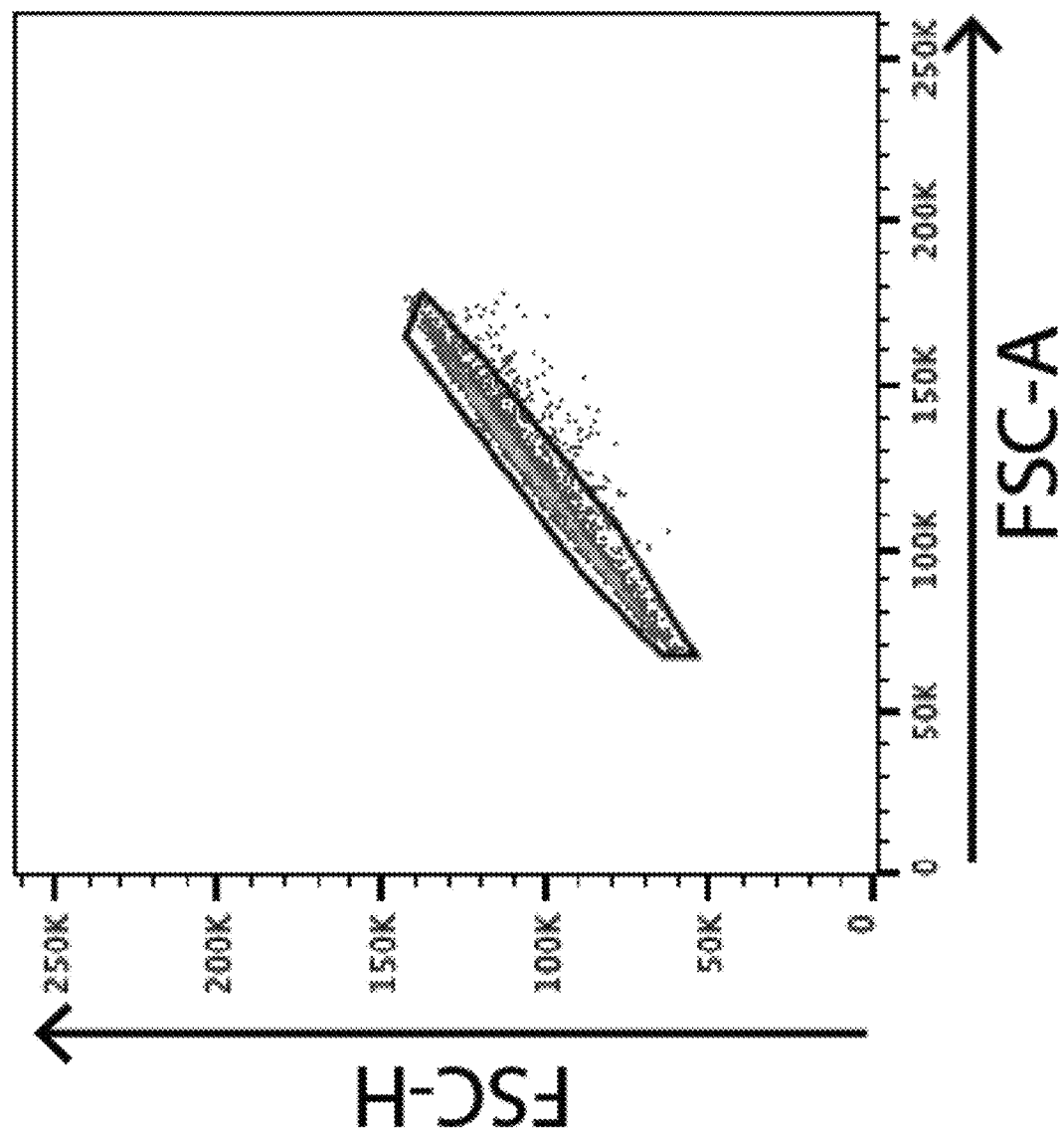
Figure 18E:
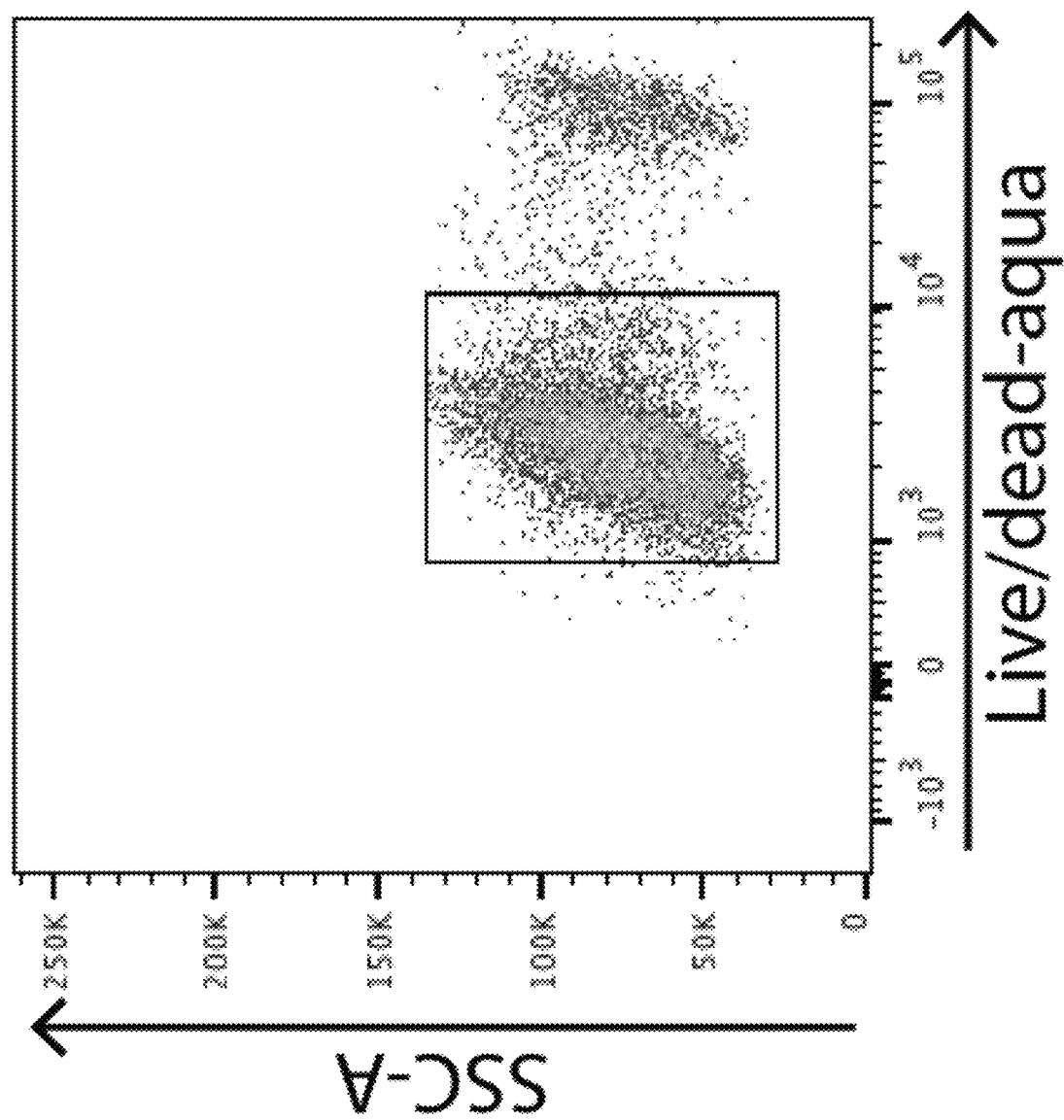
Figure 18F:
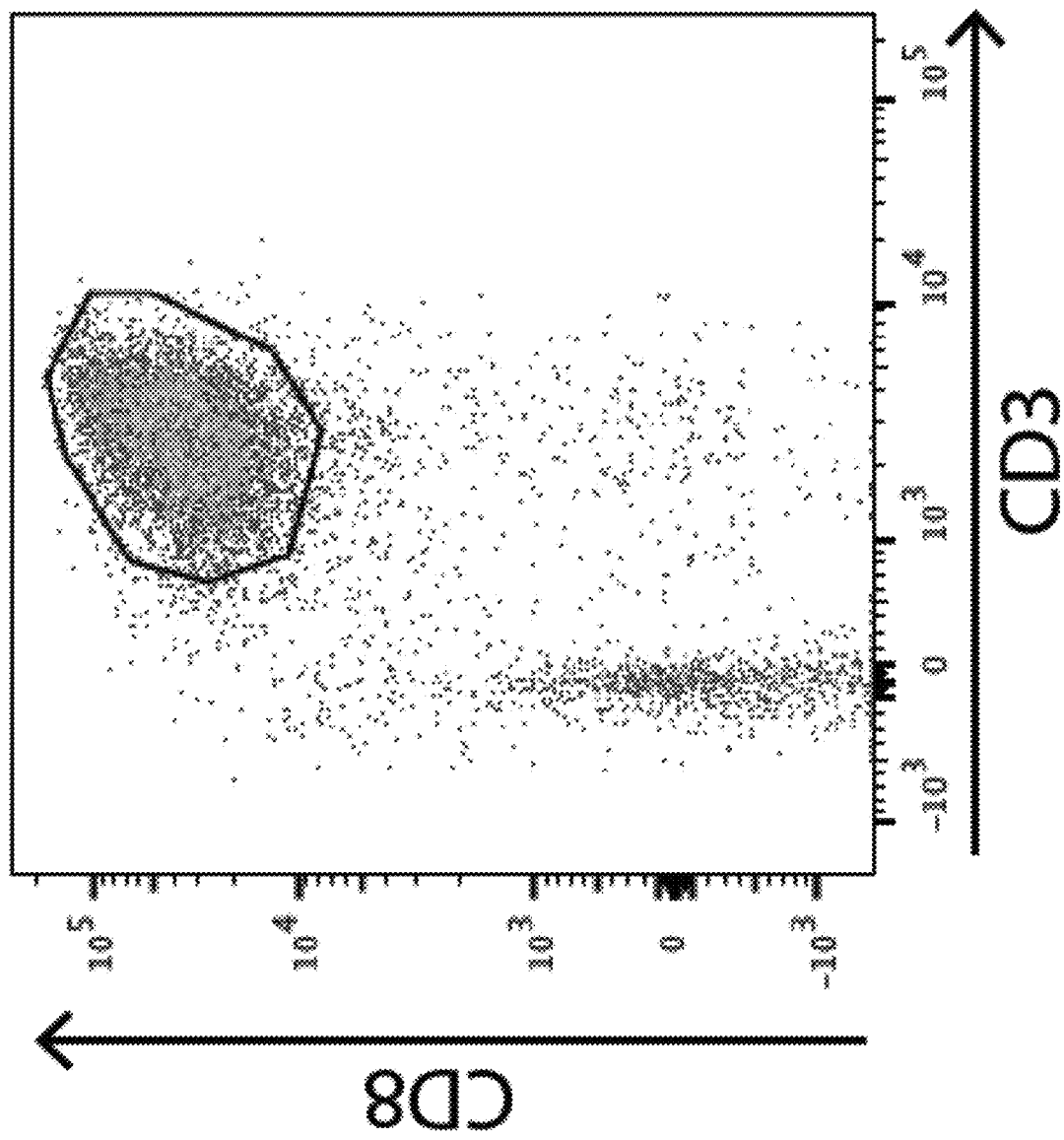
Figure 18G:
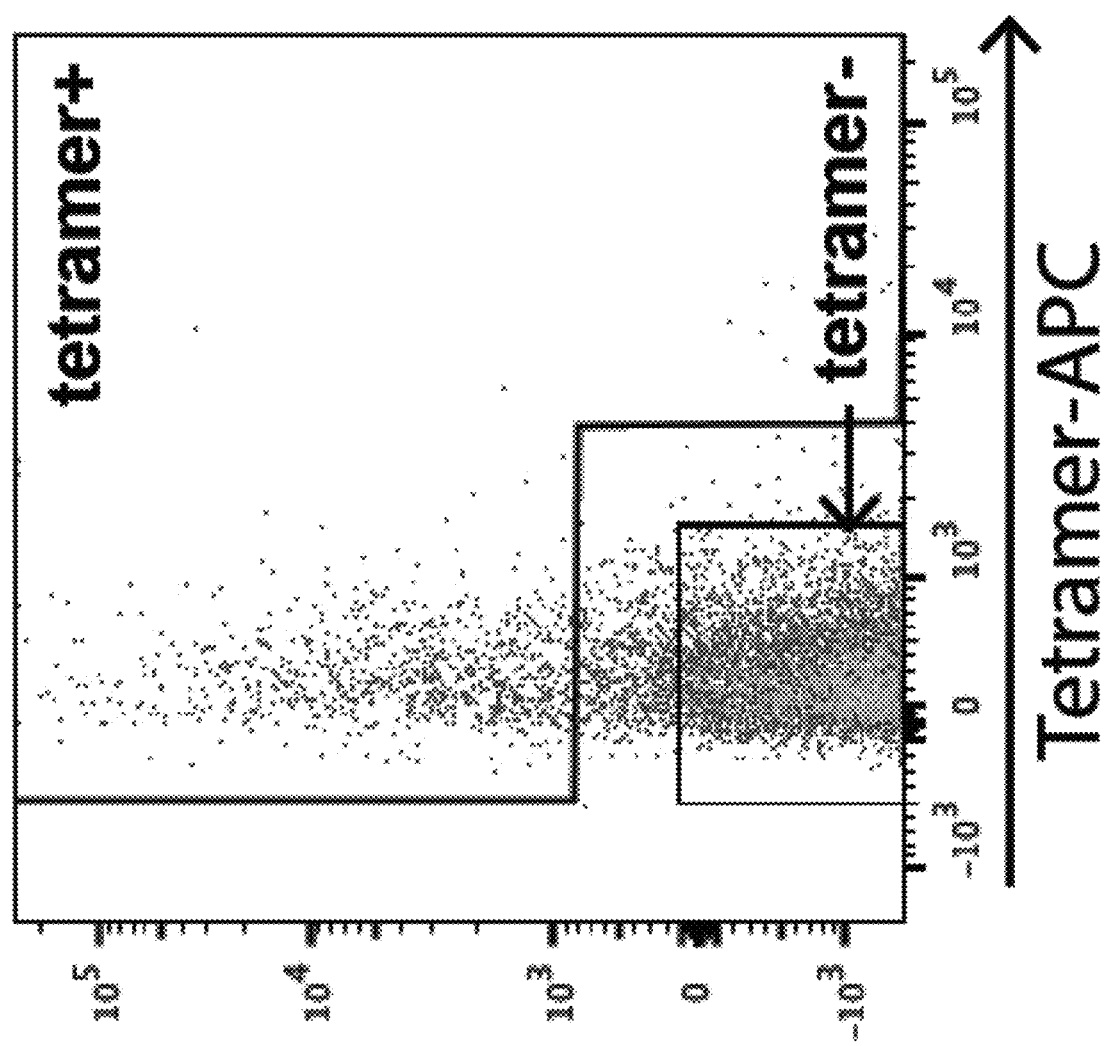

To measure thermal stability of pMHC-I molecules (Hellman et al., J Immunol Methods 432:95-101 (2016)), 2.5 µM of protein was mixed with 10× Sypro Orange dye in matched buffers (20 mM sodium phosphate pH 7.2, 100 mM NaCl) in MicroAmp Fast 96 well plates (Applied Biosystems) at a final volume of 50 µL. DSF was performed using an Applied Biosystems ViiA qPCR machine with excitation and emission wavelengths at 470 nm and 569 nm respectively. Thermal stability was measured by increasing the temperature from 25° C. to 95° C. at a scan rate of 1° C./min. Melting temperatures ($T_m$) were calculated in GraphPad™ Prism™ 7 by plotting the first derivative of each melt curve and taking the peak as the $T_m$ (FIG. 17a). Determination of $T_m$ values of TAPBPR exchanged molecules additionally required subtraction of the TAPBPR melt curve from the curve obtained for the complex, then calculating the first derivative. This procedure, on average, enhanced the $T_m$ values calculated for TAPBPR exchanged pMHC-I molecules by 1.5° C., compared to refolded and photo-exchanged pMHC-I molecules. All samples were analyzed in duplicate and the error is represented as the standard deviation of the duplicates analyzed independently.

Bio-Layer Interferometry

In each experiment, HIS1K biosensor tips (ForteBio) were first baselined in a buffer of 20 mM sodium phosphate pH 7.2, 100 mM NaCl and then coated with 6 g/mL of HIS-Tagged TAPBPR in a matched buffer until the response was between 0.3 nm and 0.4 nm for each tip. TAPBPR coated biosensor tips were then dipped into matched buffer supplemented with 0.02% TWEEN-20 and 0.5 mg/mL BSA for 6 minutes to block non-specific interaction and as secondary baseline step. Subsequent steps were performed in the secondary baseline buffer (20 mM sodium phosphate pH 7.2, 100 mM NaCl, 0.02% TWEEN-20, 0.5% BSA). Biosensor tips were then dipped into buffer containing 10 M HLA-A*02:01/g-TAX and 10 mM GM dipeptide to facilitate peptide deficient MHC-I/TAPBPR formation for 10 minutes. After peptide deficient MHC-I/TAPBPR formation on the biosensor tips, they were dipped into buffer supplemented with 0-5 µM of the indicated peptides for 14 minutes to facilitate pMHC dissociation from TAPBPR. Data was processed after subtraction of the reference sensor tip data set which was coated with TAPBPR in buffer, Y-axis alignment to the secondary baseline, and an interstep correction alignment to dissociation. All data was locally fit for association and dissociation with a 2:1 (heterogeneous) binding model. Goodness of fit was determined according to $R^2$ values of above 0.99. All experiments were performed using an Octet Red 96e system and analyzed with the Octet data analysis HT v.11.1 software.

Nano Differential Scanning Fluorimetry (nanoDSF™)

In a volume of 20 µl, 1 µM peptide deficient HLA-A*02:01/TAPBPR was incubated with 20 µM of various peptides (FIG. 22) in a buffer of 20 mM sodium phosphate pH 7.2, 100 mM NaCl, 0.02% TWEEN-20 for at least one hour. 10 ul of each sample was loaded on the Prometheus NT.48 instrument (NanoTemper™) using the high sensitivity capillaries. NanoDSF™ measurements are performed using a temperature ramp rate of 1° C./min from 25° C. to 95° C. and an LED intensity of 20%. Data was analyzed using the PR Control software (NanoTemper™). Melting temperatures ($T_m$ values) correspond to the inflection points of the first derivative of the 330/350 nm fluorescence ratio. Experiments were performed in duplicates and the shaded areas (FIG. 17b) are representative of the error.

Native Gel Electrophoresis

Peptide-deficient MHC-I/TAPBPR complexes were incubated with the indicated molar ratio of relevant (TAX) or irrelevant (P18-110) peptide for 1 h at room temperature. Samples were run at 90 V on 8% polyacrylamide gels in 25 mM TRIS pH 8.8, 192 mM glycine, at 4° C. for 4.5 hours and developed using InstantBlue (Expedeon).

Fluorescence Anisotropy

Fluorescence anisotropy was performed using TAX peptide labeled with TAMRA dye ($K_{TAMRA}$LFGYPVYV (SEQ ID NO:21)) (herein called TAMRA-TAX) (Jiang et al., Science 358, 1064-1068 (2017)). Briefly, 50 nM of peptide-deficient HLA-A*02:01/TAPBPR complex in 100 mM NaCl, 20 mM sodium phosphate and 0.05% (v) tween-20, were incubated with 0.75 nM TAMRA-TAX and graded concentrations of MART-1, CMVpp65 or unlabeled TAX peptide in total volumes of 100 µL in black 96 well assay plate (Costar 3915) for 2 hours at room temperature while Fluorescence anisotropy (r) was recorded. Fluorescence anisotropy (FA) was recorded on a Perkin Elmer Envision 2103 with an excitation filter of $\lambda_{ex}$=531 nm and an emission filter of $\lambda_{em}$=595 nm. FA were normalized against TAMRA-TAX alone. Measurements were recorded every 30 seconds and data points represented are an average of FA values acquired following 105 minutes of incubation. All experiments are representative of at least 3 individual experiments run in triplicates. Data points were plotted and fit using a sigmoidal response curve in GraphPad™ Prism™ 7.

Preparation of Barcoded Peptide Exchanged Tetramers

Purified, BirA-tagged pMHC-I molecules were biotinylated using the BirA biotin-protein ligase bulk reaction kit (Avidity), according to the manufacturer's instructions. Biotinylated pMHC-I was buffer exchanged into PBS pH 7.4 using Amicon-® Ultra centrifugal filter units with the membrane cut-off 10 kDa. The level of biotinylation was evaluated by SDS-PAGE gel-shift assay in the presence of excess streptavidin.

In the "stoichiometric" approach, equimolar quantities of MHC-I loaded with "goldilocks" peptides and TAPBPR were added to streptavidin-PE (Prozyme) (2:1 MHC-I: streptavidin molar ratio) in ten additions every ten minutes at room temperature. For tetramer barcoding, custom biotinylated DNA oligos (IDT) were used. Each tetramer was barcoded by adding 2:1 molar equivalent of DNA-barcodes relative to streptavidin and incubated for 1 hr, at room temperature. Peptide-deficient barcoded-MHC-I/TAPBPR tetramers were then exchanged with peptides of interest by adding a 10-fold molar excess of peptide to each well and incubating overnight at 4° C. Additionally, 10-fold molar excess biotin (to block any free streptavidin sites) was added and incubated for a further 1 h at room temperature. After exchange, tetramers were transferred to Amicon® Ultra centrifugal filter units with the membrane cut-off 100 kDa and washed with 1000 volumes of PBS to remove TAPBPR and excess of peptide and barcodes. After washing, exchanged tetramers were pooled and stored at 4° C. for up to 3 weeks. In the "catalytic" approach, the MHC-I loaded with "goldilocks" peptides were mixed with a 1:100 molar ratio of TAPBPR and added to streptavidin-PE (Prozyme) in the same way as described for the "stoichiometric" approach. All the further procedures were exactly the same.

Cell Culture

58 $\alpha^-\beta^-$ T cells expressing the B4.2.3 TCR, which recognizes P18-I10 bound to H-2D$^d$, were obtained from Dr. Kannan Natarajan (NIH). TCR 3-chain deficient Jurkat-MA T cells expressing the DMF5 TCR, which recognizes Melan-A epitope MART-1 bound to HLA-A*02:01 and Jurkat-MA T cells expressing the NY-ESO-1 TCR which recognizes the NY-ESO-1 epitope bound to HLA-A*02:01 were generated as described below. All three lines were grown in DMEM supplemented with 10% FBS, 25 mM HEPES pH 7, 2 µM β-mercaptoethanol, 2 mM L-glutamine, 100 U/mL penicillin/streptomycin and 1×non-essential amino acids. Cells were maintained in exponential phase in a humidified incubator at 37° C. with 5% $CO_2$. Splenocytes from HLA-A*02:01+ organ donors were obtained through the Human Pancreas Analysis Program (University of Pennsylvania) after informed consent by each donor's legal representative.

Generation of DMF5 and of NY-ESO-1 T Cell Lines

Retrovirus for transduction of Jurkat/MA (Calogero et al., Anticancer Res 20:1793-1799 (2000)) and primary CD8 T cells was produced using Platinum-A retroviral packaging cell line. DMF5/NY-ESO-1 cassettes were assembled using previously described CDR3 sequences and V(D)J family genes (Borbulevych et al., J Immunol 187:2453-2463 (2011)), codon optimized, synthesized, and cloned into pMP71 retroviral vector (Engels et al., Hum Gene Ther 14:1155-1168 (2003)). Jurkat/MA cells were plated in 6-well plates at 7×10$^5$ cells/well and transfected with 2.5 mg of retroviral vector pMP71 using Lipofectamine 3000 (Life Technologies, Invitrogen). After 24 hours, medium was replaced with IMDM-10% FBS or AIM-V-10% FBS. Supernatants were harvested and filtered with 0.2 mM filters after 24 hours incubation and transferred to Jurkat/MA cells in 6-well plates pre-treated with 1 mL well/Retronectin (20 mg/mL in PBS, Takara Bio. Inc.,) at 1×10$^6$ cells/well and spinoculated with 2 mL of retroviral supernatant at 800 g for 30 min at RT. After 24 hours, cells were washed and PBS, and cultured in IMDM-10% FBS. Jurkat/MA cells were stained with MART-1/NY-ESO-1 dextramers (Immudex), and sorted for dextramer positive cells.

PBMC/DC Co-Culture

Normal donor monocytes were plated on day 1 in 6-well plates at $5 \times 10^6$/well in RPMI-10 FBS supplemented with 10 ng/ml IL-4 (Peprotech) and 800 IU/ml GM-CSF (Peprotech) and incubated at 37° C. overnight. On day 2, fresh media supplemented with 10 ng/ml IL-4 and 1600 IU/ml GM-CSF was added to the monocytes and incubated at 37° C. for another 48 hours. On day 4, non-adherent cells were removed and immature dendritic cells washed and pulsed with 5 uM peptide in AIM-V-10% FBS supplemented with 10 ng/ml IL-4, 800 IU/ml GM-CSF, 10 ng/ml LPS (Sigma-Aldrich), and 100 IU/ml IFN-γ (Peprotech) at 37° C. overnight. Day 1 was repeated on days 4 and 8 to generate dendritic cells for the second and third stimulations on days 8 and 12, respectively. On day 5, normal donor-matched CD8+ T cells were co-cultured with the pulsed dendritic cells in AIM-V-10% FBS. Day 5 protocol was repeated on day 8 and day 12 using dendritic cells generated on days 4 and 8 for the second and third stimulation, respectively.

Flow Cytometry

Tetramer analysis was carried out by staining $2 \times 10^5$ cells with anti-CD8α mAb (BD Biosciences) and 1 µg/mL of HLA-A02:01/MART-1, HLA-A02:01/NY-ESO-1 or 1 µg/mL H-2D$^d$/P18-I10 tetramer for 30 minutes on ice, followed by two washes with 30 volumes of FACS buffer (PBS, 1% BSA, 2 mM EDTA). Live/dead gating determined by staining with propidium iodide. All flow cytometric analysis was performed using a BD LSR II instrument equipped with FACSDiva™ software (BD Biosciences). For cell sorting experiments, cryopreserved human splenocytes were thawed and rested in RPMI media (10% FBS, 1% L-glutamine, 1% Pencillin/Streptomycin). CD8+ T cells were enriched by negative selection using magnetic beads according to the manufacturer's protocol (STEMCELL Technologies). Cells were then treated with dasatinib (50 nM, Sigma-Aldrich) for 30 minutes prior to staining. Afterward, 50 µL each of PE and APC versions of the tetramer library were added (final amount was 0.5 µg pMHC per tetramer) were added for 15 minutes at room temperature. Cells were washed and resuspended in BD pre-sort buffer (BD Biosciences). Cell sorting was performed on a FACS Aria™ FUSION (BD Biosciences). Live cells were gated based on forward and side scatter profiles and data was analyzed using FlowJo™ software (FlowJo™, LLC). For $EC_{50}$ determination, tetramer concentrations were calculated based on total amount of pMHC-I at the time of exchange. Titrations were performed on the appropriate cell line in duplicate in two independent experiments. The percentage of tetramer+ T cells was measured relative to the staining achieved at the highest concentration tested within each experiment. $EC_{50}$ values were calculated by fitting a Boltzmann sigmoidal function to the data GraphPad™ Prism™ 7.

ECCITE-Seq

Post sorting, samples were prepped for the 10x Genomics 5P V(D)J kit workflow, and processed according to the ECCITE-seq protocol (Mimitou et al., Nat Methods 16:409-412 (2019)), with these modifications:

1) For cDNA amplification, 1 ul of 0.2 uM tetramer additive (GTCTCGTGGGCTCGGAGATG) (SEQ ID NO:24) was spiked into the reaction.

2) Post cDNA PCR, a 0.6x SPRI cleanup was performed, resulting in the larger cDNA fragments being retained on the beads, and the tetramer tags in the supernatant. After separation of the two fractions and elution from the beads, a portion of the cDNA was used to perform TCR α/β amplification and library prep, as described in the 10x genomics protocol.

3) A separate portion of the cDNA elution was used to perform a DMF5 receptor specific enrichment, using a hemi-nested PCR strategy akin to that used for the TCRα/β enrichment. All PCRs were performed using 2x KAPA Hifi Master Mix. Primers for PCRs: PCR-DMF5_PCR1 (GAAATTCACGGCGCACAGG) (SEQ ID NO:25) with SI-PCR primer (10x). PCR2-DMF5_PCR2 (CCTTGGCACCCGAGAATTCCAGCTTGGCTGGCTGTCTCTGATC)(SEQ ID NO:26) and P5_generic (AATGATACGGCGAC-CACCGAGATCTACAC)(SEQ ID NO:27). PCR3 (to add P7 end and sample index)-RPI-x primer ("x" nucleotides comprise a user-defined index) CAAGCAGAAGACGGCATACGAGATxxxxxxxx GTGACTGGAGTTCCTTGGCACC CGAGAAT-TCCA (SEQ ID NO:28) and P5_generic.

4) The supernatant of the 0.6x SPRI purification in step 2 above was purified with 2 rounds of 2x SPRI. First, 1.4x SPRI was added to the supernatant to bring up the volume to 2x, followed by two rounds of 80% ethanol washes. After eluting in water, an additional 2x SPRI cleanup was performed. Post second cleanup, the tetramer tags were converted to a sequenceable library by PCR with SI-PCR and N7XX ("x" nucleotides comprise a user-defined index) CAAGCAGAA-GACGGCATACGAGATxxxxxxxxGTCTCGTGGG CTCGG (SEQ ID NO:29).

Sequencing and Analysis

Individual tetramers were pooled in one library sample prior to sequencing. Samples were sequenced on a Miseq using a v2 300 cycle kit (151 cycles R1, 8 cycles I1, 151 cycles read 2). Post sequencing, TCR fastq files were pooled together for each sample, then analyzed using cellranger vdj 3.0.0 against the GRCh38 reference genome (v2.0.0, as provided by the 10x website). To identify the DMF5 receptor, CITE-seq-Count version 1.4.1 was used to search for the DMF5 specific tag, using default parameters (hamming distance set to 5). CITE-seq-Count version 1.4.1 was used for tetramers, using all default parameters, with the exception of hamming distance set to 1, and a whitelist to search for only cells with TCR found by 10x.

TCR Repertoire Analysis

All analysis was performed using the PE-tetramer barcodes alone. Cells with ≥10 tetramer reads were clustered into pMHC specificity groups based on the tetramer barcode read. Cells with multiple tetramers with >10 reads were clustered based on the most frequent tetramer read (≥50% of total tetramer reads for that T cell). All TCR sequences identified (partial or complete) were used in global VJ usage analysis. In cases where multiple TCRs were read, only TCR sequences with the highest true reads were used (generally representative of ≥90% of TCR reads for that T cell). Known receptors and CDRs were queried and identified using VDJdb and literature searches.

What is claimed is:

1. A method of making a plurality of peptide receptive MHC-I complexes each of which can accept a peptide of interest, each peptide receptive MHC-I complex comprising an MHC class I heavy chain and a β2-microglobulin, the method comprising:
   a) incubating a plurality of MHC class I heavy chains; a plurality of β2-microglobulins; and a plurality of placeholder peptides, under conditions wherein the plurality of MHC class I heavy chains, the β2-microglobulins and the plurality placeholder peptides form a plurality of placeholder peptide-MHC class I (p*MHC-I) complexes, wherein all of the MHC class I heavy chains in the plurality of MHC class I heavy chains are HLA-A*24:02 and all of the placeholder peptides in the plurality of placeholder peptides consist of the amino acid sequence YPLFGWCF (SEQ ID NO:1), or wherein all of the MHC class I heavy chains in the plurality of MHC class I heavy chains are HLA-A*68:02 and all of the placeholder peptides in the plurality of placeholder peptides consist of the amino acid sequence LFGPVYV (SEQ ID NO:2); and
   b) contacting the p*MHC-I complexes with a plurality of Tapasin Binding Protein Related (TAPBPR) chaperones, thereby creating the plurality of peptide receptive MHC-I complexes.

2. The method of claim 1, wherein all of the in the plurality of MHC-I heavy chains are HLA-A*24:02 and wherein all of the placeholder peptides in the plurality of placeholder peptides consist of the amino acid sequence YPLFGWCF (SEQ ID NO:1).

3. The method of claim 1, wherein all of the MHC class I heavy chains in the plurality of MHC-I heavy chains are HLA-A*68:02 and where all of the placeholder peptides in the plurality of placeholder peptides consist of the amino acid sequence LFGPVYV (SEQ ID NO:2).

4. The method of claim 1, wherein the p*MHC-I complexes are further contacted with glycyl-methionine or glycyl-phenylalanine in step b).

5. The method of claim 1, wherein the molar ratio of TAPBPR chaperone to p*MHC-I is greater than 1:1.

6. The method of claim 1, wherein the molar ratio of TAPBPR chaperone to p*MHC-I is less than 1:1.

7. A method of making a plurality of peptide-MHC class I (pMHC-I) complexes, each complex comprising an MHC Class I heavy chain, a β2-microglobulin, and a peptide of interest, the method comprising:
   a) incubating a plurality of MHC class I heavy; a plurality of β2-microglobulins; and a plurality of placeholder peptides, under conditions wherein the plurality of MHC class I heavy chains, the plurality β2-microglobulins and the plurality placeholder peptides form a plurality of placeholder peptide-MHC class I (p*MHC-I) complexes, wherein all of the MHC class I heavy chains in the plurality of MHC class I heavy chains are HLA-A*24:02 and all of the placeholder peptides in the plurality of placeholder peptides consist of the amino acid sequence YPLFGWCF (SEQ ID NO:1), or wherein all of the MHC class I heavy chains in the plurality of MHC class I heavy chains are HLA-A*68:02 and all of the placeholder peptides in the plurality of placeholder peptides consist of the amino acid sequence LFGPVYV (SEQ ID NO:2);
   b) forming a plurality of peptide receptive MHC-I complexes by contacting the plurality of p*MHC-I complexes with a plurality of TAPBPR chaperones; and
   c) contacting the plurality of peptide receptive MHC-I complexes with a plurality of peptides of interest, thereby forming the plurality of pMHC-I complexes.

8. The method of claim 7, wherein all of the MHC class I heavy chains in the plurality of MHC-I heavy chains are HLA-A*24:02 and wherein all of the placeholder peptides in the plurality of placeholder peptides consist of the amino acid sequence YPLFGWCF (SEQ ID NO:1).

9. The method of claim 7, wherein all of the MHC class I heavy chains in the plurality of MHC-I heavy chains are HLA-A*68:02 and wherein all of the placeholder peptides in the plurality of placeholder peptides consist of the amino acid sequence LFGPVYV (SEQ ID NO:2).

10. The method of claim 7 where the plurality of p*MHC-I complexes are further contacted with glycyl-methionine or glycyl-phenylalanine in step b).

11. The method of claim 7 where the molar ratio of TAPBPR chaperone to p*MHC-I is greater than 1:1.

12. The method of claim 7 where the molar ratio of TAPBPR chaperone to p*MHC-I is less than 1:1.

13. The method of claim 7, wherein at least two of the peptides of interest in the plurality of peptides of interest have different sequences.

14. The method of claim 13, wherein the at least a subset of the plurality of peptides of interest comprises a peptide selected from tumor antigen peptides, viral derived peptides, bacterially derived peptides, or self-antigen derived peptides.

15. A method of making a plurality of peptide-MHC class I (pMHC-I) multimers, each pMHC-I multimer comprising a plurality of pMHC-I complexes, the method comprising:
   a) incubating a plurality of MHC class I heavy; a plurality of β2-microglobulins; and a plurality of placeholder peptides, under conditions wherein the plurality of MHC class I heavy chains, the β2-microglobulins and the plurality of placeholder peptides form a plurality of placeholder peptide-MHC class I (p*MHC-I) complexes, wherein all of the MHC class I heavy chains in the plurality of MHC class I heavy chains are HLA-A*24:02 and all of the placeholder peptides in the plurality of placeholder peptides consist of the amino acid sequence YPLFGWCF (SEQ ID NO:1), or wherein all of the MHC class I heavy chains in the plurality of MHC class I heavy chains are HLA-A*68:02 and all of the placeholder peptides in the plurality of placeholder peptides consist of the amino acid sequence LFGPVYV (SEQ ID NO:2);
   b) contacting the plurality of p*MHC-I complexes with a plurality TAPBPR chaperones, thereby forming a plurality of peptide receptive MHC-I complexes;
   c) attaching the plurality of peptide receptive MHC-I complexes to multimer backbones, thereby forming a plurality of peptide receptive MHC-I multimers; and
   d) contacting the plurality of peptide receptive MHC-I multimers with a plurality of peptides of interest, thereby forming a plurality of pMHC-I multimers.

16. The method of claim 15, wherein all of the MHC class I heavy chains in the plurality of MHC-I heavy chains are HLA-A*24:02 and wherein all of the placeholder peptides in the plurality of placeholder peptides consist of the amino acid sequence YPLFGWCF (SEQ ID NO:1).

17. The method of claim 15, wherein of the MHC class I heavy chains in the plurality of MHC-I heavy chains are HLA-A*68:02 and wherein all of the placeholder peptides in the plurality of placeholder peptides consist of the amino acid sequence LFGPVYV (SEQ ID NO:2).

18. The method of claim 15, wherein the plurality of p*MHC-I complexes is further contacted with glycyl-methionine or glycyl-phenylalanine in step b).

19. The method of claim 15, wherein the molar ratio of TAPBPR chaperone to p*MHC-I is greater than 1:1.

20. The method of claim 15, wherein the molar ratio of TAPBPR chaperone to p*MHC-I is less than 1:1.

21. The method of claim 15, wherein at least two of the peptides of interest in the plurality of peptides of interest have different sequences.

22. The method of claim 21, wherein the plurality of peptides of interest comprises tumor antigen peptides, viral derived peptides, bacterially derived peptides, or self-antigen derived peptides.

23. The method of claim 15, wherein the multimer backbones are selected from streptavidin, avidin and dextran backbones.

\* \* \* \* \*

SEQUENCE LISTING

<160> NUMBER OF SEQ ID NOS: 102

<210> SEQ ID NO 1
<211> LENGTH: 8
<212> TYPE: PRT
<213> ORGANISM: Artificial sequence
<220> FEATURE:
<223> OTHER INFORMATION: Sequence is synthesized

<400> SEQUENCE: 1

Tyr Pro Leu Phe Gly Trp Cys Phe
1               5

<210> SEQ ID NO 2
<211> LENGTH: 7
<212> TYPE: PRT
<213> ORGANISM: Artificial sequence
<220> FEATURE:
<223> OTHER INFORMATION: Sequence is synthesized

<400> SEQUENCE: 2

Leu Phe Gly Pro Val Tyr Val
1               5

<210> SEQ ID NO 3
<211> LENGTH: 9
<212> TYPE: PRT
<213> ORGANISM: Artificial sequence
<220> FEATURE:
<223> OTHER INFORMATION: Sequence is synthesized

<400> SEQUENCE: 3

Leu Leu Phe Gly Tyr Pro Val Tyr Val
1               5

<210> SEQ ID NO 4
<211> LENGTH: 9
<212> TYPE: PRT
<213> ORGANISM: Artificial sequence
<220> FEATURE:
<223> OTHER INFORMATION: Sequence is synthesized

<400> SEQUENCE: 4

Leu Phe Gly Tyr Pro Val Pro Tyr Val
1               5

<210> SEQ ID NO 5
<211> LENGTH: 9
<212> TYPE: PRT
<213> ORGANISM: Artificial sequence
<220> FEATURE:
<223> OTHER INFORMATION: Sequence is synthesized

<400> SEQUENCE: 5

Leu Leu Phe Gly Tyr Pro Val Tyr Val
1               5

<210> SEQ ID NO 6
<211> LENGTH: 9
<212> TYPE: PRT
<213> ORGANISM: Artificial sequence
<220> FEATURE:
<223> OTHER INFORMATION: Sequence is synthesized

<400> SEQUENCE: 6

Leu Leu Phe Gly Tyr Pro Val Tyr Val
1               5

```
<210> SEQ ID NO 7
<211> LENGTH: 10
<212> TYPE: PRT
<213> ORGANISM: Artificial sequence
<220> FEATURE:
<223> OTHER INFORMATION: Sequence is synthesized

<400> SEQUENCE: 7

Arg Tyr Pro Leu Thr Phe Gly Trp Cys Phe
1               5                   10

<210> SEQ ID NO 8
<211> LENGTH: 9
<212> TYPE: PRT
<213> ORGANISM: Artificial sequence
<220> FEATURE:
<223> OTHER INFORMATION: Sequence is synthesized

<400> SEQUENCE: 8

Gln Tyr Asn Pro Ile Arg Thr Thr Phe
1               5

<210> SEQ ID NO 9
<211> LENGTH: 9
<212> TYPE: PRT
<213> ORGANISM: Artificial sequence
<220> FEATURE:
<223> OTHER INFORMATION: Sequence is synthesized

<400> SEQUENCE: 9

Tyr Pro Asn Val Asn Ile His Asn Phe
1               5

<210> SEQ ID NO 10
<211> LENGTH: 9
<212> TYPE: PRT
<213> ORGANISM: Artificial sequence
<220> FEATURE:
<223> OTHER INFORMATION: Sequence is synthesized

<400> SEQUENCE: 10

Tyr Val Leu Asp His Leu Ile Val Val
1               5

<210> SEQ ID NO 11
<211> LENGTH: 9
<212> TYPE: PRT
<213> ORGANISM: Artificial sequence
<220> FEATURE:
<223> OTHER INFORMATION: Sequence is synthesized

<400> SEQUENCE: 11

Ser Leu Leu Met Trp Ile Thr Gln Ala
1               5

<210> SEQ ID NO 12
<211> LENGTH: 10
<212> TYPE: PRT
<213> ORGANISM: Artificial sequence
<220> FEATURE:
<223> OTHER INFORMATION: Sequence is synthesized

<400> SEQUENCE: 12

Arg Gly Pro Gly Arg Ala Phe Val Thr Ile
1               5                   10
```

<210> SEQ ID NO 13
<211> LENGTH: 9
<212> TYPE: PRT
<213> ORGANISM: Artificial sequence
<220> FEATURE:
<223> OTHER INFORMATION: Sequence is synthesized

<400> SEQUENCE: 13

Gly Pro Gly Arg Ala Phe Val Thr Ile
1               5

<210> SEQ ID NO 14
<211> LENGTH: 8
<212> TYPE: PRT
<213> ORGANISM: Artificial sequence
<220> FEATURE:
<223> OTHER INFORMATION: Sequence is synthesized

<400> SEQUENCE: 14

Pro Asn Val Asn Ile His Asn Phe
1               5

<210> SEQ ID NO 15
<211> LENGTH: 9
<212> TYPE: PRT
<213> ORGANISM: Artificial sequence
<220> FEATURE:
<223> OTHER INFORMATION: Sequence is synthesized

<400> SEQUENCE: 15

Gln Leu Ser Pro Phe Pro Phe Asp Leu
1               5

<210> SEQ ID NO 16
<211> LENGTH: 9
<212> TYPE: PRT
<213> ORGANISM: Artificial sequence
<220> FEATURE:
<223> OTHER INFORMATION: Sequence is synthesized

<400> SEQUENCE: 16

Arg Val Ala Asp Tyr Ile Val Lys Val
1               5

<210> SEQ ID NO 17
<211> LENGTH: 9
<212> TYPE: PRT
<213> ORGANISM: Artificial sequence
<220> FEATURE:
<223> OTHER INFORMATION: Sequence is synthesized

<400> SEQUENCE: 17

Ala Leu Phe Pro Glu Arg Ile Thr Val
1               5

<210> SEQ ID NO 18
<211> LENGTH: 9
<212> TYPE: PRT
<213> ORGANISM: Artificial sequence
<220> FEATURE:
<223> OTHER INFORMATION: Sequence is synthesized

<400> SEQUENCE: 18

Ala Ile Ala Asp Ile Ser Tyr Ser Val
1               5

```
<210> SEQ ID NO 19
<211> LENGTH: 9
<212> TYPE: PRT
<213> ORGANISM: Artificial sequence
<220> FEATURE:
<223> OTHER INFORMATION: Sequence is synthesized

<400> SEQUENCE: 19

Ser Leu Leu Asp Asp Ala Phe Ala Leu
1               5

<210> SEQ ID NO 20
<211> LENGTH: 9
<212> TYPE: PRT
<213> ORGANISM: Artificial sequence
<220> FEATURE:
<223> OTHER INFORMATION: Sequence is synthesized

<400> SEQUENCE: 20

Tyr Pro Leu Thr Phe Gly Trp Cys Phe
1               5

<210> SEQ ID NO 21
<211> LENGTH: 8
<212> TYPE: PRT
<213> ORGANISM: Artificial sequence
<220> FEATURE:
<223> OTHER INFORMATION: Sequence is synthesized

<400> SEQUENCE: 21

Leu Phe Gly Tyr Pro Val Tyr Val
1               5

<210> SEQ ID NO 22
<211> LENGTH: 9
<212> TYPE: PRT
<213> ORGANISM: Artificial sequence
<220> FEATURE:
<223> OTHER INFORMATION: Sequence is synthesized

<400> SEQUENCE: 22

Ala Gly Pro Ala Arg Ala Ala Ala Leu
1               5

<210> SEQ ID NO 23
<211> LENGTH: 10
<212> TYPE: PRT
<213> ORGANISM: Artificial sequence
<220> FEATURE:
<223> OTHER INFORMATION: Sequence is synthesized

<400> SEQUENCE: 23

Glu Leu Ala Gly Ile Gly Ile Leu Thr Val
1               5                   10

<210> SEQ ID NO 24
<211> LENGTH: 20
<212> TYPE: DNA
<213> ORGANISM: Artificial sequence
<220> FEATURE:
<223> OTHER INFORMATION: Sequence is synthesized

<400> SEQUENCE: 24
gtctcgtggg ctcggagatg                                              20

<210> SEQ ID NO 25
<211> LENGTH: 19
```

```
<212> TYPE: DNA
<213> ORGANISM: Artificial sequence
<220> FEATURE:
<223> OTHER INFORMATION: Sequence is synthesized

<400> SEQUENCE: 25
gaaattcacg gcgcacagg                                               19

<210> SEQ ID NO 26
<211> LENGTH: 43
<212> TYPE: DNA
<213> ORGANISM: Artificial sequence
<220> FEATURE:
<223> OTHER INFORMATION: Sequence is synthesized

<400> SEQUENCE: 26
ccttggcacc cgagaattcc agcttggctg gctgtctctg atc                    43

<210> SEQ ID NO 27
<211> LENGTH: 29
<212> TYPE: DNA
<213> ORGANISM: Artificial sequence
<220> FEATURE:
<223> OTHER INFORMATION: Sequence is synthesized

<400> SEQUENCE: 27
aatgatacgg cgaccaccga gatctacac                                    29

<210> SEQ ID NO 28
<211> LENGTH: 65
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (25)...(32)
<223> OTHER INFORMATION: A, C, T, or G

<400> SEQUENCE: 28
caagcagaag acggcatacg agatnnnnnn nngtgactgg agttccttgg cacccgagaa  60
ttcca                                                              65

<210> SEQ ID NO 29
<211> LENGTH: 47
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (25)...(32)
<223> OTHER INFORMATION: A, C, T, or G

<400> SEQUENCE: 29
caagcagaag acggcatacg agatnnnnnn nngtctcgtg gctcgg                 47

<210> SEQ ID NO 30
<211> LENGTH: 105
<212> TYPE: PRT
<213> ORGANISM: Artificial sequence
<220> FEATURE:
<223> OTHER INFORMATION: Sequence is synthesized

<400> SEQUENCE: 30

Arg Thr Asp Ser Pro Lys Ala His Val Thr His His Pro Arg Ser Lys
1               5                   10                  15
```

Gly Glu Val Thr Leu Arg Cys Trp Ala Leu Gly Phe Tyr Pro Ala Asp
            20                  25                  30

Ile Thr Leu Thr Trp Gln Leu Asn Gly Glu Glu Leu Thr Gln Asp Met
        35                  40                  45

Glu Leu Val Glu Thr Arg Pro Ala Gly Asp Gly Thr Phe Gln Lys Trp
 50                  55                  60

Ala Ser Val Val Val Pro Leu Gly Lys Glu Gln Asn Tyr Thr Cys Arg
 65                  70                  75                  80

Val Tyr His Glu Gly Leu Pro Glu Pro Leu Thr Leu Arg Trp Glu Pro
                85                  90                  95

Pro Pro Ser Thr Asp Ser Tyr Met Val
            100                 105

<210> SEQ ID NO 31
<211> LENGTH: 104
<212> TYPE: PRT
<213> ORGANISM: Artificial sequence
<220> FEATURE:
<223> OTHER INFORMATION: Sequence is synthesized

<400> SEQUENCE: 31

Arg Thr Asp Ala Pro Lys Thr His Met Thr His His Ala Val Ser Asp
 1               5                  10                  15

His Glu Ala Thr Leu Arg Cys Trp Ala Leu Ser Phe Tyr Pro Ala Glu
            20                  25                  30

Ile Thr Leu Thr Trp Gln Arg Asp Gly Glu Asp Gln Thr Gln Asp Thr
        35                  40                  45

Glu Leu Val Glu Thr Arg Pro Ala Gly Asp Gly Thr Phe Gln Lys Trp
 50                  55                  60

Ala Ala Val Val Val Pro Ser Gly Gln Glu Gln Arg Tyr Thr Cys His
 65                  70                  75                  80

Val Gln His Glu Gly Leu Pro Lys Pro Leu Thr Leu Arg Trp Glu Pro
                85                  90                  95

Ser Ser Gln Pro Thr Ile Pro Ile
            100

<210> SEQ ID NO 32
<211> LENGTH: 14
<212> TYPE: PRT
<213> ORGANISM: Artificial sequence
<220> FEATURE:
<223> OTHER INFORMATION: Sequence is synthesized

<400> SEQUENCE: 32

Cys Ala Leu Met Gly Gly Thr Gly Gly Phe Lys Thr Ile Phe
 1               5                  10

<210> SEQ ID NO 33
<211> LENGTH: 11
<212> TYPE: PRT
<213> ORGANISM: Artificial sequence
<220> FEATURE:
<223> OTHER INFORMATION: Sequence is synthesized

<400> SEQUENCE: 33

Cys Ala Gly Tyr Asn Phe Asn Lys Phe Tyr Phe
 1               5                  10

<210> SEQ ID NO 34
<211> LENGTH: 14

```
<212> TYPE: PRT
<213> ORGANISM: Artificial sequence
<220> FEATURE:
<223> OTHER INFORMATION: Sequence is synthesized

<400> SEQUENCE: 34

Cys Ala Glu Thr Leu Asn Gln Ala Gly Thr Ala Leu Ile Phe
1               5                   10

<210> SEQ ID NO 35
<211> LENGTH: 11
<212> TYPE: PRT
<213> ORGANISM: Artificial sequence
<220> FEATURE:
<223> OTHER INFORMATION: Sequence is synthesized

<400> SEQUENCE: 35

Cys Ala Val Lys Asp Thr Asp Lys Leu Ile Phe
1               5                   10

<210> SEQ ID NO 36
<211> LENGTH: 14
<212> TYPE: PRT
<213> ORGANISM: Artificial sequence
<220> FEATURE:
<223> OTHER INFORMATION: Sequence is synthesized

<400> SEQUENCE: 36

Cys Ile Leu Arg Asp Phe Gln Gly Ala Gln Lys Leu Val Phe
1               5                   10

<210> SEQ ID NO 37
<211> LENGTH: 17
<212> TYPE: PRT
<213> ORGANISM: Artificial sequence
<220> FEATURE:
<223> OTHER INFORMATION: Sequence is synthesized

<400> SEQUENCE: 37

Cys Ala Ser Ser Leu Tyr Phe Ser Ala Ala Asn Thr Gly Glu Leu Phe
1               5                   10                  15

Phe

<210> SEQ ID NO 38
<211> LENGTH: 15
<212> TYPE: PRT
<213> ORGANISM: Artificial sequence
<220> FEATURE:
<223> OTHER INFORMATION: Sequence is synthesized

<400> SEQUENCE: 38

Cys Ala Ser Ser Phe Phe Ser Gly Gly Gly Asp Thr Gln Tyr Phe
1               5                   10                  15

<210> SEQ ID NO 39
<211> LENGTH: 14
<212> TYPE: PRT
<213> ORGANISM: Artificial sequence
<220> FEATURE:
<223> OTHER INFORMATION: Sequence is synthesized

<400> SEQUENCE: 39

Cys Ala Ser Thr Asn Ile Gly Ala Val Tyr Glu Gln Tyr Phe
1               5                   10

<210> SEQ ID NO 40
```

```
<211> LENGTH: 14
<212> TYPE: PRT
<213> ORGANISM: Artificial sequence
<220> FEATURE:
<223> OTHER INFORMATION: Sequence is synthesized

<400> SEQUENCE: 40

Cys Ala Ser Ser Thr Leu Gly Ser Ile Tyr Glu Gln Tyr Phe
1               5                   10

<210> SEQ ID NO 41
<211> LENGTH: 12
<212> TYPE: PRT
<213> ORGANISM: Artificial sequence
<220> FEATURE:
<223> OTHER INFORMATION: Sequence is synthesized

<400> SEQUENCE: 41

Cys Ala Ser Ser Glu Gly Pro Asn Glu Gln Phe Phe
1               5                   10

<210> SEQ ID NO 42
<211> LENGTH: 16
<212> TYPE: PRT
<213> ORGANISM: Artificial sequence
<220> FEATURE:
<223> OTHER INFORMATION: Sequence is synthesized

<400> SEQUENCE: 42

Cys Ala Thr Arg Pro Leu Gly Thr Gln Val Thr Asp Thr Gln Tyr Phe
1               5                   10                  15

<210> SEQ ID NO 43
<211> LENGTH: 15
<212> TYPE: PRT
<213> ORGANISM: Artificial sequence
<220> FEATURE:
<223> OTHER INFORMATION: Sequence is synthesized

<400> SEQUENCE: 43

Cys Ala Ser Ser Lys Glu Ile Leu Ser Tyr Asn Glu Gln Phe Phe
1               5                   10                  15

<210> SEQ ID NO 44
<211> LENGTH: 61
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (23)...(48)
<223> OTHER INFORMATION: A, C, T, or G

<400> SEQUENCE: 44
ctacacgacg ctcttcctat ctnnnnnnnn nnnnnnnnnn nnnnnnnntt tcttatatgg      60
g                                                                     61

<210> SEQ ID NO 45
<211> LENGTH: 23
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (1)...(10)
<223> OTHER INFORMATION: A, C, T, or G
```

```
<400> SEQUENCE: 45
nnnnnnnnnn cccatataag aaa                                              23

<210> SEQ ID NO 46
<211> LENGTH: 22
<212> TYPE: DNA
<213> ORGANISM: Artificial sequence
<220> FEATURE:
<223> OTHER INFORMATION: Sequence is synthesized

<400> SEQUENCE: 46
ctacacgacg ctcttccgat ct                                               22

<210> SEQ ID NO 47
<211> LENGTH: 71
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (1)...(10)
<223> OTHER INFORMATION: A, C, T, or G
<220> FEATURE:
<221> NAME/KEY: unsure
<222> LOCATION: (24)...(49)
<223> OTHER INFORMATION: A, C, T, or G

<400> SEQUENCE: 47
nnnnnnnnnn cccatataag aaannnnnnn nnnnnnnnnn nnnnnnnnna gatcggaaga      60
gcgtcgtgta g                                                           71

<210> SEQ ID NO 48
<211> LENGTH: 19
<212> TYPE: DNA
<213> ORGANISM: Artificial sequence
<220> FEATURE:
<223> OTHER INFORMATION: Sequence is synthesized

<400> SEQUENCE: 48
ctgatggctc aaacacagc                                                   19

<210> SEQ ID NO 49
<211> LENGTH: 49
<212> TYPE: DNA
<213> ORGANISM: Artificial sequence
<220> FEATURE:
<223> OTHER INFORMATION: Sequence is synthesized

<400> SEQUENCE: 49
aatgatacgg cgaccaccga gatctacact ctttccctac acgacgctc                  49

<210> SEQ ID NO 50
<211> LENGTH: 107
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (59)...(84)
<223> OTHER INFORMATION: A, C, T, or G
<220> FEATURE:
<221> NAME/KEY: unsure
<222> LOCATION: (98)...(107)
<223> OTHER INFORMATION: A, C, T, or G
```

<400> SEQUENCE: 50
aatgatacgg cgaccaccga gatctacact ctttccctac acgacgctct tccgatctnn    60
nnnnnnnnnn nnnnnnnnnn nnnntttctt atatgggnnn nnnnnnn                 107

<210> SEQ ID NO 51
<211> LENGTH: 107
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (1)...(10)
<223> OTHER INFORMATION: A, C, T, or G
<220> FEATURE:
<221> NAME/KEY: unsure
<222> LOCATION: (24)...(49)
<223> OTHER INFORMATION: A, C, T, or G

<400> SEQUENCE: 51
nnnnnnnnnn cccatataag aaannnnnnn nnnnnnnnnn nnnnnnnnna gatcggaaga    60
gcgtcgtgta gggaaagagt gtagatctcg gtggtcgccg tatcatt                107

<210> SEQ ID NO 52
<211> LENGTH: 32
<212> TYPE: DNA
<213> ORGANISM: Artificial sequence
<220> FEATURE:
<223> OTHER INFORMATION: Sequence is synthesized

<400> SEQUENCE: 52
gtctcgtggc tcggagatgt gtatagagac ag                                 32

<210> SEQ ID NO 53
<211> LENGTH: 19
<212> TYPE: DNA
<213> ORGANISM: Artificial sequence
<220> FEATURE:
<223> OTHER INFORMATION: Sequence is synthesized

<400> SEQUENCE: 53
gtctcgtggc tcggagatg                                                19

<210> SEQ ID NO 54
<211> LENGTH: 47
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (25)...(32)
<223> OTHER INFORMATION: A, C, T, or G

<400> SEQUENCE: 54
caagcagaag acggcatacg agatnnnnnn nngtctcgtg ggctcgg                 47

<210> SEQ ID NO 55
<211> LENGTH: 34
<212> TYPE: DNA
<213> ORGANISM: Artificial sequence
<220> FEATURE:
<223> OTHER INFORMATION: Sequence is synthesized

<400> SEQUENCE: 55
ctgtctctta tacacatctc cgagcccacg agac                               34

<210> SEQ ID NO 56
<211> LENGTH: 34
<212> TYPE: DNA
<213> ORGANISM: Artificial sequence
<220> FEATURE:
<223> OTHER INFORMATION: Sequence is synthesized

<400> SEQUENCE: 56
ctgtcgtggg ctcggagatg tgtataagag acag                         34

<210> SEQ ID NO 57
<211> LENGTH: 66
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (35)...(42)
<223> OTHER INFORMATION: A, C, T, or G

<400> SEQUENCE: 57
ctgtctctta tacacatctc cgagcccacg agacnnnnnn nntagagcat acggcagaag    60
acgaac                                                              66

<210> SEQ ID NO 58
<211> LENGTH: 66
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (26)...(33)
<223> OTHER INFORMATION: A, C, T, or G

<400> SEQUENCE: 58
gttcggtctt ctgccgtatg ctctannnnn nnngtctcgt gggctcggaa tgtgtataag    60
agacag                                                              66

<210> SEQ ID NO 59
<211> LENGTH: 9
<212> TYPE: PRT
<213> ORGANISM: Artificial sequence
<220> FEATURE:
<223> OTHER INFORMATION: Sequence is synthesized

<400> SEQUENCE: 59

Thr Leu Asp Tyr Lys Pro Leu Ser Val
1               5

<210> SEQ ID NO 60
<211> LENGTH: 9
<212> TYPE: PRT
<213> ORGANISM: Artificial sequence
<220> FEATURE:
<223> OTHER INFORMATION: Sequence is synthesized

<400> SEQUENCE: 60

Tyr Val Leu Asp His Leu Ile Val Val
1               5

<210> SEQ ID NO 61
<211> LENGTH: 10
<212> TYPE: PRT

<213> ORGANISM: Artificial sequence
<220> FEATURE:
<223> OTHER INFORMATION: Sequence is synthesized

<400> SEQUENCE: 61

Leu Leu Asp Phe Val Arg Phe Met Gly Val
1               5                   10

<210> SEQ ID NO 62
<211> LENGTH: 9
<212> TYPE: PRT
<213> ORGANISM: Artificial sequence
<220> FEATURE:
<223> OTHER INFORMATION: Sequence is synthesized

<400> SEQUENCE: 62

Tyr Leu Gln Gln Asn Trp Trp Thr Leu
1               5

<210> SEQ ID NO 63
<211> LENGTH: 9
<212> TYPE: PRT
<213> ORGANISM: Artificial sequence
<220> FEATURE:
<223> OTHER INFORMATION: Sequence is synthesized

<400> SEQUENCE: 63

Val Leu Ala Glu Leu Val Lys Gln Ile
1               5

<210> SEQ ID NO 64
<211> LENGTH: 9
<212> TYPE: PRT
<213> ORGANISM: Artificial sequence
<220> FEATURE:
<223> OTHER INFORMATION: Sequence is synthesized

<400> SEQUENCE: 64

Asn Met Leu Ser Thr Val Leu Gly Val
1               5

<210> SEQ ID NO 65
<211> LENGTH: 9
<212> TYPE: PRT
<213> ORGANISM: Artificial sequence
<220> FEATURE:
<223> OTHER INFORMATION: Sequence is synthesized

<400> SEQUENCE: 65

Gln Met Trp Gln Ala Arg Leu Thr Val
1               5

<210> SEQ ID NO 66
<211> LENGTH: 11
<212> TYPE: PRT
<213> ORGANISM: Artificial sequence
<220> FEATURE:
<223> OTHER INFORMATION: Sequence is synthesized

<400> SEQUENCE: 66

Phe Leu Phe Pro Ser Asp Phe Phe Pro Ser Val
1               5                   10

<210> SEQ ID NO 67
<211> LENGTH: 9
<212> TYPE: PRT
<213> ORGANISM: Artificial sequence

```
<220> FEATURE:
<223> OTHER INFORMATION: Sequence is synthesized

<400> SEQUENCE: 67

Phe Leu Leu Ser Leu Gly Ile His Leu
1               5

<210> SEQ ID NO 68
<211> LENGTH: 9
<212> TYPE: PRT
<213> ORGANISM: Artificial sequence
<220> FEATURE:
<223> OTHER INFORMATION: Sequence is synthesized

<400> SEQUENCE: 68

Ser Leu Tyr Asn Thr Val Ala Thr Leu
1               5

<210> SEQ ID NO 69
<211> LENGTH: 9
<212> TYPE: PRT
<213> ORGANISM: Artificial sequence
<220> FEATURE:
<223> OTHER INFORMATION: Sequence is synthesized

<400> SEQUENCE: 69

Gly Leu Ala Asp Gln Leu Ile His Leu
1               5

<210> SEQ ID NO 70
<211> LENGTH: 9
<212> TYPE: PRT
<213> ORGANISM: Artificial sequence
<220> FEATURE:
<223> OTHER INFORMATION: Sequence is synthesized

<400> SEQUENCE: 70

Ala Ile Met Asp Lys Asn Ile Ile Leu
1               5

<210> SEQ ID NO 71
<211> LENGTH: 9
<212> TYPE: PRT
<213> ORGANISM: Artificial sequence
<220> FEATURE:
<223> OTHER INFORMATION: Sequence is synthesized

<400> SEQUENCE: 71

Ala Leu Leu Lys His Arg Phe Glu Ile
1               5

<210> SEQ ID NO 72
<211> LENGTH: 9
<212> TYPE: PRT
<213> ORGANISM: Artificial sequence
<220> FEATURE:
<223> OTHER INFORMATION: Sequence is synthesized

<400> SEQUENCE: 72

Asp Leu Met Gly Tyr Ile Pro Ala Val
1               5

<210> SEQ ID NO 73
<211> LENGTH: 9
<212> TYPE: PRT
<213> ORGANISM: Artificial sequence
<220> FEATURE:
```

```
<223> OTHER INFORMATION: Sequence is synthesized

<400> SEQUENCE: 73

Ile Met Asp Gln Val Pro Phe Ser Val
1               5

<210> SEQ ID NO 74
<211> LENGTH: 9
<212> TYPE: PRT
<213> ORGANISM: Artificial sequence
<220> FEATURE:
<223> OTHER INFORMATION: Sequence is synthesized

<400> SEQUENCE: 74

Ile Thr Asp Gln Val Pro Phe Ser Val
1               5

<210> SEQ ID NO 75
<211> LENGTH: 9
<212> TYPE: PRT
<213> ORGANISM: Artificial sequence
<220> FEATURE:
<223> OTHER INFORMATION: Sequence is synthesized

<400> SEQUENCE: 75

Ser Leu Leu Met Trp Ile Thr Gln Ala
1               5

<210> SEQ ID NO 76
<211> LENGTH: 9
<212> TYPE: PRT
<213> ORGANISM: Artificial sequence
<220> FEATURE:
<223> OTHER INFORMATION: Sequence is synthesized

<400> SEQUENCE: 76

Gly Leu Tyr Asp Gly Met Glu His Leu
1               5

<210> SEQ ID NO 77
<211> LENGTH: 9
<212> TYPE: PRT
<213> ORGANISM: Artificial sequence
<220> FEATURE:
<223> OTHER INFORMATION: Sequence is synthesized

<400> SEQUENCE: 77

Phe Leu Trp Gly Pro Arg Ala Leu Val
1               5

<210> SEQ ID NO 78
<211> LENGTH: 9
<212> TYPE: PRT
<213> ORGANISM: Artificial sequence
<220> FEATURE:
<223> OTHER INFORMATION: Sequence is synthesized

<400> SEQUENCE: 78

Lys Val Leu Glu Tyr Val Ile Lys Val
1               5

<210> SEQ ID NO 79
<211> LENGTH: 9
<212> TYPE: PRT
<213> ORGANISM: Artificial sequence
<220> FEATURE:
<223> OTHER INFORMATION: Sequence is synthesized
```

<400> SEQUENCE: 79

Val Met Asn Ile Leu Leu Gln Tyr Val
1               5

<210> SEQ ID NO 80
<211> LENGTH: 9
<212> TYPE: PRT
<213> ORGANISM: Artificial sequence
<220> FEATURE:
<223> OTHER INFORMATION: Sequence is synthesized

<400> SEQUENCE: 80

Val Ile Val Met Leu Thr Pro Leu Val
1               5

<210> SEQ ID NO 81
<211> LENGTH: 9
<212> TYPE: PRT
<213> ORGANISM: Artificial sequence
<220> FEATURE:
<223> OTHER INFORMATION: Sequence is synthesized

<400> SEQUENCE: 81

Leu Asn Ile Asp Leu Leu Trp Ser Val
1               5

<210> SEQ ID NO 82
<211> LENGTH: 9
<212> TYPE: PRT
<213> ORGANISM: Artificial sequence
<220> FEATURE:
<223> OTHER INFORMATION: Sequence is synthesized

<400> SEQUENCE: 82

Val Leu Phe Gly Leu Gly Phe Ala Ile
1               5

<210> SEQ ID NO 83
<211> LENGTH: 10
<212> TYPE: PRT
<213> ORGANISM: Artificial sequence
<220> FEATURE:
<223> OTHER INFORMATION: Sequence is synthesized

<400> SEQUENCE: 83

Val Leu Phe Gly Leu Gly Phe Ala Ile Ala
1               5                   10

<210> SEQ ID NO 84
<211> LENGTH: 9
<212> TYPE: PRT
<213> ORGANISM: Artificial sequence
<220> FEATURE:
<223> OTHER INFORMATION: Sequence is synthesized

<400> SEQUENCE: 84

His Leu Val Glu Ala Leu Tyr Leu Val
1               5

<210> SEQ ID NO 85
<211> LENGTH: 9
<212> TYPE: PRT
<213> ORGANISM: Artificial sequence
<220> FEATURE:
<223> OTHER INFORMATION: Sequence is synthesized

```
<400> SEQUENCE: 85

Ser Leu Ser Arg Phe Ser Trp Gly Ala
1               5

<210> SEQ ID NO 86
<211> LENGTH: 9
<212> TYPE: PRT
<213> ORGANISM: Artificial sequence
<220> FEATURE:
<223> OTHER INFORMATION: Sequence is synthesized

<400> SEQUENCE: 86

Tyr Leu Leu Pro Arg Arg Gly Pro Arg
1               5

<210> SEQ ID NO 87
<211> LENGTH: 10
<212> TYPE: PRT
<213> ORGANISM: Artificial sequence
<220> FEATURE:
<223> OTHER INFORMATION: Sequence is synthesized

<400> SEQUENCE: 87

Lys Leu Ser Gly Leu Gly Ile Asn Ala Val
1               5                   10

<210> SEQ ID NO 88
<211> LENGTH: 10
<212> TYPE: PRT
<213> ORGANISM: Artificial sequence
<220> FEATURE:
<223> OTHER INFORMATION: Sequence is synthesized

<400> SEQUENCE: 88

Leu Leu Phe Asn Ile Leu Gly Gly Trp Val
1               5                   10

<210> SEQ ID NO 89
<211> LENGTH: 9
<212> TYPE: PRT
<213> ORGANISM: Artificial sequence
<220> FEATURE:
<223> OTHER INFORMATION: Sequence is synthesized

<400> SEQUENCE: 89

Met Leu Asp Leu Gln Pro Glu Thr Thr
1               5

<210> SEQ ID NO 90
<211> LENGTH: 9
<212> TYPE: PRT
<213> ORGANISM: Artificial sequence
<220> FEATURE:
<223> OTHER INFORMATION: Sequence is synthesized

<400> SEQUENCE: 90

Asn Leu Val Pro Met Val Ala Thr Val
1               5

<210> SEQ ID NO 91
<211> LENGTH: 8
<212> TYPE: PRT
<213> ORGANISM: Artificial sequence
<220> FEATURE:
<223> OTHER INFORMATION: Sequence is synthesized

<400> SEQUENCE: 91
```

```
Leu Leu Phe Gly Tyr Pro Val Tyr
1               5

<210> SEQ ID NO 92
<211> LENGTH: 10
<212> TYPE: PRT
<213> ORGANISM: Artificial sequence
<220> FEATURE:
<223> OTHER INFORMATION: Sequence is synthesized

<400> SEQUENCE: 92

Glu Leu Ala Gly Ile Gly Ile Leu Thr Val
1               5                   10

<210> SEQ ID NO 93
<211> LENGTH: 33
<212> TYPE: DNA
<213> ORGANISM: Artificial sequence
<220> FEATURE:
<223> OTHER INFORMATION: Sequence is synthesized

<400> SEQUENCE: 93
tctcgtgggc tcggagatgt gtataagaga cag                          33

<210> SEQ ID NO 94
<211> LENGTH: 21
<212> TYPE: DNA
<213> ORGANISM: Artificial sequence
<220> FEATURE:
<223> OTHER INFORMATION: Sequence is synthesized

<400> SEQUENCE: 94
ccttggcacc cgagaattcc a                                       21

<210> SEQ ID NO 95
<211> LENGTH: 45
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (23)...(32)
<223> OTHER INFORMATION: A, C, T, or G

<400> SEQUENCE: 95
ctacacgacg ctcttccgat ctnnnnnnnn nntttcttat atggg             45

<210> SEQ ID NO 96
<211> LENGTH: 62
<212> TYPE: PRT
<213> ORGANISM: Artificial sequence
<220> FEATURE:
<223> OTHER INFORMATION: Sequence is synthesized

<400> SEQUENCE: 96

Ala Ala Gly Cys Ala Gly Thr Gly Gly Thr Ala Thr Cys Ala Ala Cys
1               5                   10                  15

Gly Cys Ala Gly Ala Gly Thr Ala Cys Gly Ala Gly Ala Cys Thr Thr
            20                  25                  30

Thr Thr Thr Thr Thr Thr Thr Thr Thr Thr Thr Thr Thr Thr Thr
        35                  40                  45

Thr Thr Thr Thr Thr Thr Thr Thr Thr Thr Thr Val Asn
    50                  55                  60
```

```
<210> SEQ ID NO 97
<211> LENGTH: 27
<212> TYPE: DNA
<213> ORGANISM: Artificial sequence
<220> FEATURE:
<223> OTHER INFORMATION: Sequence is synthesized

<400> SEQUENCE: 97
aagcagtggt atcaacgcag agtacat                                        27

<210> SEQ ID NO 98
<211> LENGTH: 53
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: (23)...(32)
<223> OTHER INFORMATION: A, C, T, or G

<400> SEQUENCE: 98
caagcagaag acggcatacg agatnnnnnn nngtgactgg agttcagacg tgt           53

<210> SEQ ID NO 99
<211> LENGTH: 20
<212> TYPE: DNA
<213> ORGANISM: Artificial sequence
<220> FEATURE:
<223> OTHER INFORMATION: Sequence is synthesized

<400> SEQUENCE: 99
tgaaggcgtt tgcacatgca                                                20

<210> SEQ ID NO 100
<211> LENGTH: 25
<212> TYPE: DNA
<213> ORGANISM: Artificial sequence
<220> FEATURE:
<223> OTHER INFORMATION: Sequence is synthesized

<400> SEQUENCE: 100
tcaggcagta tctggagtca ttgag                                          25

<210> SEQ ID NO 101
<211> LENGTH: 25
<212> TYPE: DNA
<213> ORGANISM: Artificial sequence
<220> FEATURE:
<223> OTHER INFORMATION: Sequence is synthesized

<400> SEQUENCE: 101
aatgatacgg cgaccaccga gatct                                          25

<210> SEQ ID NO 102
<211> LENGTH: 20
<212> TYPE: DNA
<213> ORGANISM: Artificial sequence
<220> FEATURE:
<223> OTHER INFORMATION: Sequence is synthesized

<400> SEQUENCE: 102
agtctctcag ctggtacacg                                                20
```